US009105162B2

(12) United States Patent
Ryan et al.

(10) Patent No.: US 9,105,162 B2
(45) Date of Patent: Aug. 11, 2015

(54) ELECTRONIC GAMING DEVICE WITH SCRAPE AWAY FEATURE

(71) Applicants: Timothy Ryan, Duluth, GA (US); Carmen DiMichele, Norcross, GA (US); Jared Torres, Atlanta, GA (US); Roman Souza, Johns Creek, GA (US); Simone Leo, Atlanta, GA (US); Eric Boese, Decatur, GA (US); Brendan Mullins, Alpharetta, GA (US)

(72) Inventors: Timothy Ryan, Duluth, GA (US); Carmen DiMichele, Norcross, GA (US); Jared Torres, Atlanta, GA (US); Roman Souza, Johns Creek, GA (US); Simone Leo, Atlanta, GA (US); Eric Boese, Decatur, GA (US); Brendan Mullins, Alpharetta, GA (US)

(73) Assignee: CADILLAC JACK, Duluth, GA (US)

( * ) Notice: Subject to any disclaimer, the term of this patent is extended or adjusted under 35 U.S.C. 154(b) by 0 days.

(21) Appl. No.: 14/260,329

(22) Filed: Apr. 24, 2014

(65) Prior Publication Data

US 2014/0235324 A1 Aug. 21, 2014

Related U.S. Application Data

(63) Continuation-in-part of application No. 13/570,457, filed on Aug. 9, 2012, now Pat. No. 8,651,944.

(51) Int. Cl.
*G06F 17/00* (2006.01)
*G07F 17/34* (2006.01)
*G07F 17/32* (2006.01)

(52) U.S. Cl.
CPC .............. *G07F 17/34* (2013.01); *G07F 17/326* (2013.01); *G07F 17/3211* (2013.01); *G07F 17/3213* (2013.01); *G07F 17/3244* (2013.01); *G07F 17/3262* (2013.01)

(58) Field of Classification Search
None
See application file for complete search history.

(56) References Cited

U.S. PATENT DOCUMENTS

| | | | | | |
|---|---|---|---|---|---|
| 5,855,514 | A * | 1/1999 | Kamille | 463/17 |
| 5,931,467 | A * | 8/1999 | Kamille | 273/139 |
| 6,089,976 | A * | 7/2000 | Schneider et al. | 463/16 |
| 6,102,798 | A * | 8/2000 | Bennett | 463/16 |
| 6,159,097 | A * | 12/2000 | Gura | 463/20 |
| 6,174,235 | B1 * | 1/2001 | Walker et al. | 463/25 |
| 6,254,481 | B1 * | 7/2001 | Jaffe | 463/20 |
| 6,261,177 | B1 * | 7/2001 | Bennett | 463/16 |
| 6,346,043 | B1 * | 2/2002 | Colin et al. | 463/17 |
| 6,347,996 | B1 * | 2/2002 | Gilmore et al. | 463/17 |
| 6,511,375 | B1 * | 1/2003 | Kaminkow | 463/20 |
| 6,514,144 | B2 * | 2/2003 | Riendeau et al. | 463/42 |
| 6,592,457 | B1 * | 7/2003 | Frohm et al. | 463/16 |
| 6,595,854 | B2 * | 7/2003 | Hughs-Baird et al. | 463/20 |

(Continued)

*Primary Examiner* — Steven J Hylinski
(74) *Attorney, Agent, or Firm* — CF 3; Stephen Eisenmann

(57) ABSTRACT

Examples disclosed herein relate to systems and methods, which may receive wagers. The systems and methods may include scrape away functionality. The system, device, and/or method may include a plurality of reels with one or more paylines formed on at least a portion of the plurality of reels. The system, device, and/or method may include a memory which may include a plurality of scrape away structures. The system, device, and/or method may include a processor which may generate one or more areas where each area may cover one or more symbols. Further, the processor may remove the one or more areas to reveal one or more covered symbols based on a selected tool and a selected area.

20 Claims, 66 Drawing Sheets

(56) References Cited

U.S. PATENT DOCUMENTS

| | | | | |
|---|---|---|---|---|
| 6,632,141 | B2 * | 10/2003 | Webb et al. | 463/25 |
| 6,672,960 | B1 * | 1/2004 | B-Jensen | 463/20 |
| 6,746,327 | B2 * | 6/2004 | Frohm et al. | 463/16 |
| 6,875,108 | B1 * | 4/2005 | Hughs-Baird | 463/26 |
| 6,964,416 | B2 * | 11/2005 | McClintic et al. | 273/273 |
| 6,997,806 | B2 * | 2/2006 | Falciglia, Sr. | 463/20 |
| 7,137,887 | B2 * | 11/2006 | Gomez et al. | 463/20 |
| 7,182,689 | B2 * | 2/2007 | Hughs-Baird et al. | 463/20 |
| 7,192,349 | B2 * | 3/2007 | Baerlocher et al. | 463/25 |
| 7,201,657 | B2 * | 4/2007 | Baerlocher et al. | 463/20 |
| 7,252,591 | B2 * | 8/2007 | Van Asdale | 463/22 |
| 7,273,415 | B2 * | 9/2007 | Cregan et al. | 463/25 |
| 7,297,058 | B2 * | 11/2007 | Gomez et al. | 463/16 |
| 7,314,409 | B2 * | 1/2008 | Maya et al. | 463/16 |
| 7,316,609 | B2 * | 1/2008 | Dunn et al. | 463/16 |
| 7,364,506 | B2 * | 4/2008 | Jaffe et al. | 463/20 |
| 7,390,260 | B2 * | 6/2008 | Englman | 463/20 |
| 7,455,585 | B2 * | 11/2008 | Englman | 463/16 |
| 7,470,186 | B2 * | 12/2008 | Cannon | 463/18 |
| 7,690,981 | B2 * | 4/2010 | Ching et al. | 463/20 |
| 8,540,566 | B2 * | 9/2013 | Gregory-Brown et al. | 463/25 |
| 2003/0216167 | A1 * | 11/2003 | Gauselmann | 463/25 |
| 2004/0242300 | A1 * | 12/2004 | Nicely et al. | 463/16 |
| 2006/0178199 | A1 * | 8/2006 | Thomas | 463/20 |

* cited by examiner

FIG. 6B
FIG. 6C
FIG. 6D
602
608
YOU WIN PRIZE
PICK AGAIN!
604
608
YOU WIN PRIZE
PICK AGAIN!
606
610
X
GAME OVER

ELECTRONIC GAMING DEVICE WITH SCRAPE AWAY FEATURE

CROSS-REFERENCE TO RELATED PATENT APPLICATION

This application is a continuation-in-part of prior application Ser. No. 13/570,457 entitled "ELECTRONIC GAMING DEVICE WITH SCRAPE AWAY FEATURE", filed on Aug. 9, 2012, which is incorporated herein by reference in its entirety.

FIELD

The subject matter disclosed herein relates to an electronic gaming device. More specifically, the disclosure relates to an electronic gaming device, which provides gaming options relating to one or more scrape away features.

INFORMATION

The gaming industry has numerous casinos located both worldwide and in the United States. A client of a casino or other gaming entity can gamble via various games of chance. For example, craps, roulette, baccarat, blackjack, and electronic games (e.g., a slot machine) where a person may gamble on an outcome.

Paylines of an electronic gaming device (e.g., a slot machine) are utilized to determine when predetermined winning symbol combinations are aligned in a predetermined pattern to form a winning combination. A winning event occurs when the player successful matches the predetermined winning symbols in one of the predetermined patterns. The winning payout from a winning event may include one or more scrape away features as part of the base game and/or as a bonus game. A new way of delivering game play includes providing wagering gaming options, which may include scrape away options. In this disclosure, the gaming device and/or the gaming system may provide more excitement by allowing the player to initiate one or more scrape away features.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
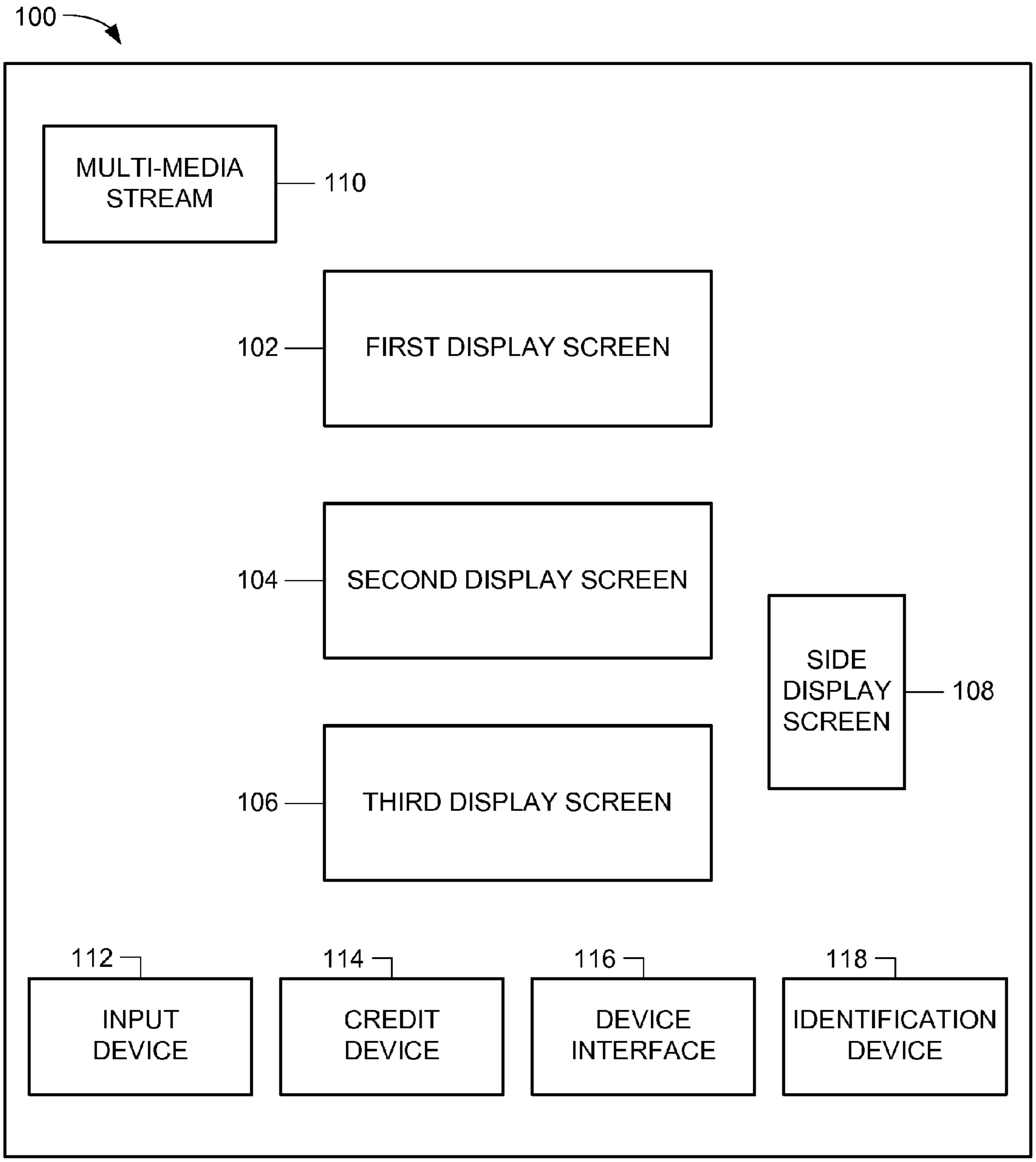
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for the casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to utilize one or more scrape away features, to select a row and/or column to move, to select a row area to move, to select a column area to move, to select a symbol to move, to select a game rearranging optimization option, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), or any combination thereof. These selections may occur via any other input device (e.g., a touch screen, voice commands, etc.).

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more scrape away options may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, a player may want to have scraped away gaming options only. Therefore, no non-scrape away gaming options would be presented.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, advertising, player attractions, electronic gaming device 100 configuration parameters and settings, game history, accounting meters, events, alarms, or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are put together they complete one image. Electronic gaming device 100 may stream or play prerecorded multi-media data, which may be displayed on any display combination.

Figure 2:
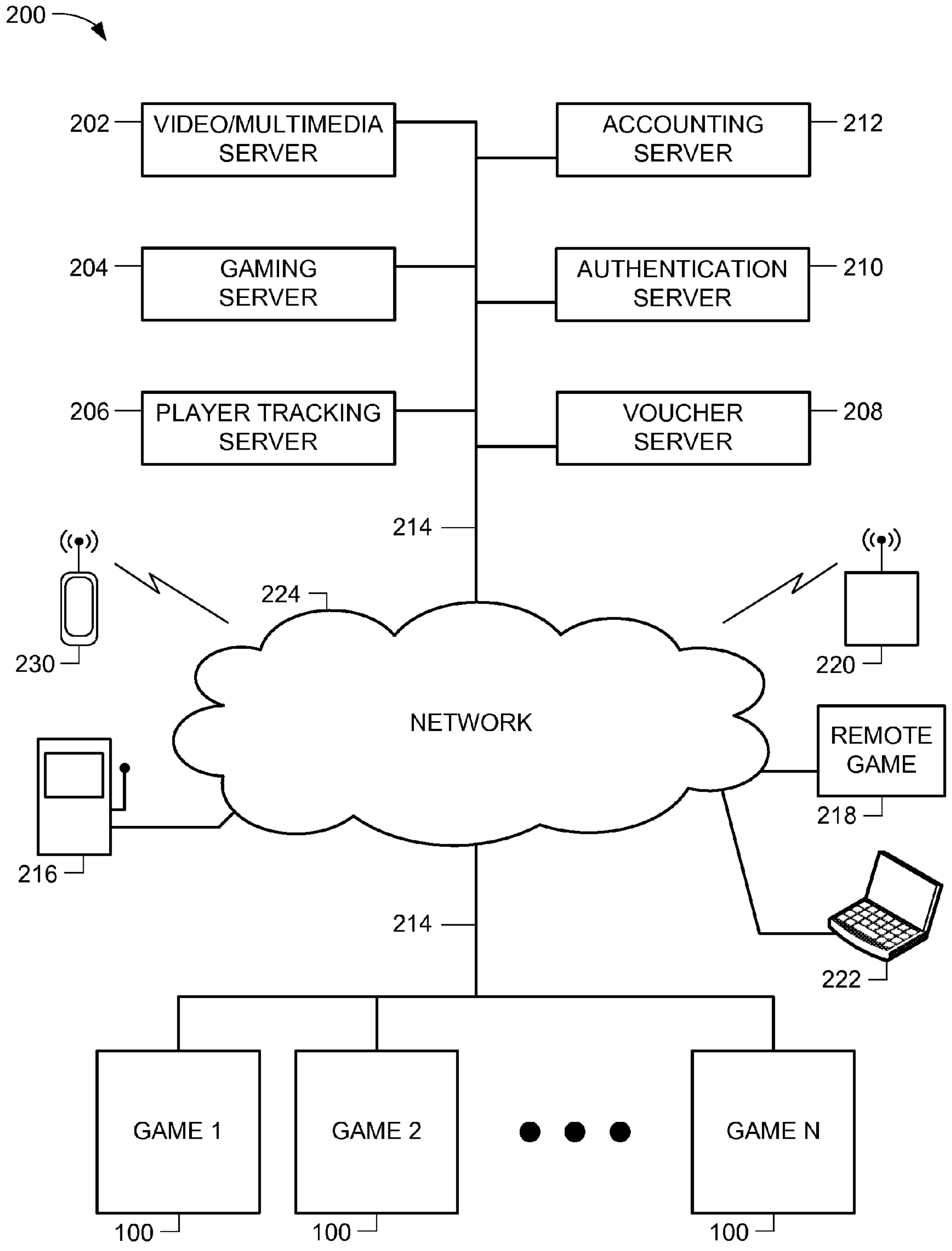
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the Internet, a private network, or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include data from one or more scrape away features, multipliers, columns, rows, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components such as, network interface cards, repeaters and hubs, bridges, switches, routers, firewalls, or any combination thereof may also be part of network 224.

Figure 3:
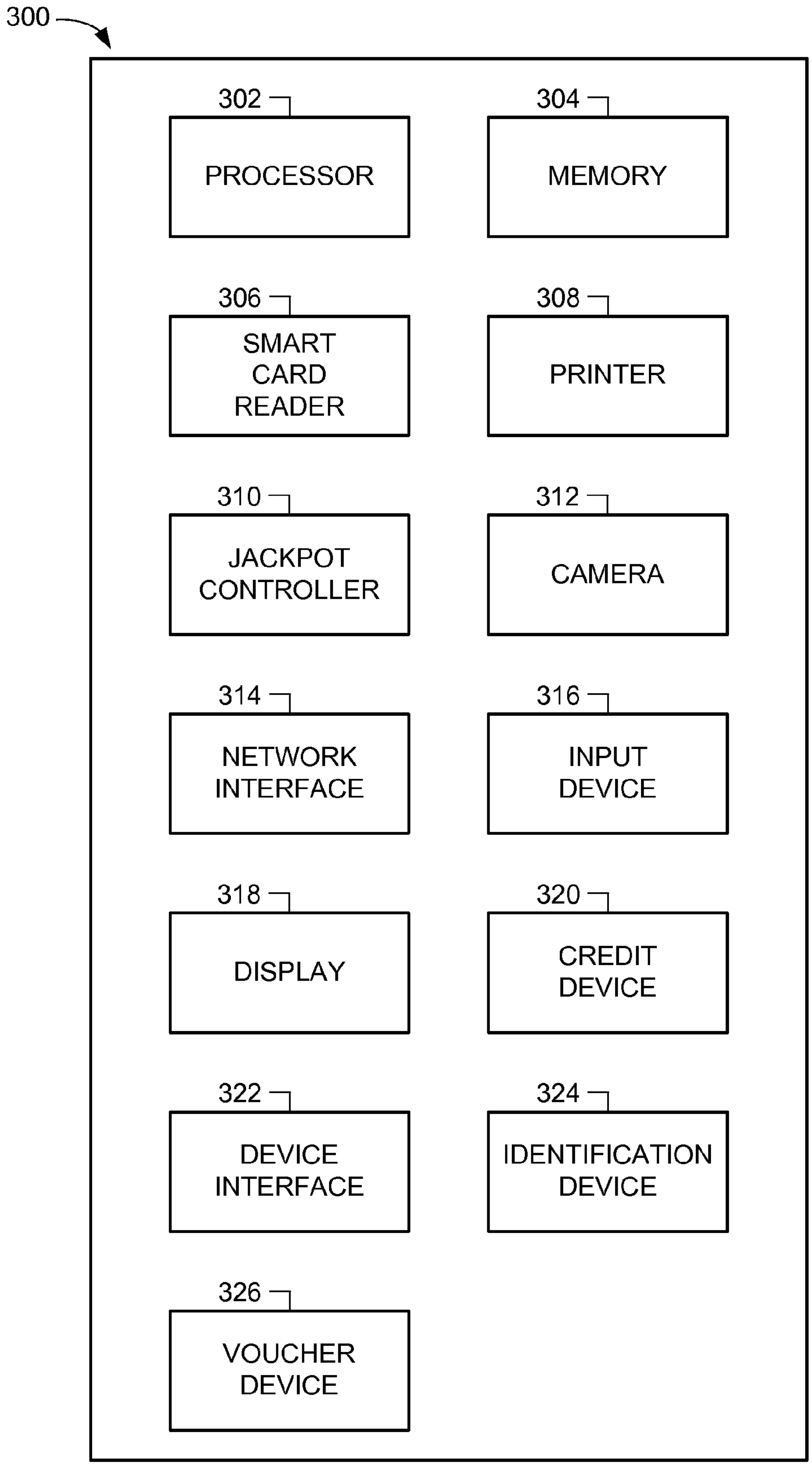
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed waging value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include their image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212.

Input device 316 may be mechanical buttons, electronic buttons, a touch screen, and/or any combination thereof. Input device 316 may be utilized to make a wager, to make an offer to buy or sell a voucher, to determine a voucher's worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow for game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with their mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
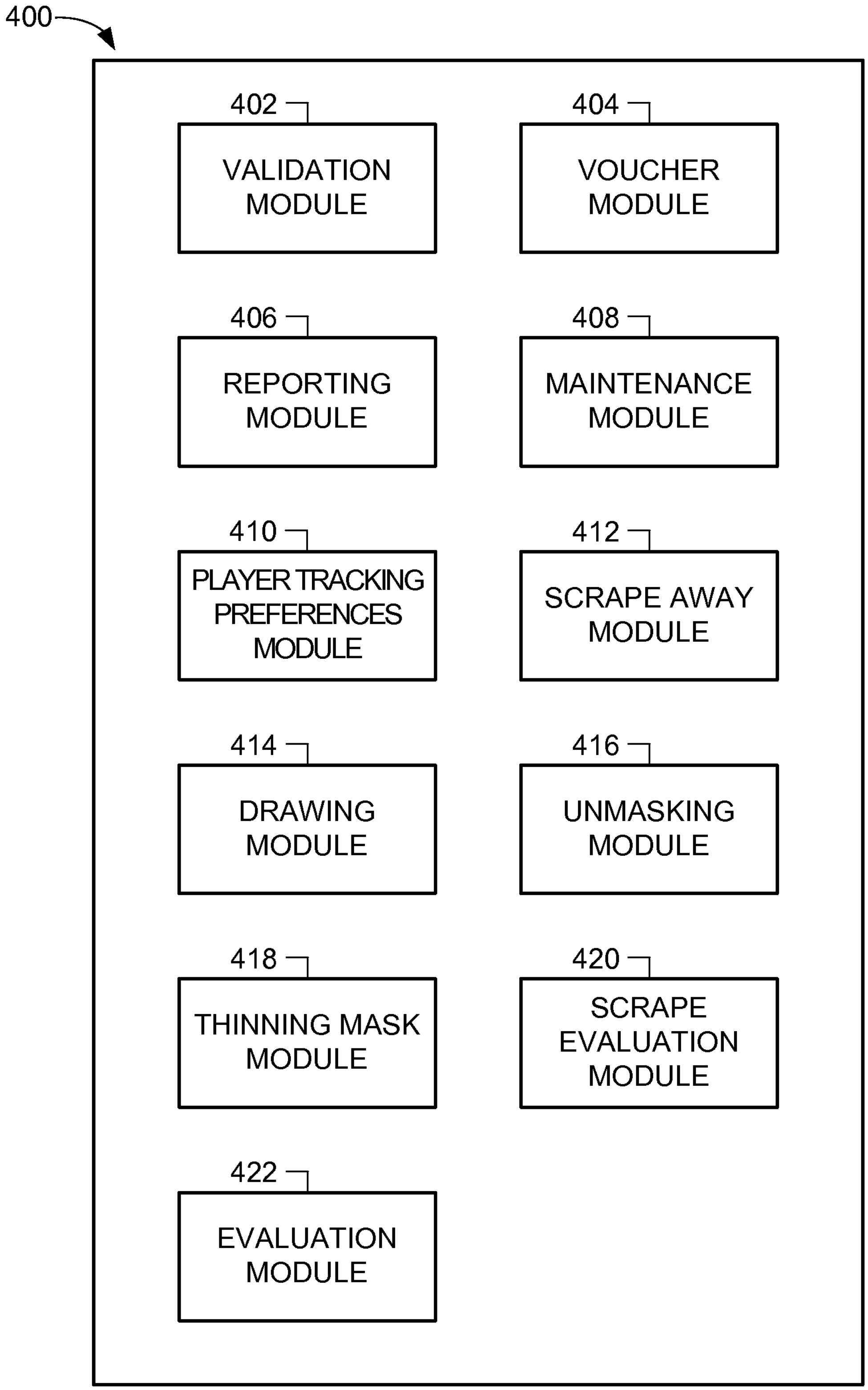
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, a scrape away module 412, a drawing module 414, an unmasking module 416, a thinning mask module 418, a scrape evaluation module 420, and an evaluation module 422.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Scrape away module 412 may include one or more scrape away scenarios, structures, and/or architectures. For example, a first scrape away structure may be based on a leaf pattern. In this example, one or more leafs may be displayed on a screen and a player may remove one or more leafs to uncover one or more awards.

In another example, a second scrape away structure may be based on an acorn pattern. In this example, one or more acorns may be displayed on a screen and a player may remove one or more acorns to uncover one or more awards.

In another example, a third scrape away structure may be based on a building pattern. In this example, one or more building facilities may be displayed on a screen and a player may remove one or more portions (e.g., windows, doors, walls, etc.) of the one or more building facilities to uncover one or more awards.

In another example, a fourth scrape away structure may be based on a lottery ticket pattern. In this example, one or more lottery tickets may be displayed on a screen and a player may remove one or more portions of the lottery tickets to uncover one or more awards.

In another example, a fifth scrape away structure may be based on a dirt pattern. In this example, one or more dirt structures (e.g., mountains, hills, the ground, a field, etc.) may be displayed on a screen and a player may remove one or more portions of the dirt structures to uncover one or more awards.

The awards may be credits, free spins, multipliers, any other items of value, and/or any combination thereof.

Drawing module 414 may provide the functionality to generate one or more of the scrape away scenarios, structures, and/or architectures.

Unmasking module 416 may provide the functionality to generate the visual effects for uncovering the one or more awards and/or the removal of the one or more cover areas. For example, the one or more leafs may be visually removed utilizing one or more removal instruments (e.g., hand, rake, air blower, hoses, etc.). In another example, the one or more acorns may be visually removed utilizing one or more removal instruments (e.g., hand, rake, air blower, hoses, squirrel, etc.). The acorns may be replaced by any other item (e.g., animal, apples, berries, people, specific people (e.g., actors), etc.). In another example, the one or more portions of the one or more building patterns may be visually removed utilizing one or more removal instruments (e.g., hand, gun, tank, airplane, wrecking ball, etc.). In another example, the one or more lottery ticket may be visually removed utilizing one or more removal instruments (e.g., hand, coin, etc.). In another example, the one or more portions of the one or more dirt structures may be visually removed utilizing one or more removal instruments (e.g., hand, pick, spade, shovel, etc.).

Thinning mask module 418 may provide the functionality to generate the visual effects of thinning out the one or more cover areas during the removal process. For example, the one or more leafs may be visually removed utilizing one or more removal instruments (e.g., hand, rake, air blower, hoses, etc.) by passing the removal instrument over the covered area more than one time. In this example, the air blower may be utilized to pass a first air blast over the leafs, which partially uncovers the award and a second air blast over the leafs, which totally uncovers the award. It should be noted that any amount (e.g., 2 to N) of air blasts may be required to uncover the award.

In another example, the one or more portions of the one or more building patterns may be visually removed utilizing one or more removal instruments (e.g., hand, gun, tank, airplane, wrecking ball, etc.) by passing the removal instrument over the covered area more than one time. In this example, a first missile may be utilized to partially uncover an award. A second missile may uncover more of the award but does not allow the player to win the award. A third missile may totally uncover the award which may then be paid out to the player.

In another example, the one or more lottery ticket may be visually removed utilizing one or more removal instruments (e.g., hand, coin, etc.) by passing the removal instrument over the covered area more than one time. In this example, the player may scratch a coin over the lottery ticket in a first area which reveals a portion of the prize. The player may then scratch a coin over the lottery ticket in a second area which reveals the prize.

In another example, the one or more portions of the one or more dirt structures may be visually removed utilizing one or more removal instruments (e.g., hand, pick, spade, shovel, etc.) by passing the removal instrument over the covered area more than one time. In this example, the player may utilize the shovel to remove dirt (and/or a stone) to partial display an award. The player may then utilize the pick to break up a rock and remove the rock. The player may then utilize the spade to remove a fragile item (e.g., a diamond, etc.) and/or work around a threat item (e.g., a land mine, etc.) to obtain the award.

Scrape evaluation module 420 may determine payouts related to game results when a scrape away gaming functionality is utilized.

Evaluation module 414 may determine payouts related to game results when there are no scrape away gaming functionality utilized.

It should be noted that scrape evaluation module 420 and evaluation module 414 may be combined into one module. Further, there may be one evaluation module where the determined payout does not depend on whether there were any wild symbols, scatter symbols, and/or any other specific symbols. Further, any module, device, and/or logic function in electronic gamine device 100 may be present in electronic gaming system 200. In addition, any module, device, and/or logic function in electronic gaming system 200 may be present in electronic gaming device 100.

Figure 5A:
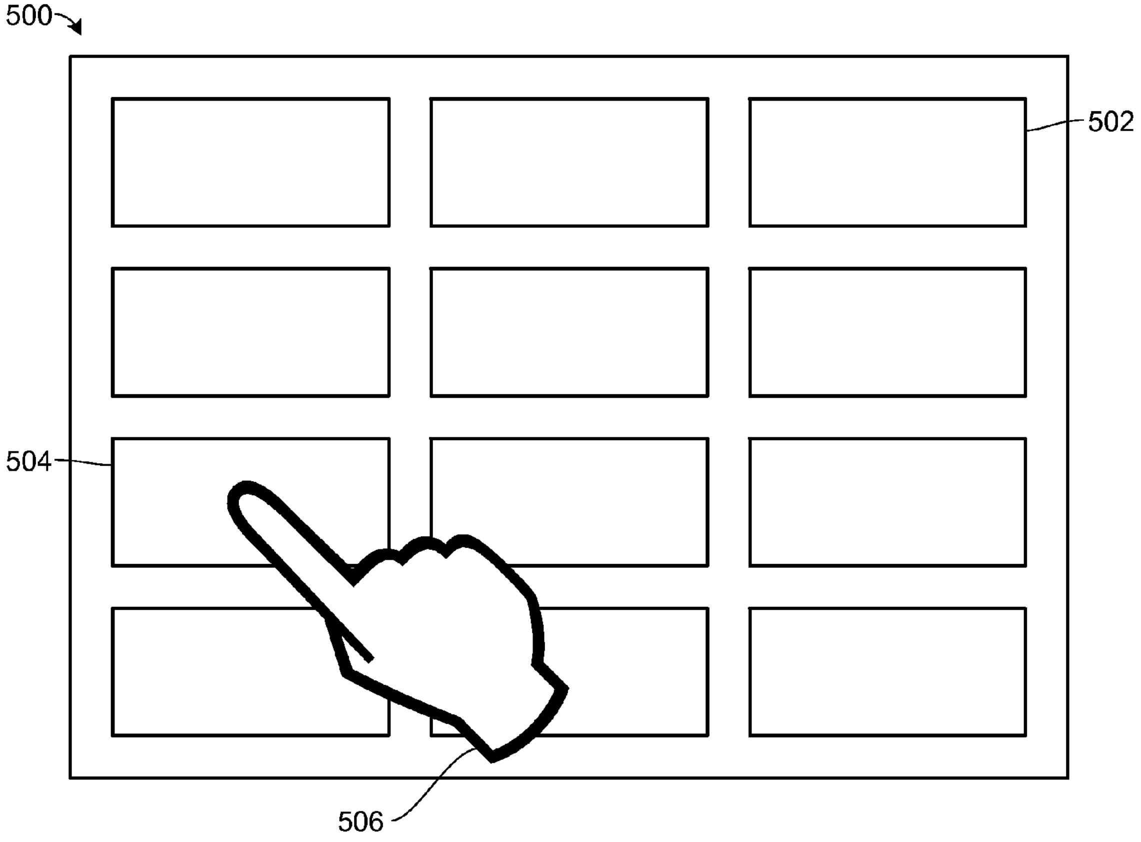
FIG. 5A is an illustration of utilizing a scrape away option on an electronic gaming device, according to one embodiment.

FIG. 5A is an illustration of utilizing a scrape away option on electronic gaming device 100, according to one embodiment. A gaming image 500 may include one or more selection areas 502, a selected area 504, and a selector 506.

Figure 5B:
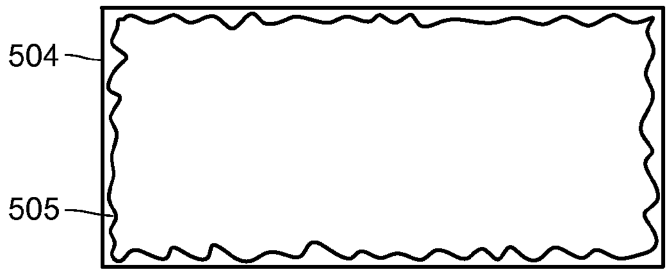
FIG. 5B is another illustration of utilizing a scrape away option on an electronic gaming device, according to one embodiment.

In FIG. 5B, another illustration of utilizing a scrape away option on electronic gaming device 100 is shown, according to one embodiment. In this example, selected area 504 may include a covered area 505. Covered area 505 may be removed utilizing a removal tool to reveal an award.

Figure 5C:
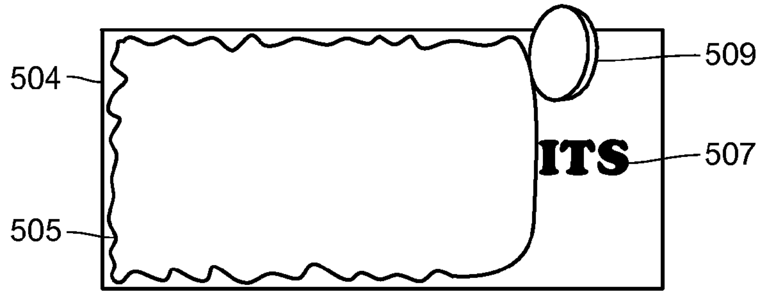
FIG. 5C is another illustration of utilizing a scrape away option on an electronic gaming device, according to one embodiment.

FIG. 5C is an illustration of utilizing a scrape away option on electronic gaming device 100, according to one embodiment. In this example, covered area 505 may be partially (or fully) removed by passing a coin image 509 (e.g., removal tool) over covered area 505 to reveal a portion of an award 507.

Figure 5D:
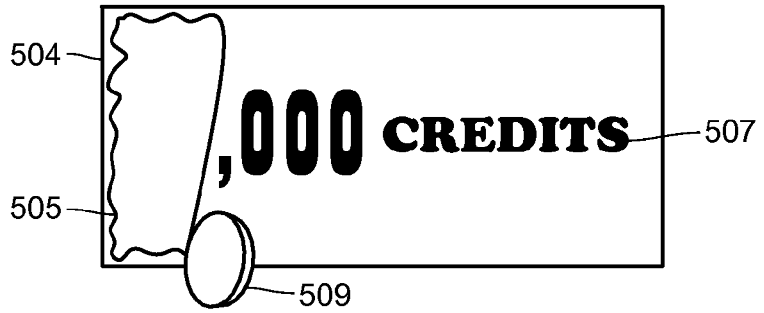
FIG. 5D is another illustration of utilizing a scrape away option on an electronic gaming device, according to one embodiment.

In FIG. 5D, another illustration of utilizing a scrape away option on electronic gaming device 100 is shown, according to one embodiment. In this example, the area removed on covered area 505 may be increased by additional passes of coin image 509 over covered area 505 to reveal more of award 507.

Figure 5E:
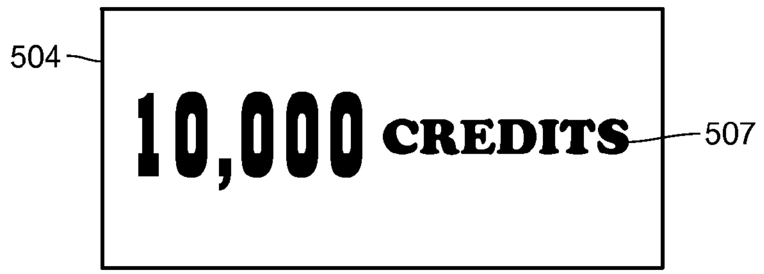
FIG. 5E is another illustration of utilizing a scrape away option on an electronic gaming device, according to one embodiment.

In FIG. 5E, another illustration of utilizing a scrape away option on electronic gaming device 100 is shown, according to one embodiment. In this example, the area removed on covered area 505 may be increased by additional passes of coin image 509 over covered area 505 to reveal all of award 507, which may then be paid out.

In another example, covered area 505 may be totally removed by one pass, two passes, three passes, or any number of passes of removal tool over covered area 505. Further, covered area 505 may be removed by any input from the player, electronic gaming device 100, and/or electronic gaming system 200.

Figure 6A:
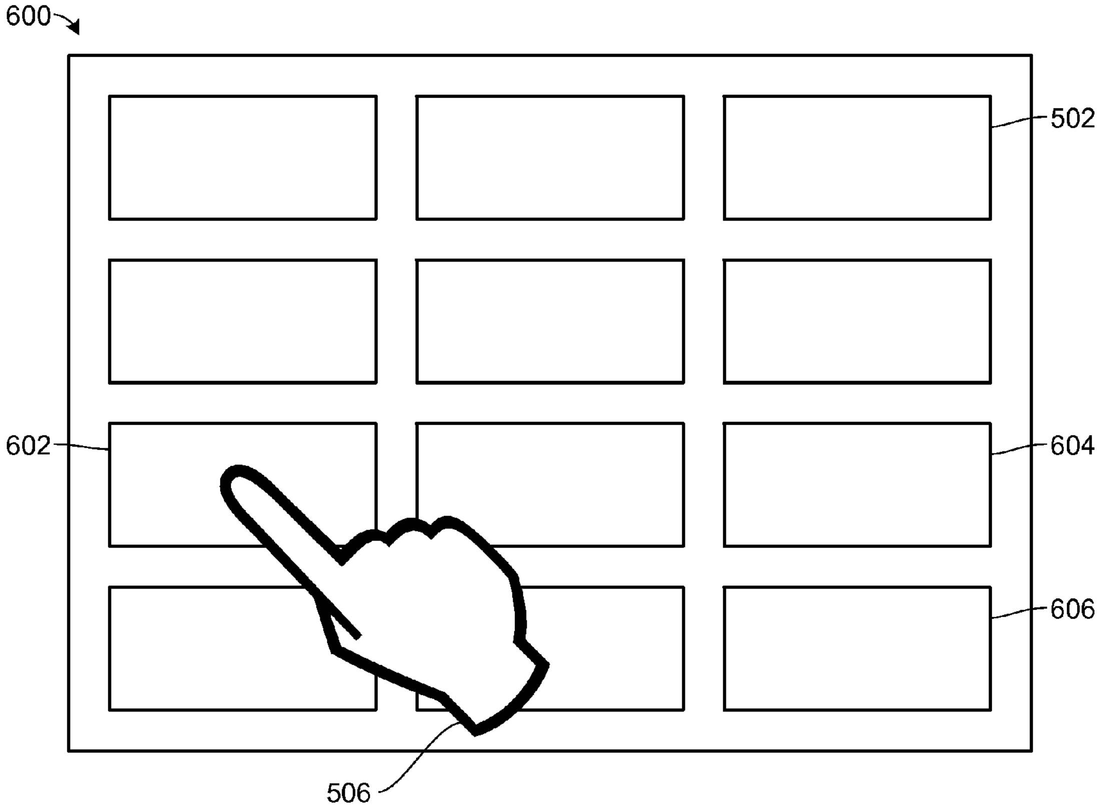
FIG. 6A is an illustration of utilizing a scrape away option on an electronic gaming device, according to one embodiment.

In FIG. 6A, an illustration of utilizing a scrape away option on electronic gaming device 100, according to one embodiment. A gaming image 600 may include one or more selection areas 502, a first selected area 602, a second selected area 604, a third selected area 606, and selector 506. In this example, the player via selector 506 has chosen first selected area 602 (see FIG. 6B), which revealed an award.

Figure 6B:
FIG. 6B is another illustration of utilizing a scrape away option on an electronic gaming device, according to one embodiment.

In FIG. 6B, another illustration of utilizing a scrape away option on electronic gaming device 100, according to one embodiment. In this example, first selected area 602 may include a status bar 608. Status bar 608 may indicate any status relating to any gaming option. For example, status bar 608 indicates that more selections may be made from one or more selection areas 502 because there is no X present in status bar 608. First selected area 602 may include a message indicating the award amount and/or the ability to continue selecting areas from one or more selection areas 502. The award amount may be credits, free spins, multipliers, any item of value, and/or any combination thereof. In this example, the message states “YOU WIN PRIZE PICK AGAIN!” Any data may be utilized to generate the message. For example, you have thirty seconds left to make your final two selections.

Figure 6C:
FIG. 6C is another illustration of utilizing a scrape away option on an electronic gaming device, according to one embodiment.

In FIG. 6C, another illustration of utilizing a scrape away option on electronic gaming device 100, according to one embodiment. In this example, second selected area 604 may include status bar 608. Status bar 608 may indicate that more selections may be made from one or more selection areas 502 because there is no X present in status bar 608. Second selected area 604 may include a message indicating the award amount and/or the ability to continue selecting areas from one or more selection areas 502. The award amount may be credits, free spins, multipliers, any item of value, and/or any combination thereof. In this example, the message states "YOU WIN PRIZE PICK AGAIN!"

Figure 6D:
FIG. 6D is another illustration of utilizing a scrape away option on an electronic gaming device, according to one embodiment.

In FIG. 6D, another illustration of utilizing a scrape away option on electronic gaming device 100, according to one embodiment. In this example, third selected area 606 may include status bar with a game over indication 610. Status bar may indicate that no more selections may be made from one or more selection areas 502 because there is an X present in status bar. Third selected area 606 may include a message indicating the award amount and/or the ability to continue selecting areas from one or more selection areas 502. The award amount may be credits, free spins, multipliers, any item of value, and/or any combination thereof. In this example, the message states "GAME OVER".

Figure 7A:
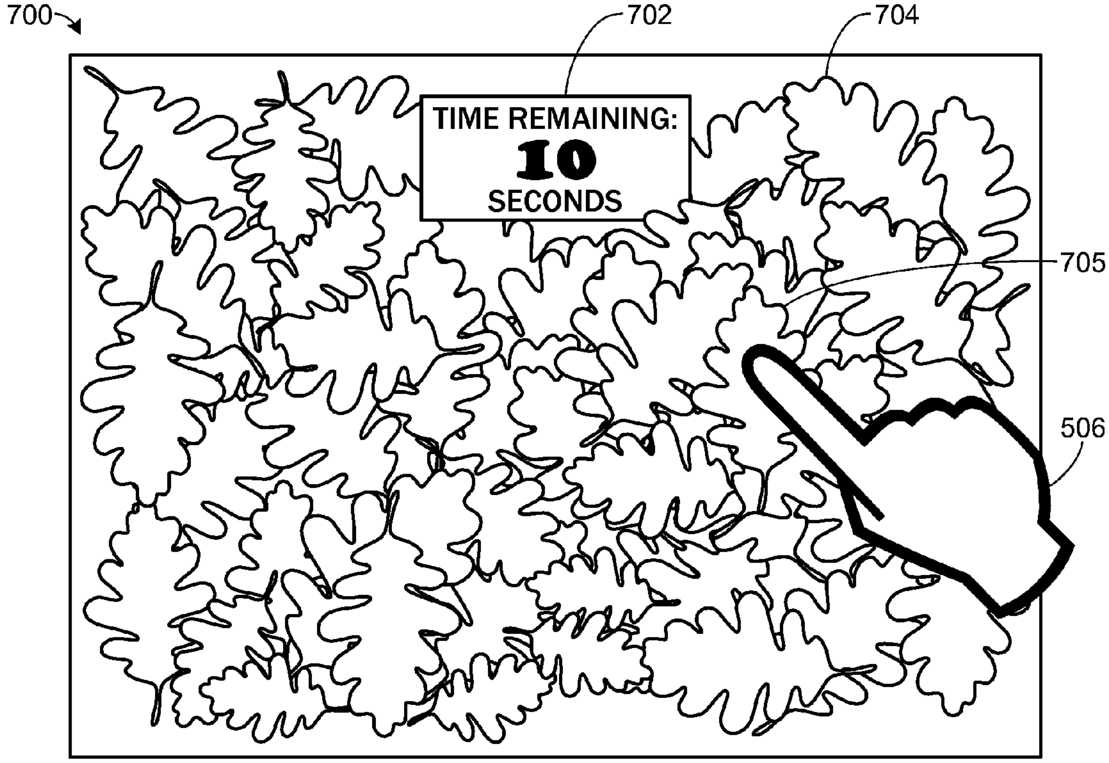
FIG. 7A is an illustration of utilizing a scrape away option on an electronic gaming device, according to one embodiment.

In FIG. 7A, an illustration of utilizing a scrape away option on an electronic gaming device is shown, according to one embodiment. A first scrape away gaming image 700 may include a timer 702, one or more removable objects 704, and selector 506. The player may utilize selector 506 to select a first selected object 705. First selected object 705 may be removed from first scrape away gaming image 700 (see FIG. 7B). In this example, the scrape away game has a timing element present. Timer 702 shows that the time remaining is 10 seconds. In another embodiment, there may be no timing element. In another embodiment, there be a predetermined number of picks that may occur. In another embodiment, the prize may be additional picks and/or additional time. For example, a prize may be revealed which increases timer 702 by a predetermined and/or randomly determined amount of time (e.g., 5 seconds, 10 seconds, 30 seconds, 2 minutes, etc.) In another example, a prize may be revealed which increases the amount of picks (e.g., 1 additional pick, 2 additional picks, etc.). The prize may combine the increase in time, picks, credits, free spins, multipliers, and/or any item of value.

Figure 7B:
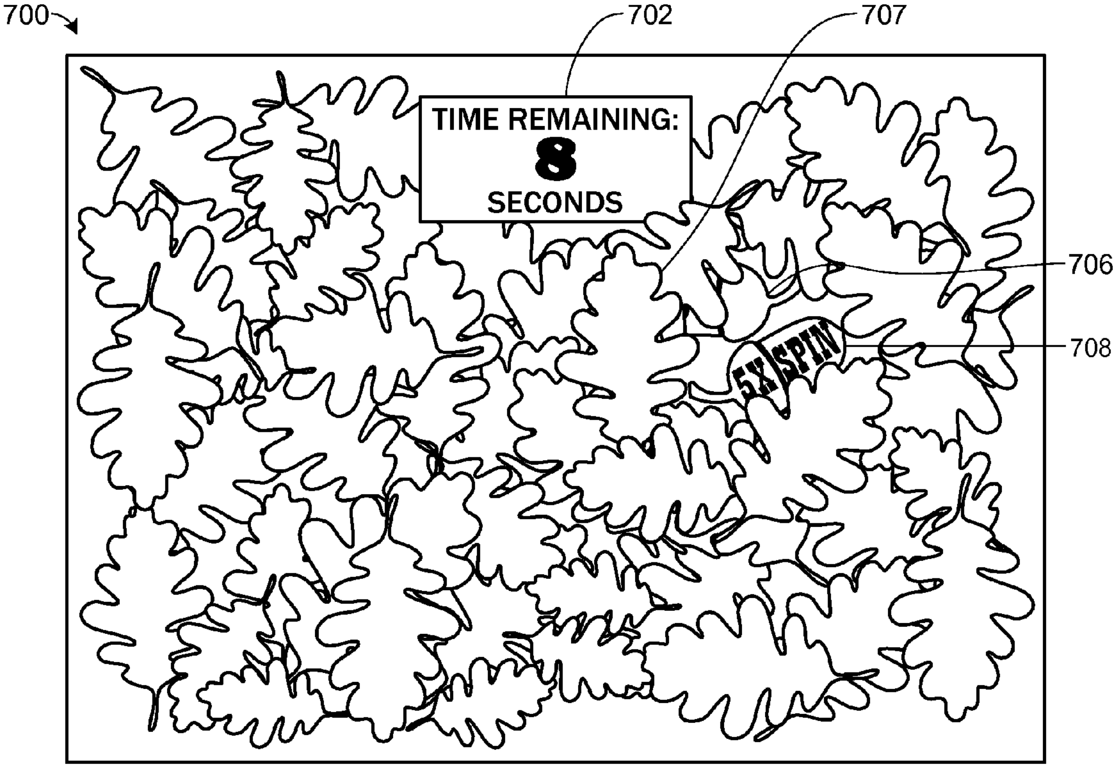
FIG. 7B is another illustration of utilizing a scrape away option on an electronic gaming device, according to one embodiment.

In FIG. 7B, another illustration of utilizing a scrape away option on an electronic gaming device is shown, according to one embodiment. After first selected object 705 has been removed, first scrape away gaming image 700 may include a first revealed prize 708 and a first partially revealed prize 706. First revealed prize 708 may be a prize that is won without any further removal of one or more removable objects 704. Whereas, first partially revealed prize 706 may be a prize that is not won until further removable objects 704 are removed. The prize associated with first revealed prize 708 may be credits, free spins, multipliers, any item of value, or any combination thereof. In this example, the prize was free spins. First partially revealed prize 706 may be completely revealed (e.g., unlocked) if the player selects a second selected object 707 (see FIG. 7C). The player may select another removable object 704 because timer 702 shows that the time remaining is 8 seconds.

Figure 7C:
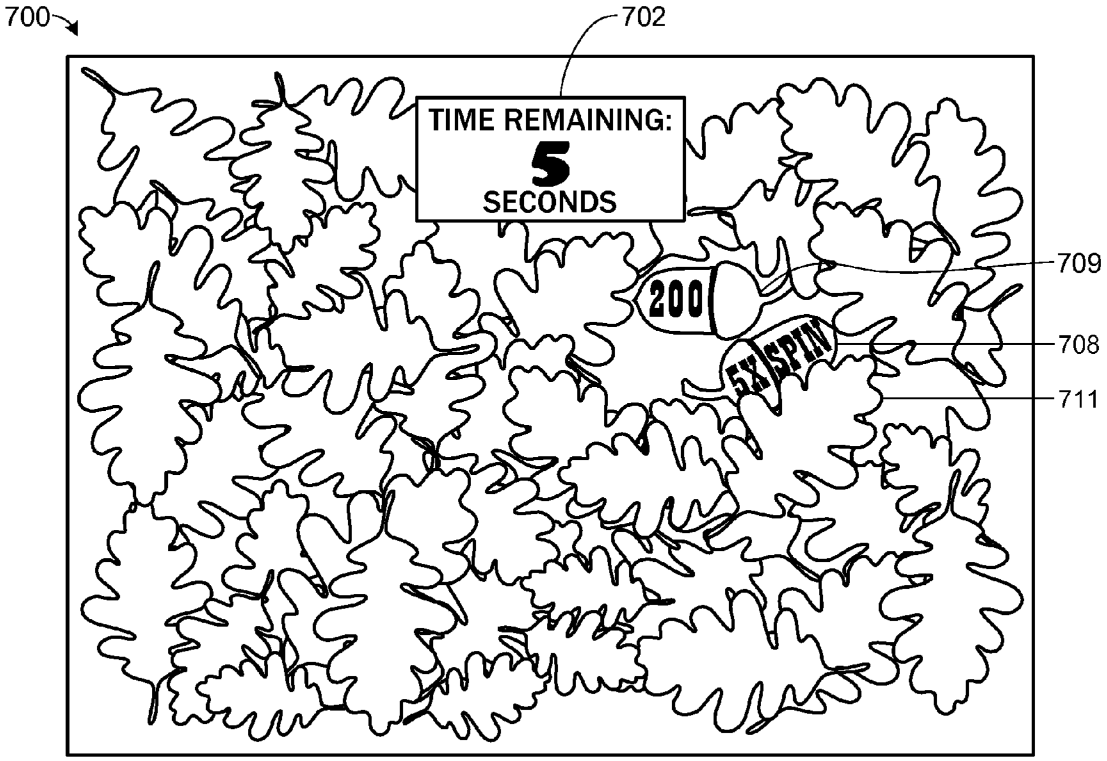
FIG. 7C is another illustration of utilizing a scrape away option on an electronic gaming device, according to one embodiment.

In FIG. 7C, another illustration of utilizing a scrape away option on an electronic gaming device is shown, according to one embodiment. After second selected object 707 has been removed, first scrape away gaming image 700 may include first revealed prize 708, a second revealed prize 709, and no partially revealed prizes. First revealed prize 708 and second revealed prize 709 may be prizes that are won without any further removal of one or more removable objects 704. The player may select another removable object 704 because timer 702 shows that the time remaining is 5 seconds. The player may select via selector 506 a third selected object 711.

Figure 7D:
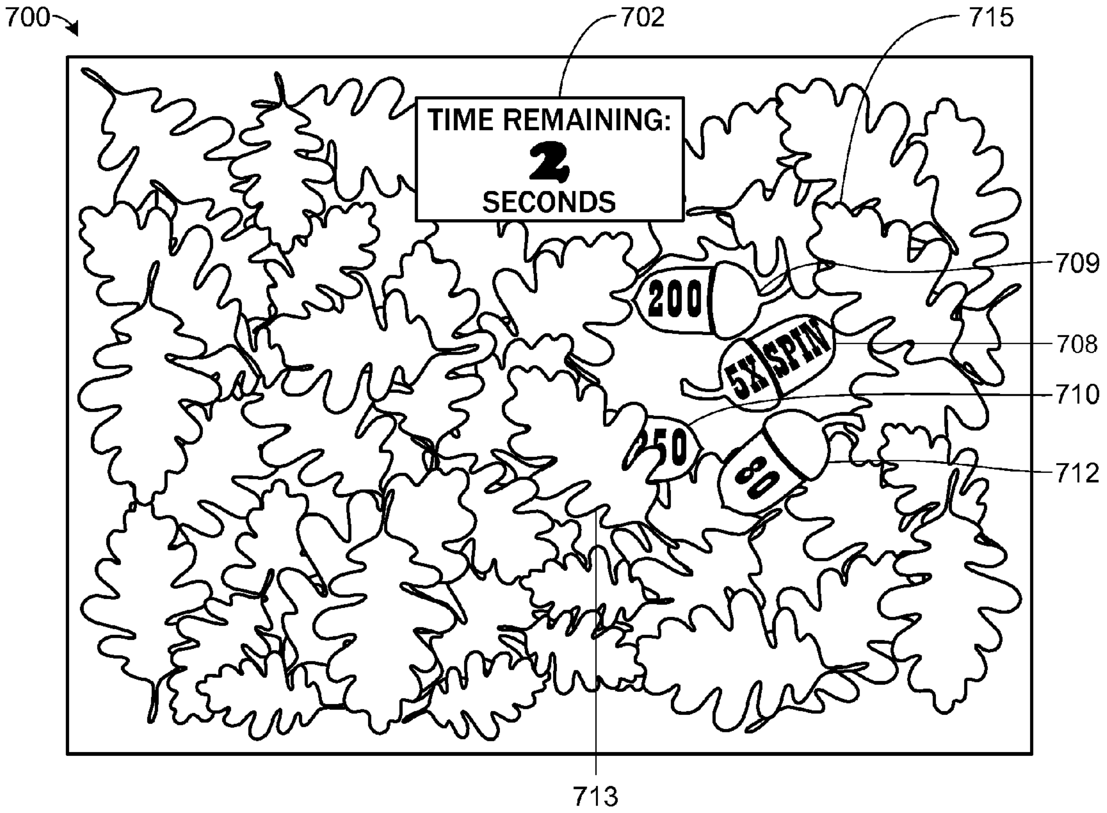
FIG. 7D is another illustration of utilizing a scrape away option on an electronic gaming device, according to one embodiment.

In FIG. 7D, another illustration of utilizing a scrape away option on an electronic gaming device is shown, according to one embodiment. After third selected object 711 has been removed, first scrape away gaming image 700 may include first revealed prize 708, second revealed prize 706, a third revealed prize 712, and a second partially revealed prize 710. First revealed prize 708, second revealed prize 706, and third revealed prize 712 may be prizes that are won without any further removal of one or more removable objects 704. Whereas, second partially revealed prize 710 may be a prize that is not won until further removable objects 704 are removed. Second partially revealed prize 710 may be completely revealed (e.g., unlocked) if the player selects a fourth selected object 713 (see FIG. 7E). The player may select another removable object 704 because timer 702 shows that the time remaining is 2 seconds. In this example, the player may be allowed to select more than one removable object. This may be based on the timer running out (e.g., the game is almost over), randomly determined, predetermined time periods, and/or any other game criteria. In this case, the player has selected both fourth selected object 713 and a fifth selected object 715 (see FIG. 7E).

Figure 7E:
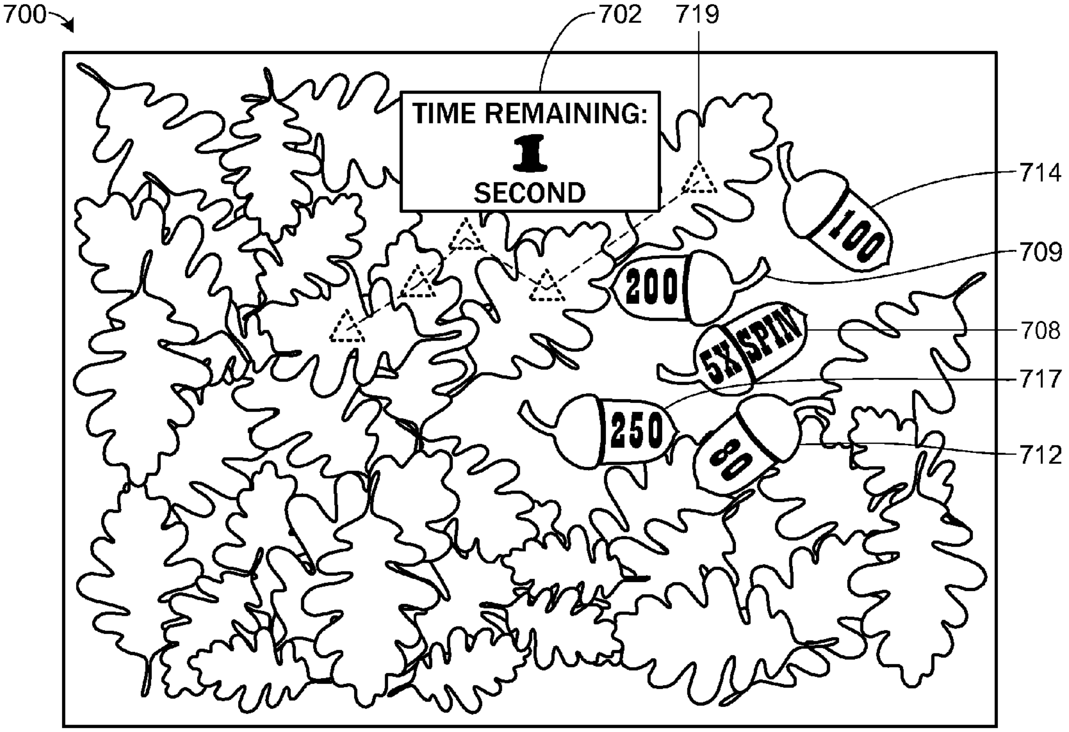
FIG. 7E is another illustration of utilizing a scrape away option on an electronic gaming device, according to one embodiment.

In FIG. 7E, another illustration of utilizing a scrape away option on an electronic gaming device is shown, according to one embodiment. After fourth selected object 713 and fifth selected object 715 have been removed, first scrape away gaming image 700 may include first revealed prize 708, second revealed prize 706, third revealed prize 712, a fourth revealed prize 714, and a fifth revealed prize 717, and no partially revealed prize. First revealed prize 708, second revealed prize 706, third revealed prize 712, fourth revealed prize 714, and fifth revealed prize 717 may be prizes that are won without any further removal of one or more removable objects 704. The player may select another removable object 704 because timer 702 shows that the time remaining is 1 second. In this example, the selectable areas may have increased in size based on the timer running out (e.g., the game is almost over), randomly determined, predetermined time periods, and/or any other game criteria. In this case, the player has selected a sixth selected object 719 (see FIG. 7F).

Figure 7F:
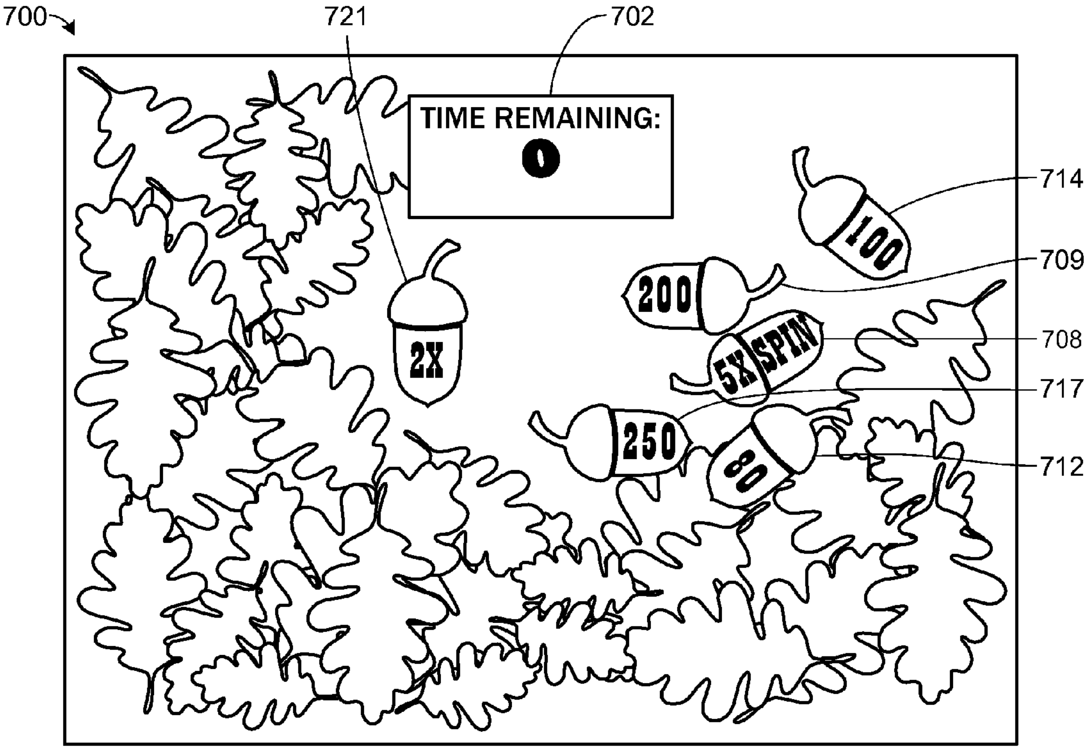
FIG. 7F is another illustration of utilizing a scrape away option on an electronic gaming device, according to one embodiment.

In FIG. 7F, another illustration of utilizing a scrape away option on an electronic gaming device is shown, according to one embodiment. After sixth selected object 719 has been removed, first scrape away gaming image 700 may include first revealed prize 708, second revealed prize 706, third revealed prize 712, fourth revealed prize 714, fifth revealed prize 717, and a sixth revealed prize 721, and no partially revealed prize. First revealed prize 708, second revealed prize 706, third revealed prize 712, fourth revealed prize 714, fifth revealed prize 717, and sixth revealed prize 721 may be prizes that are won without any further removal of one or more removable objects 704. In this example, sixth revealed prize 721 is a multiplier of 2×. This multiplier may increase all of the previous credits won, may increase all past and future credits won, may increase the amount of free spins won in the past and/or the future, may increase another multiplier to generate a super multiplier (e.g., a previously won 3× multiplier may be increased to 5× (e.g., 3× plus 2×) or the previously won 3× multiplier may be increased to 6× (e.g., 3× times 2×)). The player may not select another removable object 704 because timer 702 shows that the time remaining is 0 second.

Figure 7G:
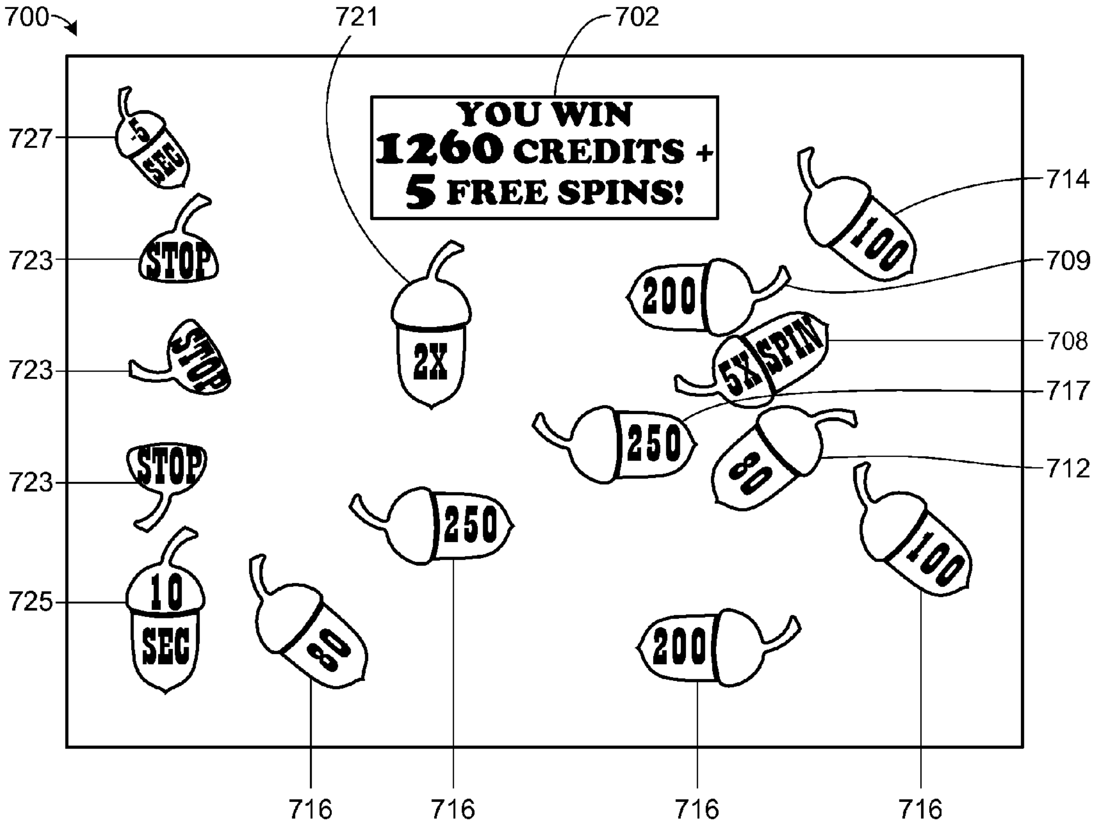
FIG. 7G is another illustration of utilizing a scrape away option on an electronic gaming device, according to one embodiment.

In FIG. 7G, another illustration of utilizing a scrape away option on an electronic gaming device is shown, according to one embodiment. First scrape away gaming image 700 may reveal all of potential prizes, game extenders, game limiters, and stoppers. In this example, first scrape away gaming image 700 shows the prizes that were won from first revealed prize 708, second revealed prize 706, third revealed prize 712, fourth revealed prize 714, fifth revealed prize 717, and sixth revealed prize 721. Further, first scrape away gaming image 700 may show prizes that were not won, such as one or more non-won prizes 716. In addition, first scrape away gaming image 700 may show a first game extender 725 which would have added 10 seconds to timer 702. First scrape away gaming image 700 may show a first game limiter 727 which would have decrease timer 702 by 5 seconds. In other embodiments, the time increases/decrease may be replaced with pick increases/decreases. First scrape away gaming image 700 may show one or more game stoppers 723, which would have ended game play. In this example, timer 702 may now display the outcome of game play, which was that the player won 1260 credits (e.g., 630 times the 2× multiplier) and 5 free spins.

Figure 8:
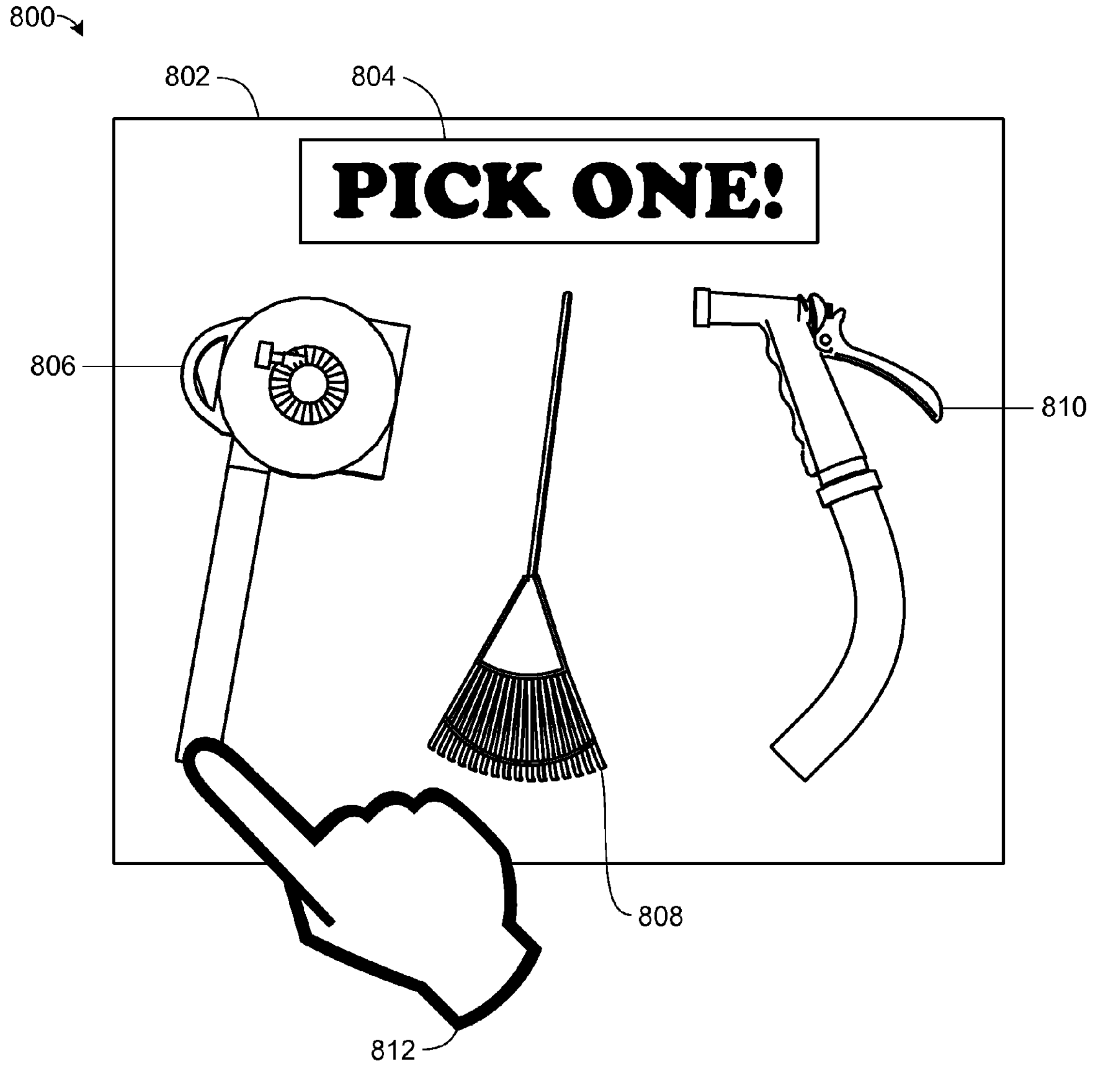
FIG. 8 is a tool selection illustration, according to one embodiment.

In FIG. 8, a tool selection illustration 800 is shown, according to one embodiment. A tool selection image 802 may include a message 804, a first tool 806, a second tool 808, a third tool 810, and a tool selection input device 812. In this example, message 804 may request that the player select one of the tools to be utilized in a selection/removal process to interact with one or more removable objects 704. In this example, first tool 806 may be displayed as a blower, second tool 808 may be displayed as a rake, and third tool 810 may be displayed as a hose. Each tool may have a different reach (e.g., effective removal area). For example, first tool 806 may have a first reach (e.g., 1 unit), second tool 808 may have a second reach (e.g., 2 units), and third tool 810 may have a third reach (e.g., 3 units). In addition, each tool may have any reach in any direction. Further, one or more tools may have the same reach characteristics.

Each tool may be utilized a different number of times. For example, first tool 806 may be utilized a first number of times (e.g., 5 times), second tool 808 may be utilized a second number of times (e.g., 3 times), and third tool 810 may be utilized a third number of times (e.g., 2 times). In addition, each tool may be utilized any number of times. Further, one or more tools may have the same utilization characteristics (e.g., number of times utilized).

Figure 9A:
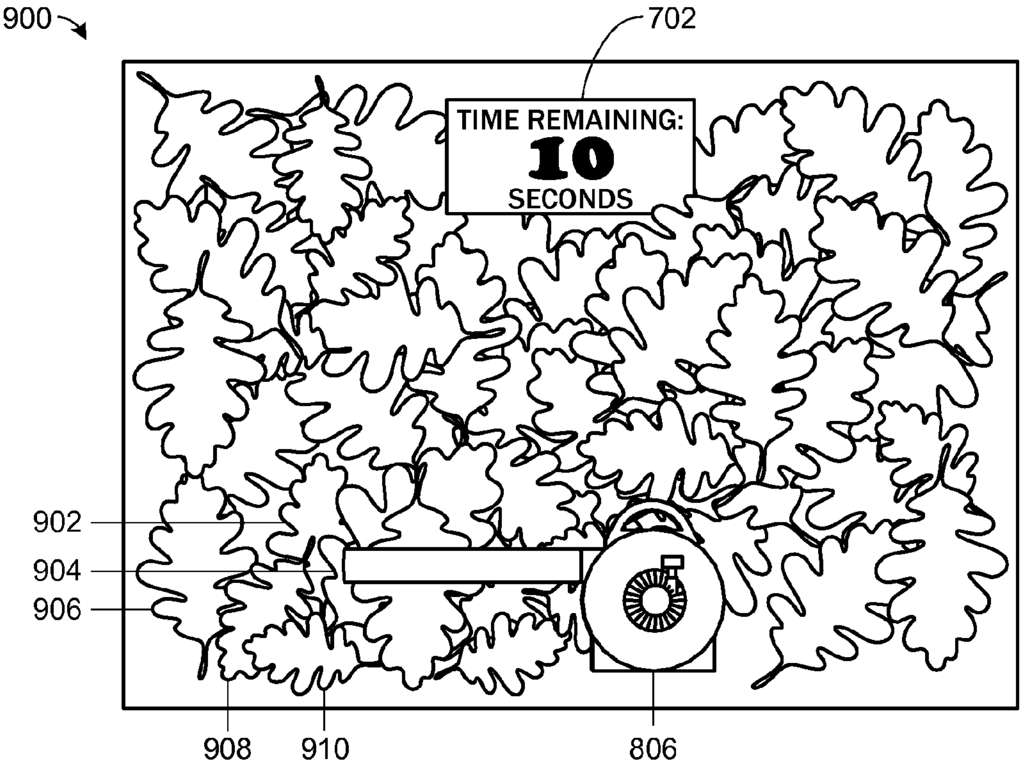
FIG. 9A is an illustration of utilizing a scrape away option on an electronic gaming device, according to one embodiment.

In FIG. 9A, an illustration of utilizing a scrape away option on an electronic gaming device is shown, according to one embodiment. A first gaming image 900 may include timer 702 and first tool 806. In this example, the player has selected first tool 806 to remove one or more removable objects 704.

Figure 9B:
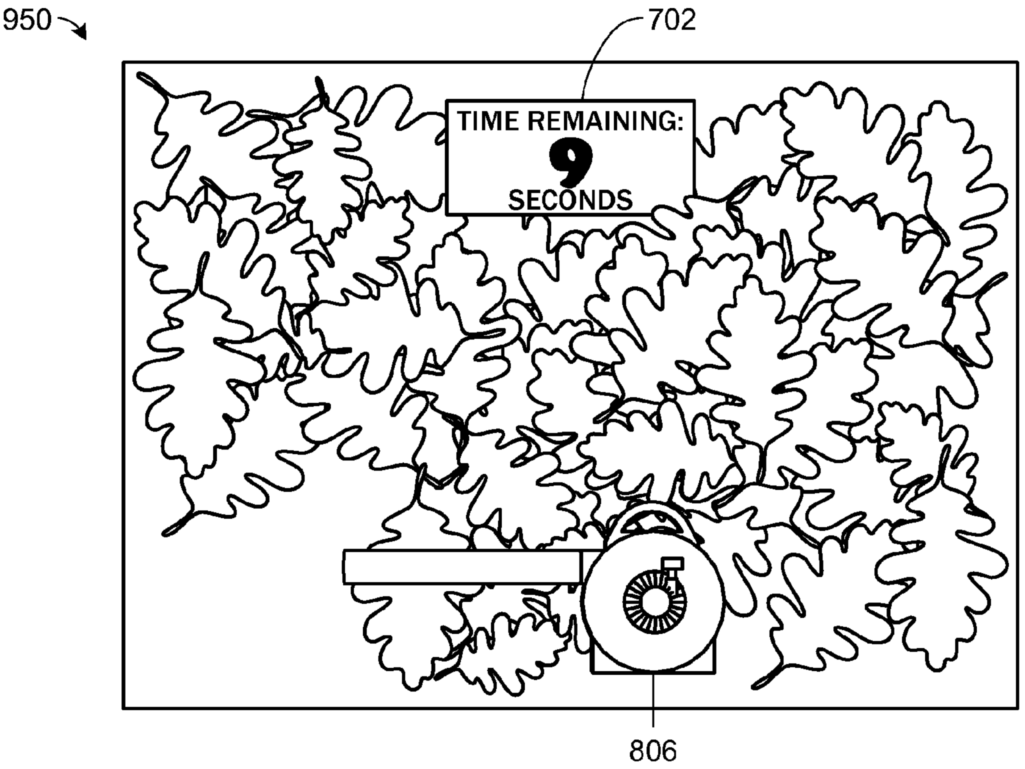
FIG. 9B is another illustration of utilizing a scrape away option on an electronic gaming device, according to one embodiment.

In FIG. 9B, another illustration of utilizing a scrape away option on an electronic gaming device is shown, according to one embodiment. A second gaming image 950 shows that a first removable object 902, a second removable object 904, a third removable object 906, a fourth removable object 908, and a fifth removable object 910 were removed by utilizing first tool 806. In this example, first tool 806 had a reach of 5.

Figure 10A:
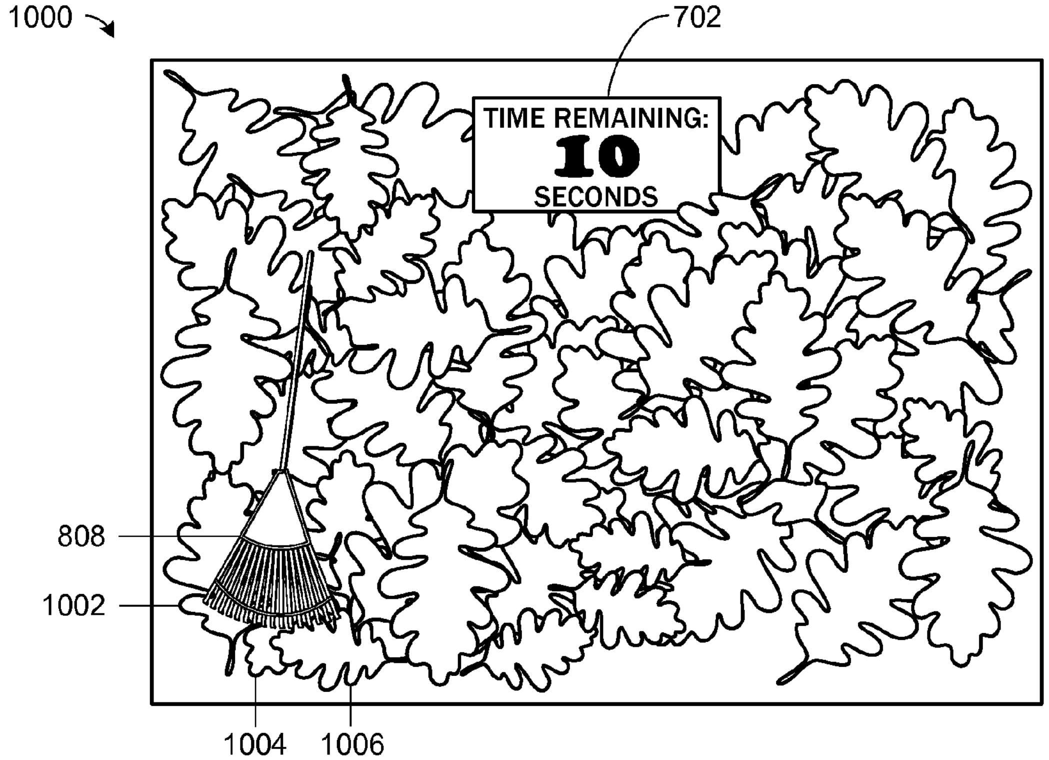
FIG. 10A is another illustration of utilizing a scrape away option on an electronic gaming device, according to one embodiment.

In FIG. 10A, an illustration of utilizing a scrape away option on an electronic gaming device is shown, according to one embodiment. A third gaming image 1000 may include timer 702 and second tool 808. In this example, the player has selected second tool 808 to remove one or more removable objects 704.

Figure 10B:
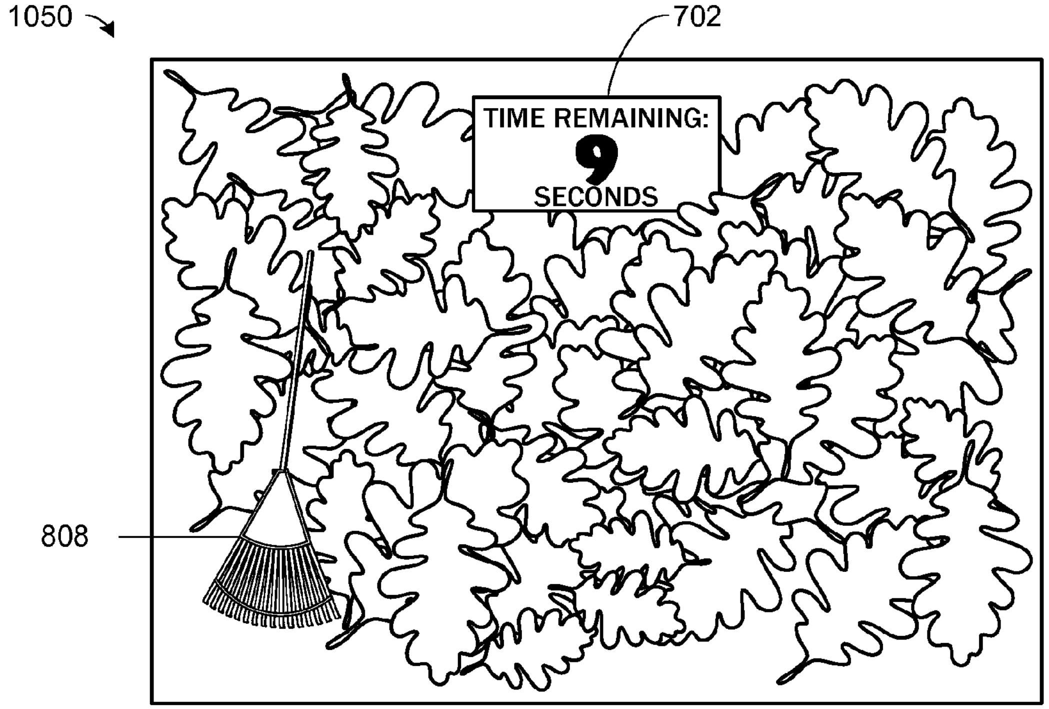
FIG. 10B is another illustration of utilizing a scrape away option on an electronic gaming device, according to one embodiment.

In FIG. 10B, another illustration of utilizing a scrape away option on an electronic gaming device is shown, according to one embodiment. A fourth gaming image 1050 shows that a sixth removable object 1002, a seventh removable object 1004, and an eighth removable object 1006 were removed by utilizing second tool 808. In this example, second tool 808 had a reach of 3.

Figure 11A:
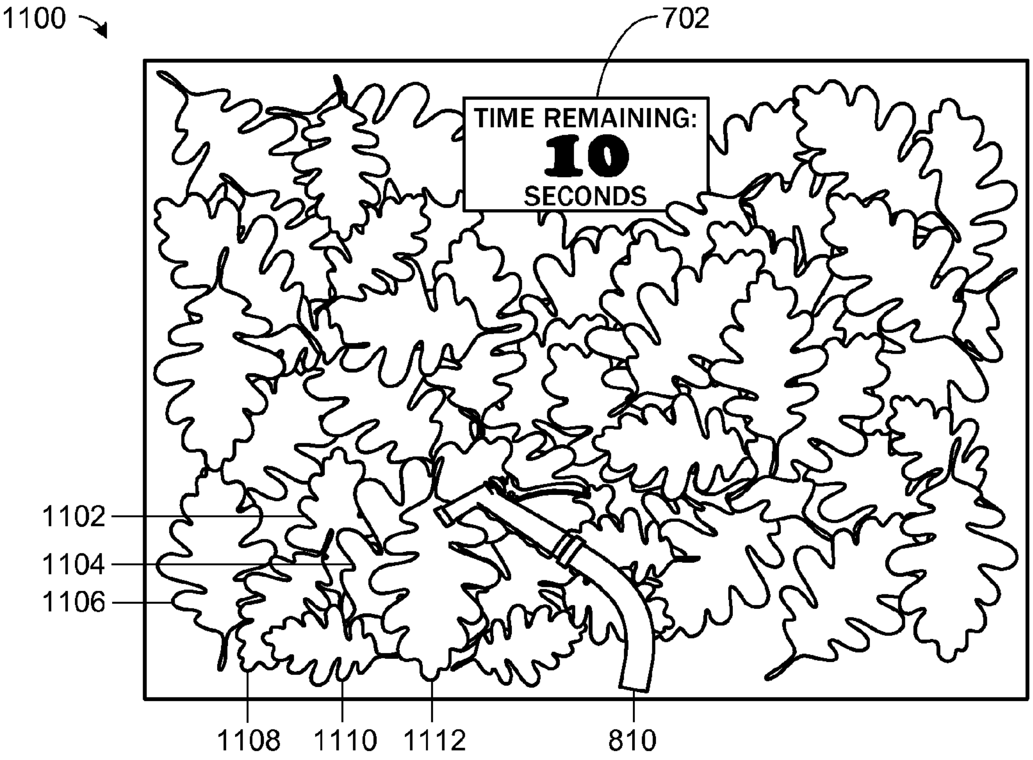
FIG. 11A is another illustration of utilizing a scrape away option on an electronic gaming device, according to one embodiment.

In FIG. 11A, an illustration of utilizing a scrape away option on an electronic gaming device is shown, according to one embodiment. A fifth gaming image 1100 may include timer 702 and third tool 810. In this example, the player has selected third tool 810 to remove one or more removable objects 704.

Figure 11B:
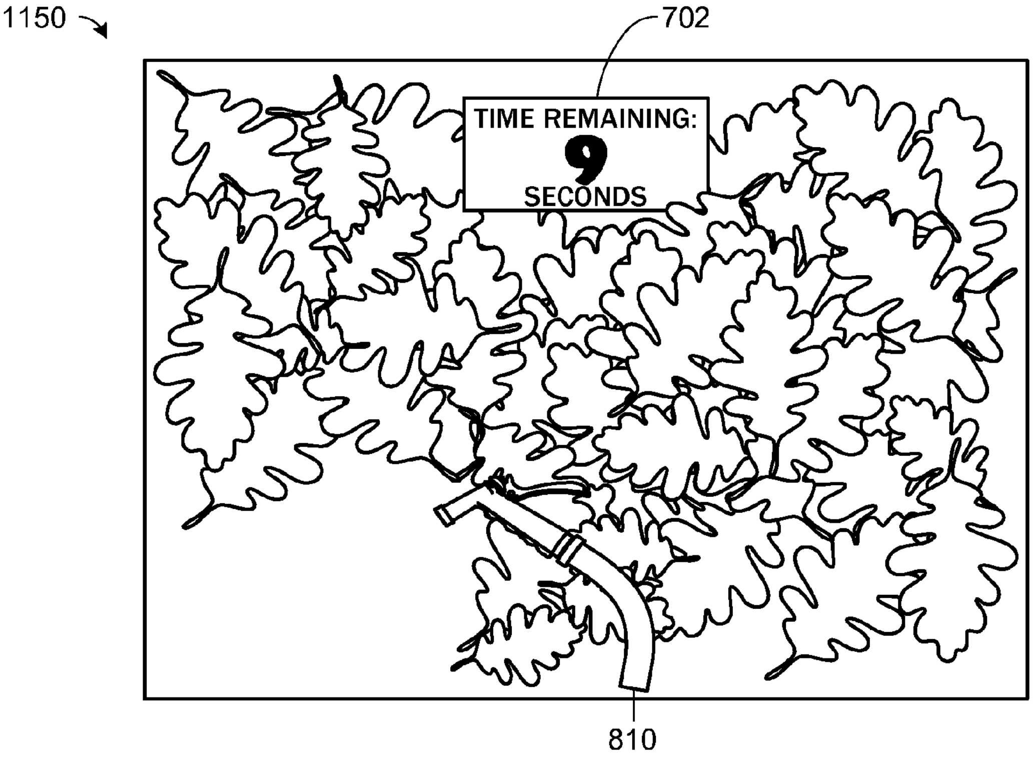
FIG. 11B is another illustration of utilizing a scrape away option on an electronic gaming device, according to one embodiment.

In FIG. 11B, another illustration of utilizing a scrape away option on an electronic gaming device is shown, according to one embodiment. A sixth gaming image 1150 shows that a ninth removable object 1102, a tenth removable object 1104, an eleventh removable object 1106, a twelfth removable object 1108, a thirteenth removable object 1110, and a fourteenth removable object 1112 were removed by utilizing third tool 810. In this example, third tool 810 had a reach of 6.

In these examples, the reach may be in any direction and the tools may be utilized any number of times.

Figure 12:
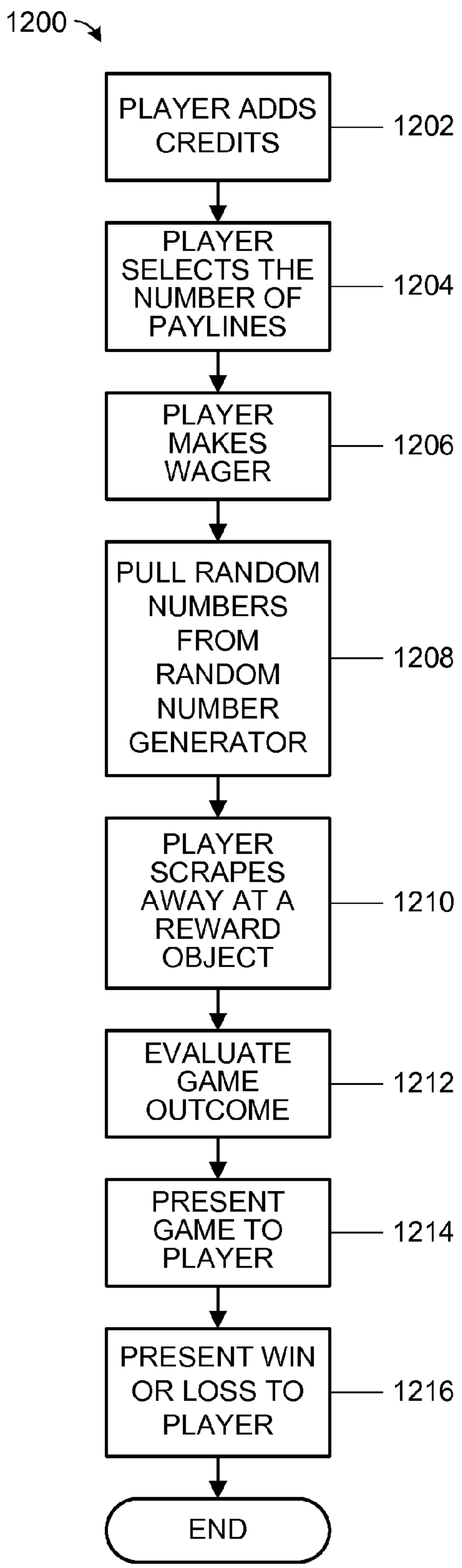
FIG. 12 is a flow diagram for utilizing one or more scrape away options, according to one embodiment.

In FIG. 12, a flow diagram for scrape away gaming 1200 is shown. The method may include the starting of the game. The method may include the player adding credits to electronic gaming device 100 and/or electronic gaming system 200 (step 1202). The method may include the selection of the number of paylines (step 1204). The method may include the placing of a wager (step 1206). The method may include electronic gaming device 100 and/or electronic gaming system 200 pulling random numbers from a random number generator (step 1208). The method may include the scraping away of a cover area over a reward object (step 1210). The method may include the evaluation of the game outcome (step 1212). This evaluation may include the evaluation of the primary game and/or an evaluation of the reward object. The method may include displaying the game presentation (step 1214). The method may include presenting a winning or losing outcome to the player (step 1216). The method may end.

The method may include the starting of the game. The method may include the player adding credits to electronic gaming device 100. The method may include the player selecting the number of paylines to utilize. The method may include the player making a primary wager on one or more paylines. The method may further include the player making a secondary wager to enable a scrape away option. The method may include receiving input relating to utilizing a scrape away option. The method may include electronic gaming device 100 pulling random numbers from the random number generator. The method may include the evaluation of the game outcome for the primary wager. The method may further include the evaluation of the game outcome for the secondary wager. The method may include presenting the game play to the player. The method may include presenting the game outcome (win or loss) to the player. The method may then end.

Figure 13:
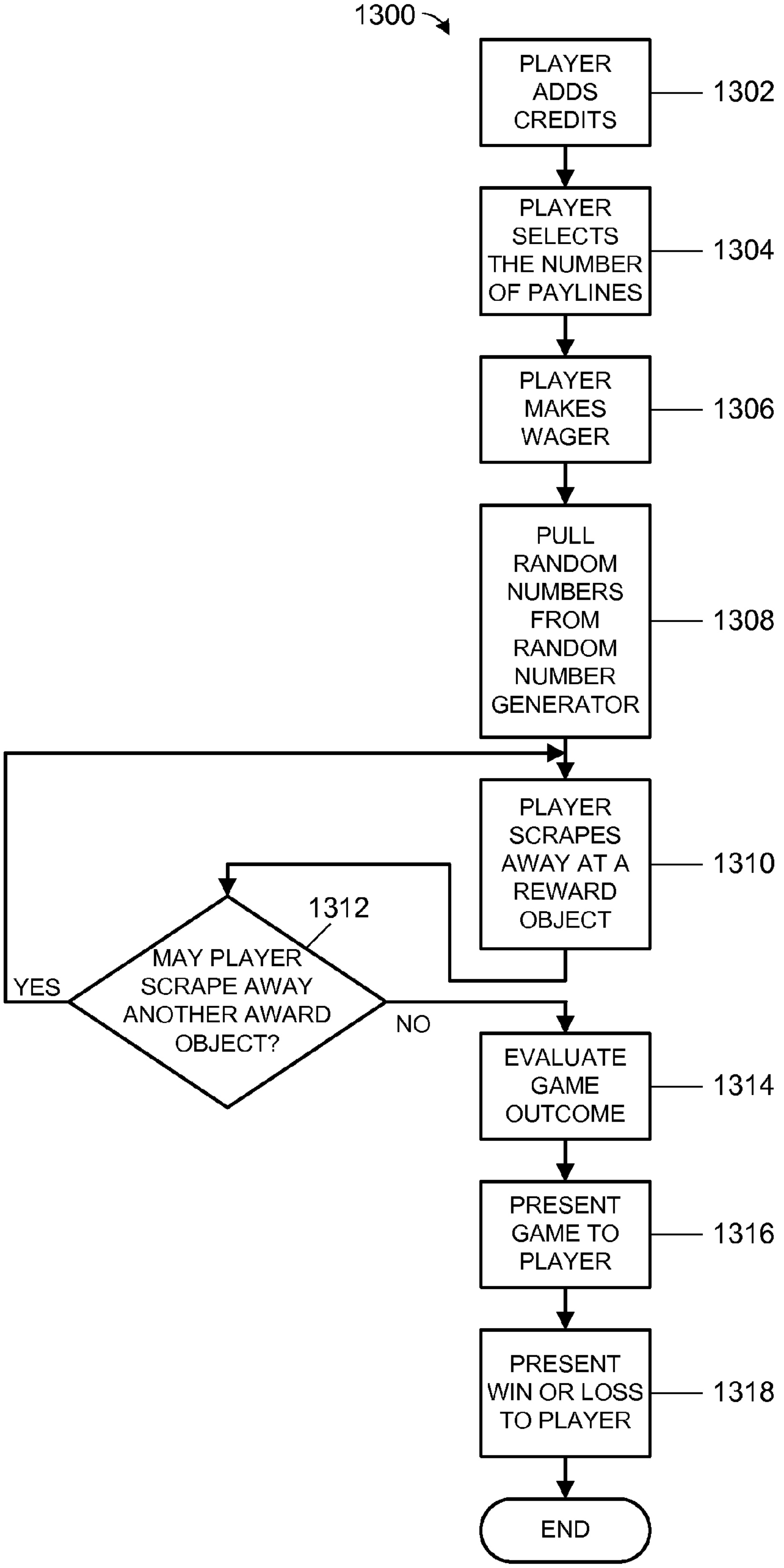
FIG. 13 is another flow diagram for utilizing one or more scrape away options, according to one embodiment.

In FIG. 13, a flow diagram for utilizing a scraping away functionality 1300 is shown, according to one embodiment. The method may include the player adding credits to electronic gaming device 100 and/or electronic gaming system 200 (step 1302). The method may include the selection of the number of paylines (step 1304). The method may include the placing of a wager (step 1306). The method may include electronic gaming device 100 and/or electronic gaming system 200 pulling random numbers from a random number generator (step 1308). The method may include the scraping away of a cover area over a reward object (step 1310). The method may include electronic gaming device 100 and/or electronic gaming system 200 determining whether another award object may be selected via the scrape away functionality (step 1312). If another award object may be selected via the scrape away functionality, then the method moves to step 1310. If another award object may not be selected via the scrape away functionality, then the method may include the evaluation of the game outcome (step 1314). This evaluation may include the evaluation of the primary game and/or an evaluation of the reward object. The method may include displaying the game presentation (step 1316). The method may include presenting a winning or losing outcome to the player (step 1318). The method may end.

Figure 14:
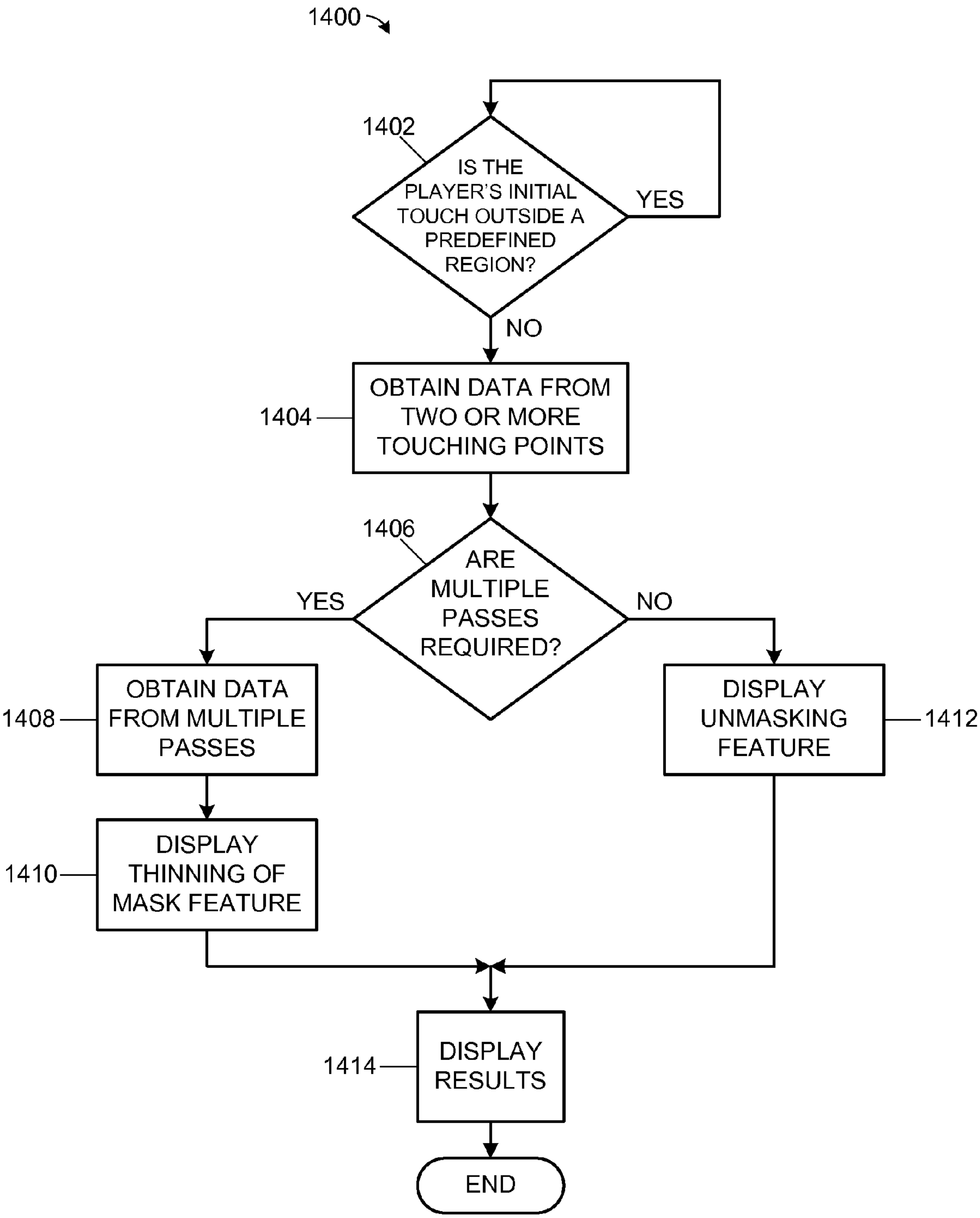
FIG. 14 is another flow diagram for utilizing one or more scrape away options, according to one embodiment.

In FIG. 14, a flow diagram for utilizing one or more scrape away options 1400 is shown, according to one embodiment. The method may include electronic gaming device 100 and/or electronic gaming system 200 determining whether the player's initial touch was outside a predefined region (step 1402). If the player's touch was outside a predefined region, the method moves back to step 1402. If the player's touch was within the predefined region, the method may obtain data from two or more touching points (step 1404). The method may include electronic gaming device 100 and/or electronic gaming system 200 determining whether there are multiple passes required (step 1406). If there is no requirement for multiple passes, the method may display an unmasking feature (step 1402), display the results (step 1414), and end. If multiple passes are required, the method may obtain data from multiple passes (step 1408). The method may also include displaying thinning of the mask feature (step 1410). The method may display the results (step 1414) and the method may end.

For example, if a player touches an area outside of a predefined region, the system and/or method may wait until the player touches a predefined region and/or transmit a message to the player requesting the player to touch a predefined region and/or communicating that the area the player is touching is not an appropriate area. In another example, the player may not be required to pass over the predefined region more than once so that the prize is revealed once the player has touched a specific area. In another example, the player may be required to make more than one pass over the predefined region more than once so that the prize is revealed. In this example, the covered area may partially disappear after each passes (e.g., thinning effect, scratching effect, etc.).

Figure 15A:
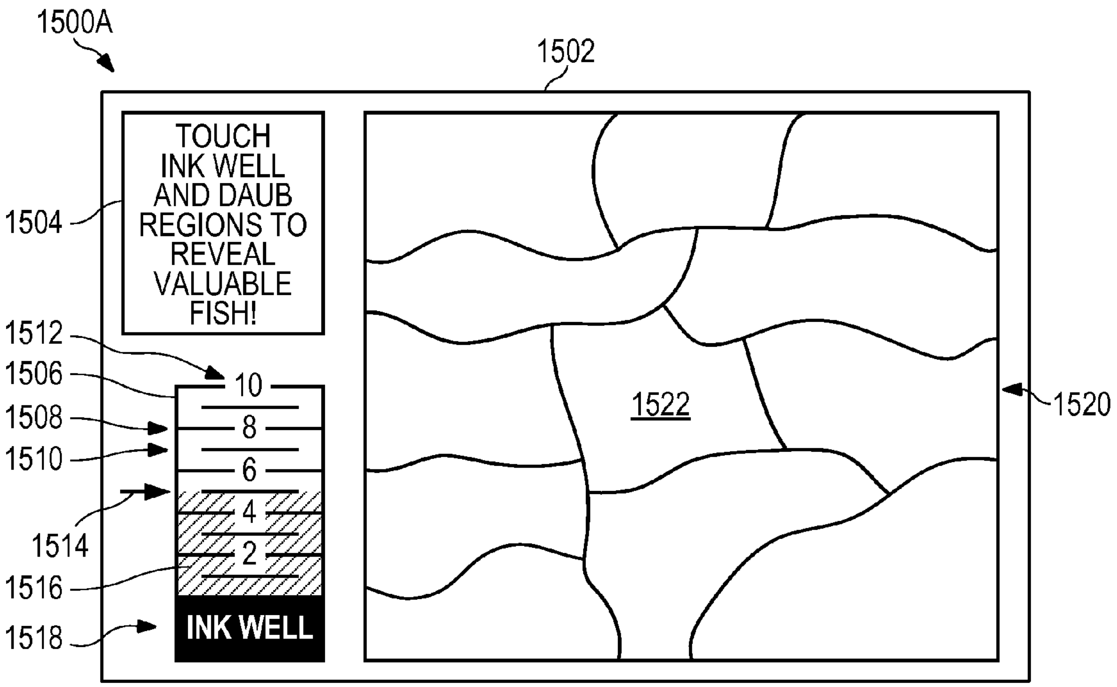
FIG. 15A is an illustration of utilizing a scrape away option on an electronic gaming device, according to one embodiment.

In FIG. 15A, an illustration of utilizing a scrape away option on an electronic gaming device is shown, according to one embodiment. A first image 1500A may include a display screen 1502 with a message area 1504, an ink well area 1506, a display area 1520, and one or more area sections 1522. In one example, ink well area 1506 may include a bottom of an ink well 1518, a top of an ink well 1512, an ink level pointer 1514, an ink filled area 1516, an empty ink area 1508, and one or more levels (reference numbers 1508 and 1510). In one example, message area 1504 may state "TOUCH INK WELL AND DAUB REGIONS TO REVEAL VALUABLE FISH! In various examples, any object can be revealed and/or searched for. In this example, ink level pointer 1514 indicates that ink well area 1506 is half way filed. In various examples, any level (e.g., low, medium, larger, 1, 2, 3, 4, . . . N) may be utilized. In various examples, the level utilized may be related to a specific time frame (e.g., 30 seconds and/or any other time data) and/or a number of daubs (e.g., 1 to N).

Figure 15B:
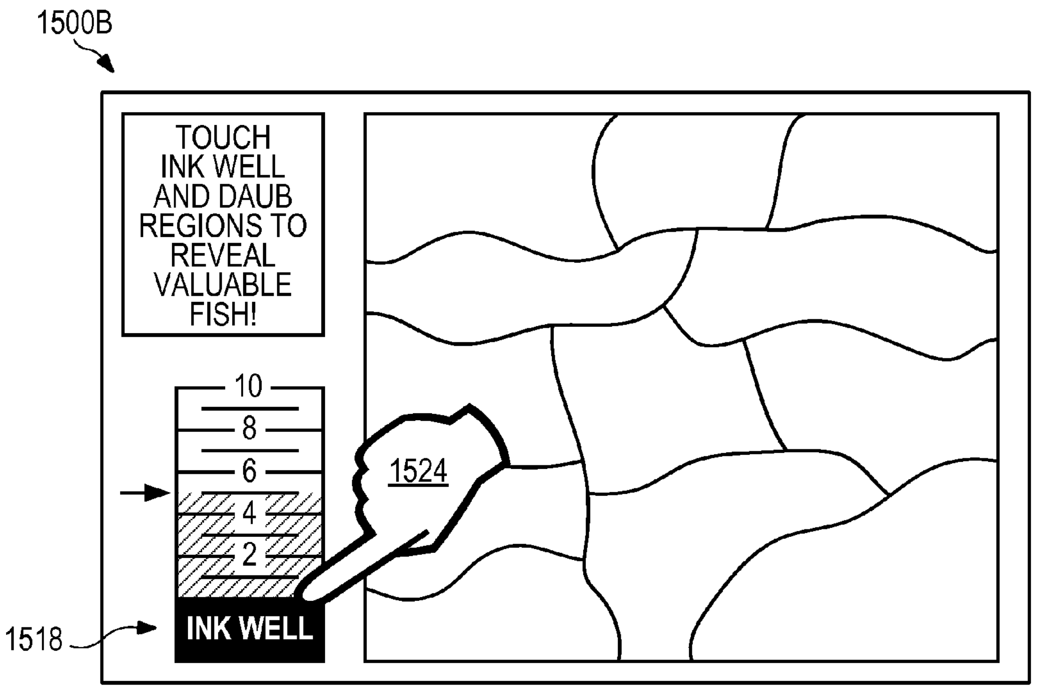
FIG. 15B is another illustration of utilizing a scrape away option on an electronic gaming device, according to one embodiment.
Figure 15C:
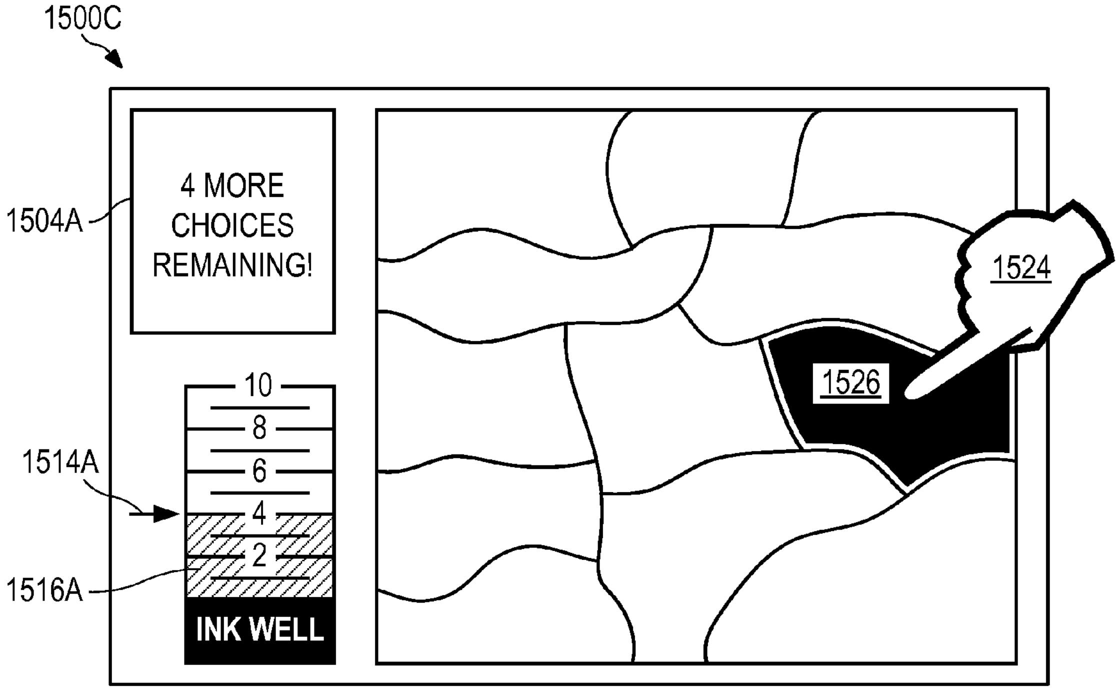
FIG. 15C is another illustration of utilizing a scrape away option on an electronic gaming device, according to one embodiment.

In FIG. 15B, another illustration of utilizing a scrape away option on an electronic gaming device is shown, according to one embodiment. In this example, a hand icon 1524 may be utilized to touch the ink well which then enables a player via hand icon 1524 (and/or any other selection method) to select a first section area 1526 (see FIG. 15C). In this example, the ink well level may equate to five selections. Therefore, message area 1504A may state "4 MORE CHOICES REMAINING!" after the first selection is made. This example may be modified by utilizing time criteria instead of a selection number and/or in combination with the selection number. In this example, ink level pointer 1514A may decrease from a reading of 5 to a reading of 4.

Figure 15D:
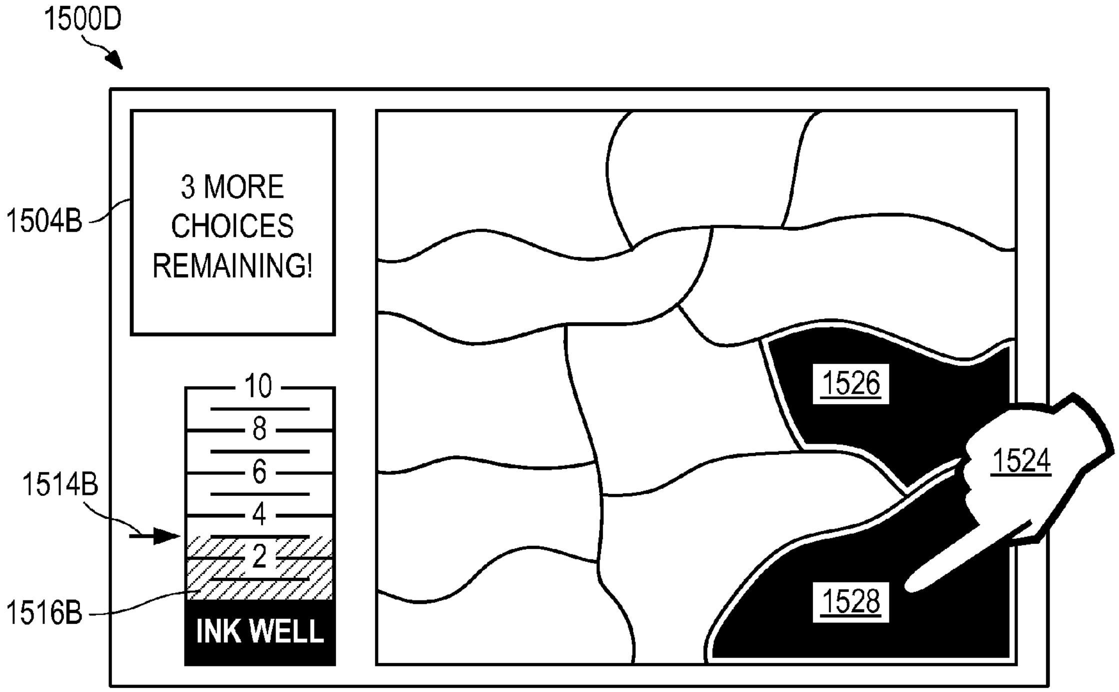
FIG. 15D is another illustration of utilizing a scrape away option on an electronic gaming device, according to one embodiment.
Figure 15E:
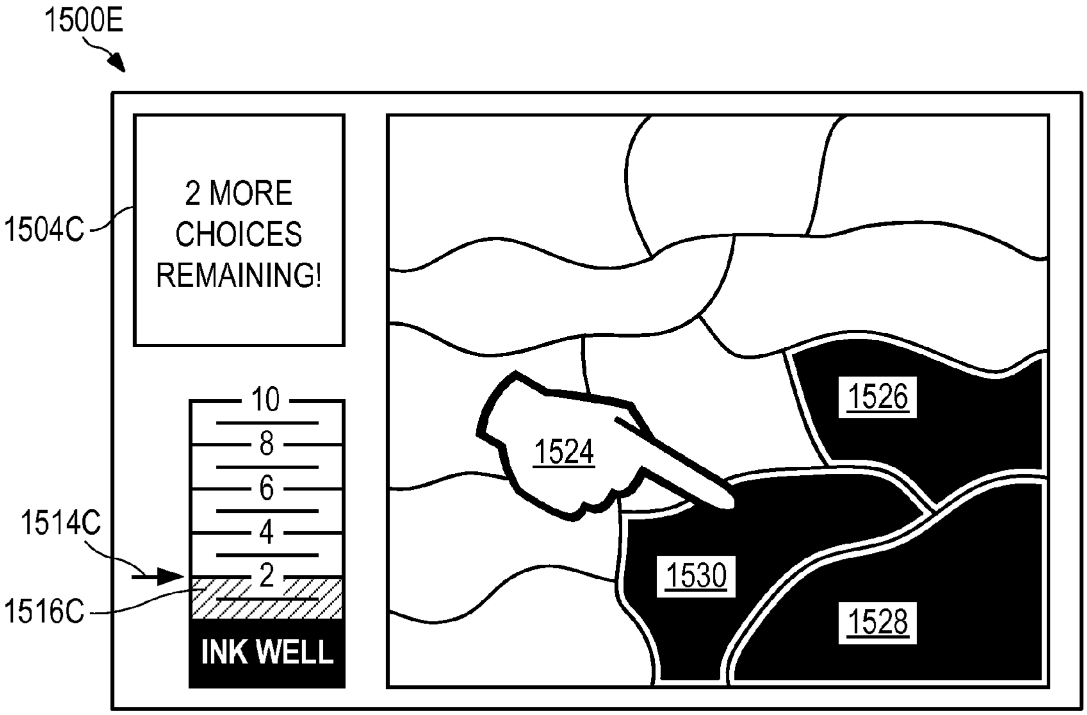
FIG. 15E is another illustration of utilizing a scrape away option on an electronic gaming device, according to one embodiment.
Figure 15F:
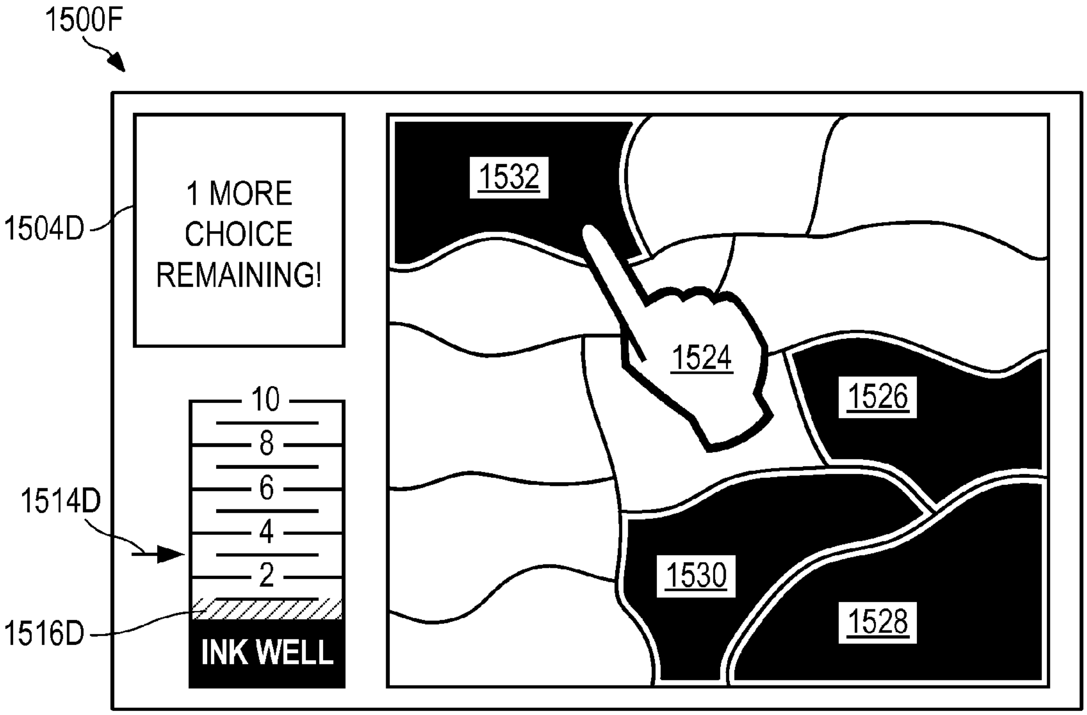
FIG. 15F is another illustration of utilizing a scrape away option on an electronic gaming device, according to one embodiment.
Figure 15G:
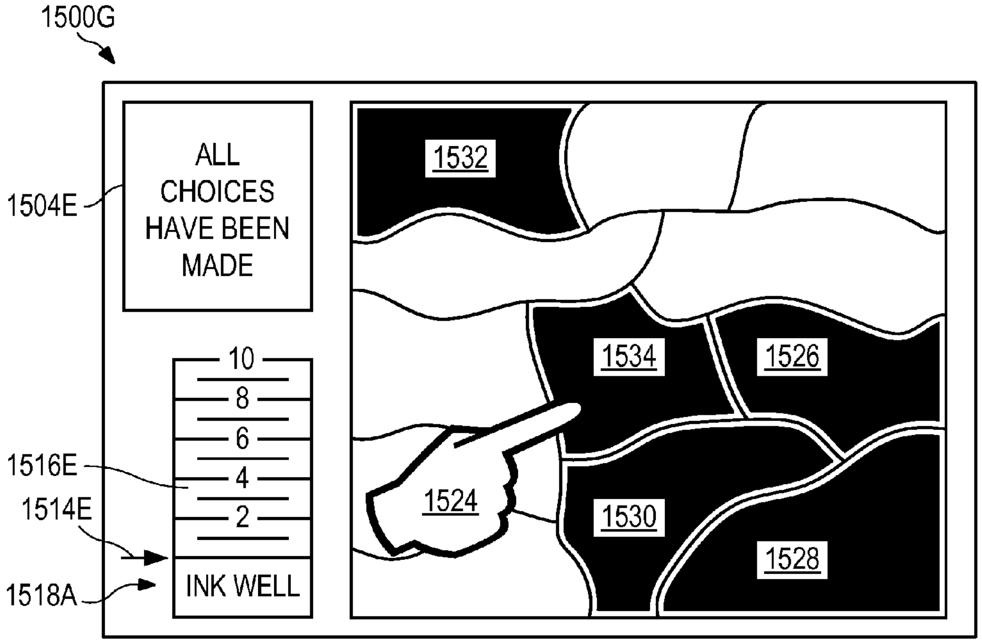
FIG. 15G is another illustration of utilizing a scrape away option on an electronic gaming device, according to one embodiment.

In FIG. 15D, another illustration of utilizing a scrape away option on an electronic gaming device is shown, according to one embodiment. A second image 1500D may include hand icon 1524 selecting a second selection area 1528. In this example, ink level pointer 1514B may decrease from a reading of 4 to a reading of 3. Message area 1504B may state "3 MORE CHOICES REMAINING!" Further, hand icon 1524 may select a third selection area 1530. In this example, ink level pointer 1514C may decrease from a reading of 3 to a reading of 2. Ink filled area 1516 may also decrease from a high of 3 to a high of 2. Message area 1504C may state "2 MORE CHOICES REMAINING!" (see FIG. 15E). In addition, hand icon 1524 may select a fourth selection area 1532. In this example, ink level pointer 1514D may decrease from a reading of 2 to a reading of 1. Ink filled area 1516 may also decrease from a high of 2 to a high of 1. Message area 1504D may state "1 MORE CHOICE REMAINING!" (see FIG. 15F). Lastly, a Nth selection (in this example the fifth choice—a fifth selection area 1532) may be selected by utilizing hand icon 1524. In this example, ink level pointer 1514E may decrease from a reading of 1 to a reading of 0. Ink filled area 1516 may also decrease from a high of 1 to a high of 0 (e.g., empty). Message area 1504E may state "ALL CHOICES HAVE BEEN MADE." (see FIG. 15G).

Figure 15H:
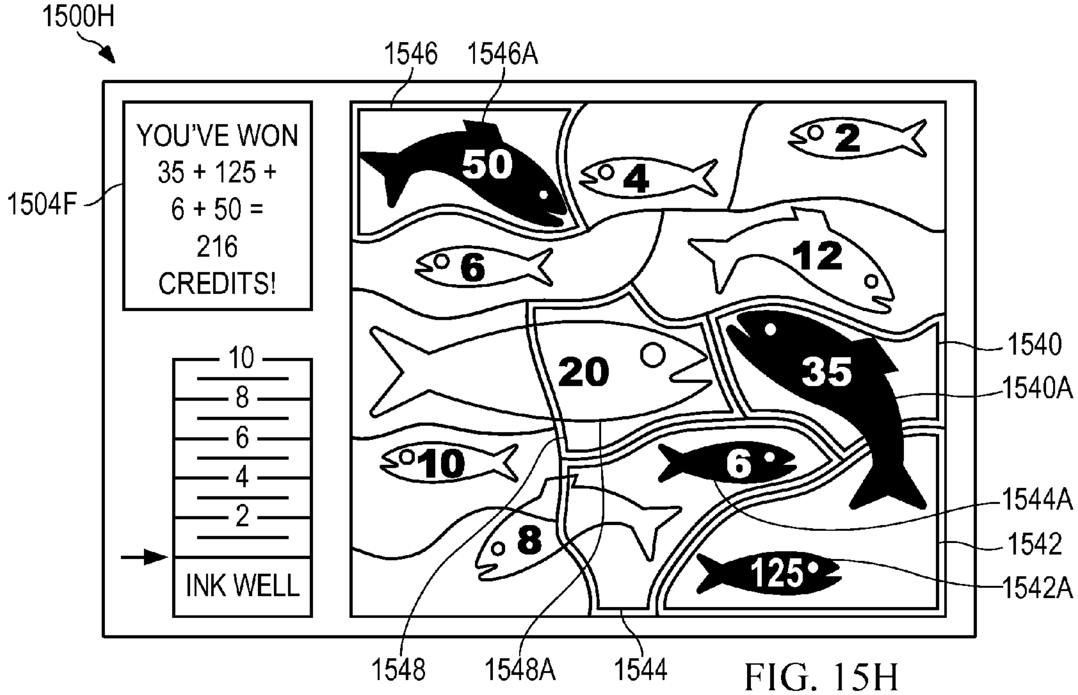
FIG. 15H is another illustration of utilizing a scrape away option on an electronic gaming device, according to one embodiment.

In FIG. 15H, another illustration of utilizing a scrape away option on an electronic gaming device is shown, according to one embodiment. A third image 1500H may include message area 1504F which states "YOU'VE WON 35+125+6+50=216 CREDITS!" These credits were based on a first selected area 1540, a second selected area 1542, a third selected area 1544, a fourth selected area 1546, and a fifth selected area 1548. In this example, the 35 credits were based on a first selected object 1540A (e.g., fish) being completely revealed. In this example, the entire fish was revealed because first selected area 1540 and second selected area 1542 were selected. In one example, if either of these areas (e.g., first selected area 1540 and second selected area 1542) were not selected, then the player would not have won the 35 credits. Further in this example, the 125 credits were based on a second selected object 1542A being completely revealed. In addition, the 6 credits were based on a third selected object 1544A being completely revealed whereas the 8 credit fish was not completely revealed and therefore not awarded in this example. Further, the 50 credits were based on a fourth selected object 1546A being completely revealed. Lastly, there were no credits awarded based on a fifth selected object 1548A because this object was not completely revealed.

In one example, the player may continue to select items until the paint is gone. Further, in one example, when the player is done painting the game may show where the objects where found and the value of the finds. In another example, the game may reveal the object as the player finds them. In another example, the awards may be random amounts. Further, in one example, this game play may be skilled based, pseudo-skilled based, perceived skilled based, and/or non-skilled based.

Figure 16A:
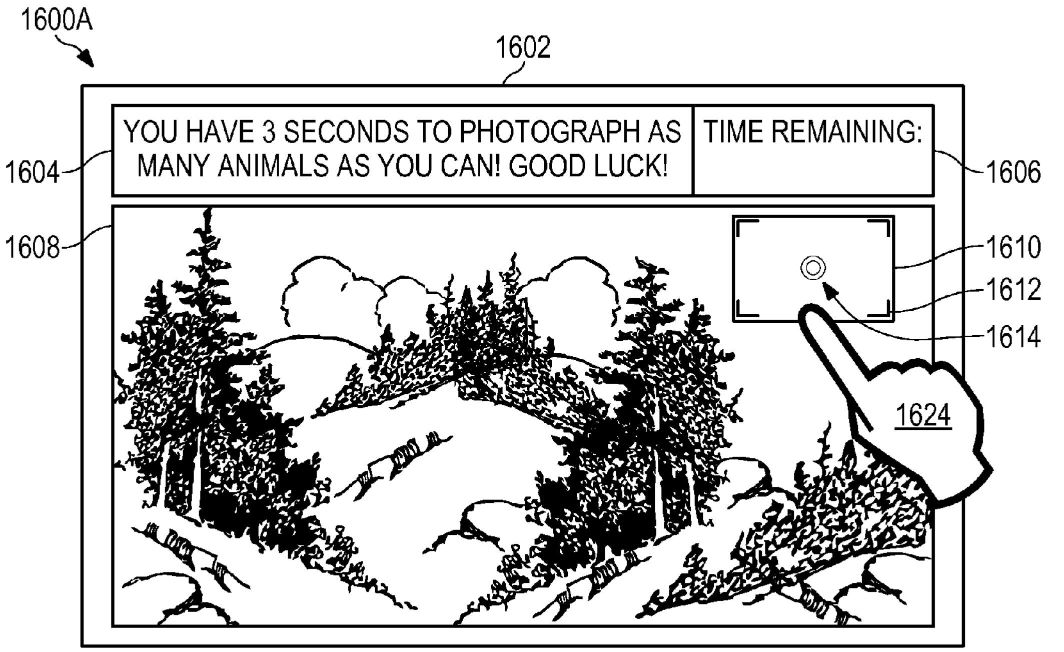
FIG. 16A is another illustration of utilizing a scrape away option on an electronic gaming device, according to one embodiment.
Figure 16B:
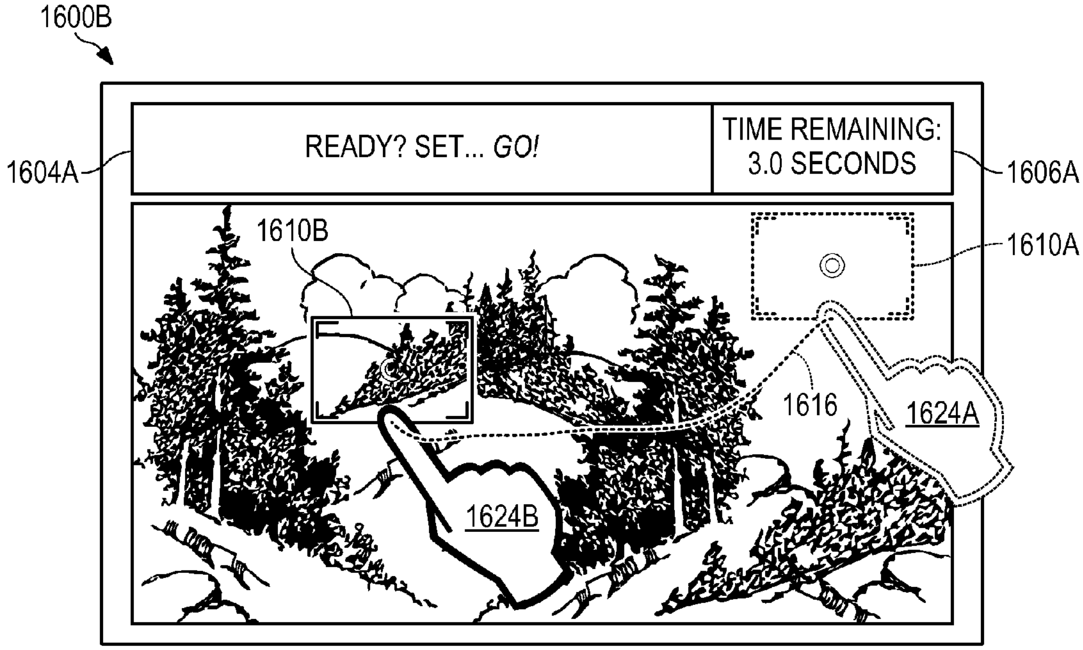
FIG. 16B is another illustration of utilizing a scrape away option on an electronic gaming device, according to one embodiment.
Figure 16C:
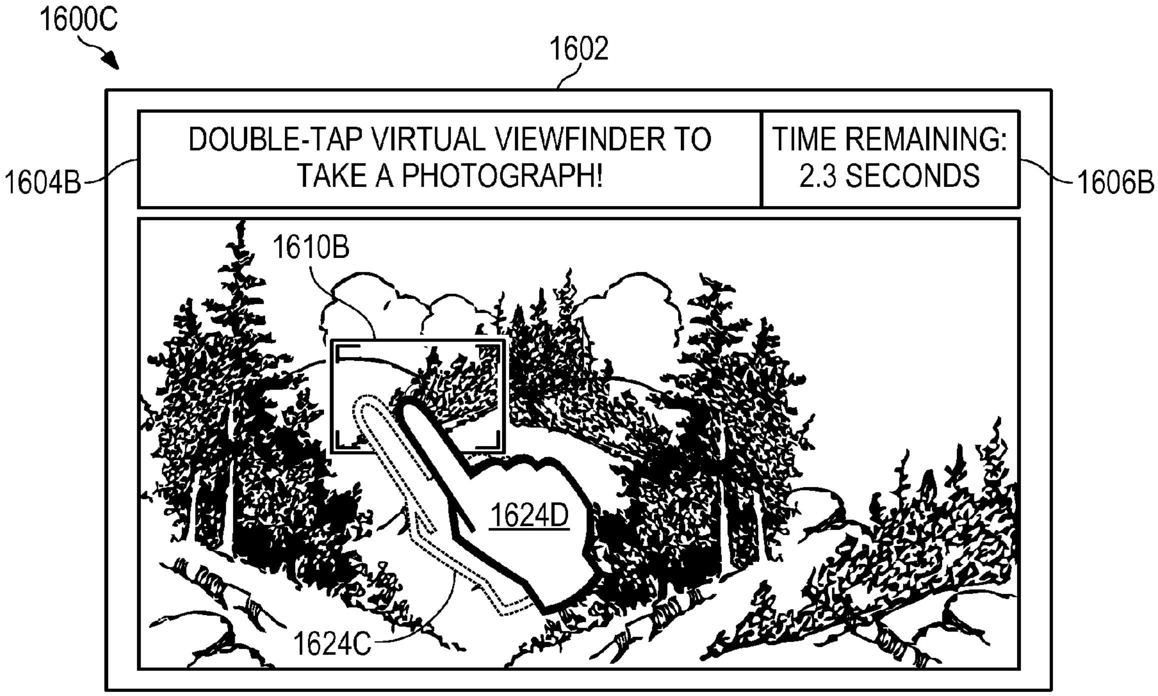
FIG. 16C is another illustration of utilizing a scrape away option on an electronic gaming device, according to one embodiment.
Figure 16D:
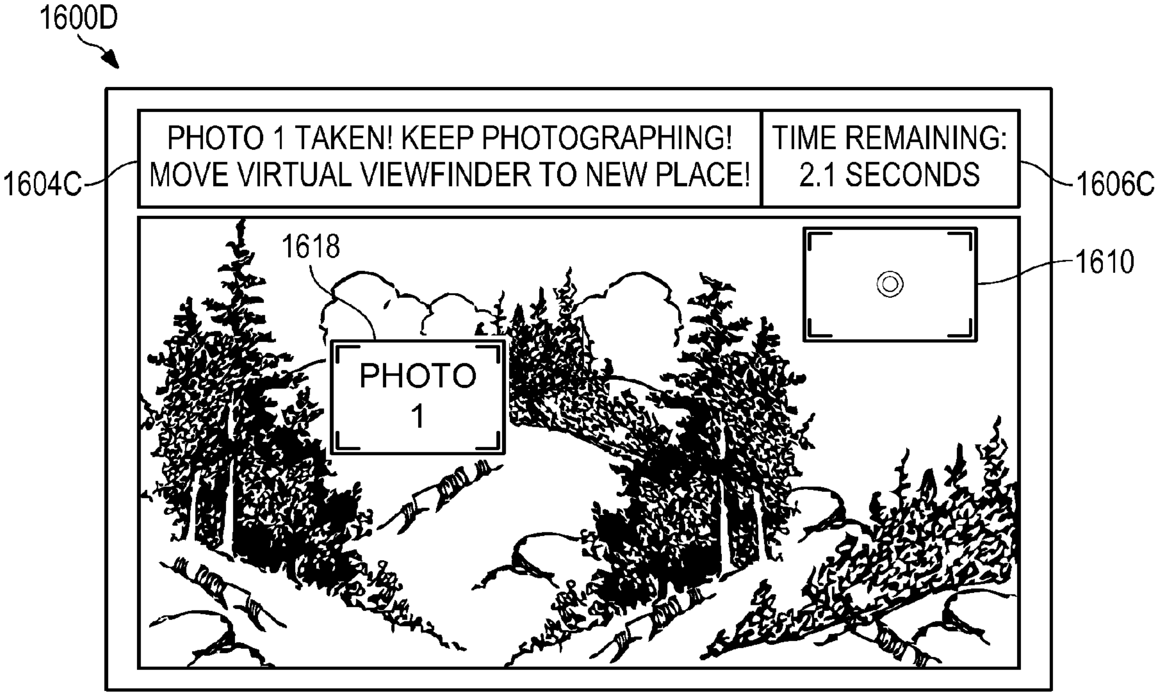
FIG. 16D is another illustration of utilizing a scrape away option on an electronic gaming device, according to one embodiment.

In FIG. 16A, another illustration of utilizing a scrape away option on an electronic gaming device is shown, according to one embodiment. A first image 1600A may include a display 1602, a message area 1604, a time clock area 1606, an active display area 1608, a tool area 1610, and a hand icon 1624. In one example, tool area 1610 may include a tool area border 1612 and a tool area center 1614 (e.g., focal point). Message area 1604 may state "YOU HAVE 3 SECONDS TO PHOTOGRAPH AS MANY ANIMALS AS YOU CAN! GOOD LUCK!" Time clock area 1606 may display time periods and state "TIME REMAINING:" In one example shown in FIG. 16B, time clock area 1606 may state "TIME REMAINING: 3.0 SECONDS". Message area 1604 may state "READY? SET . . . GO!" In one example, the player may utilize hand icon 1624A (and/or any other selection method) to move tool area 1610 to a first location 1610B (and/or make a first selection 1610B). The player may be required to double tap the area to make a first double tap selection 1610B. Message area 1604B may state "DOUBLE-TAP VIRTUAL VIEWFINDER TO TAKE A PHOTOGRAPH!" Time clock area 1606 may state "TIME REMAINING: 2.3 SECONDS." (see FIG. 16C). In one example, a first photo selection 1618 may be taken (see FIG. 16D). In one example, message area 1604C may state "PHOTO 1 TAKEN! KEEP PHOTOGRAPHING! MOVE VIRTUAL VIEWFINDER TO NEW PLACE!" Time clock area 1606C may state "TIME REMAINING: 2.1 SECONDS."

Figure 16E:
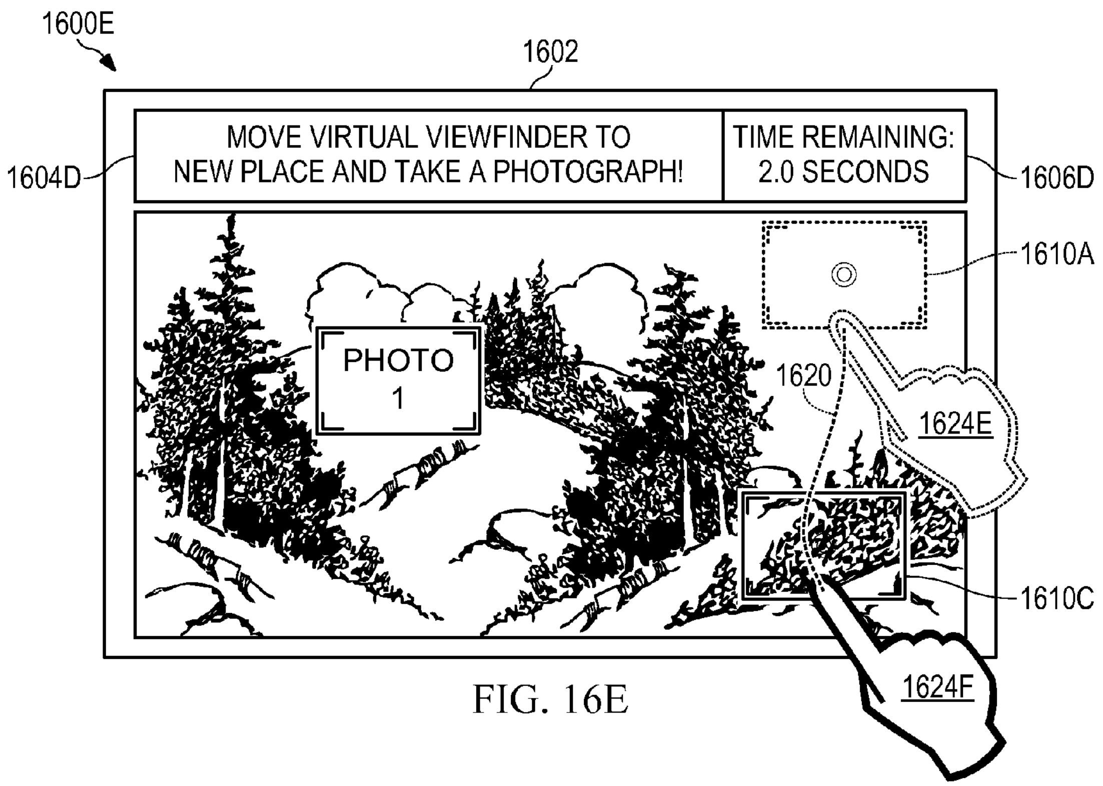
FIG. 16E is another illustration of utilizing a scrape away option on an electronic gaming device, according to one embodiment.
Figure 16F:
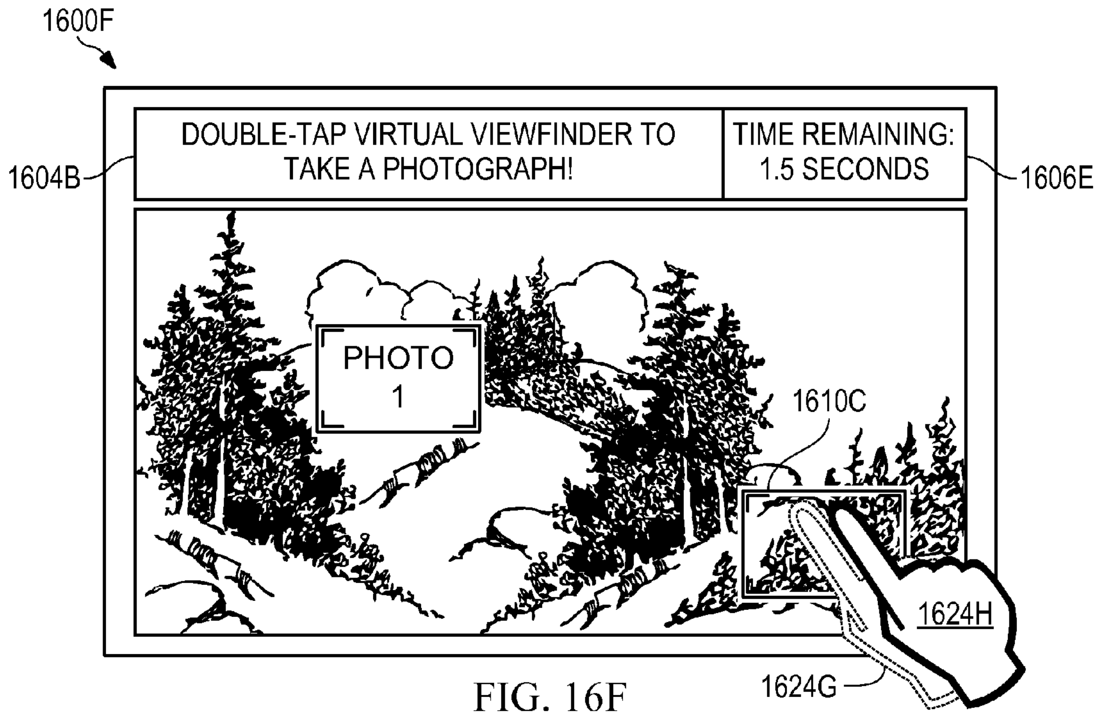
FIG. 16F is another illustration of utilizing a scrape away option on an electronic gaming device, according to one embodiment.
Figure 16G:
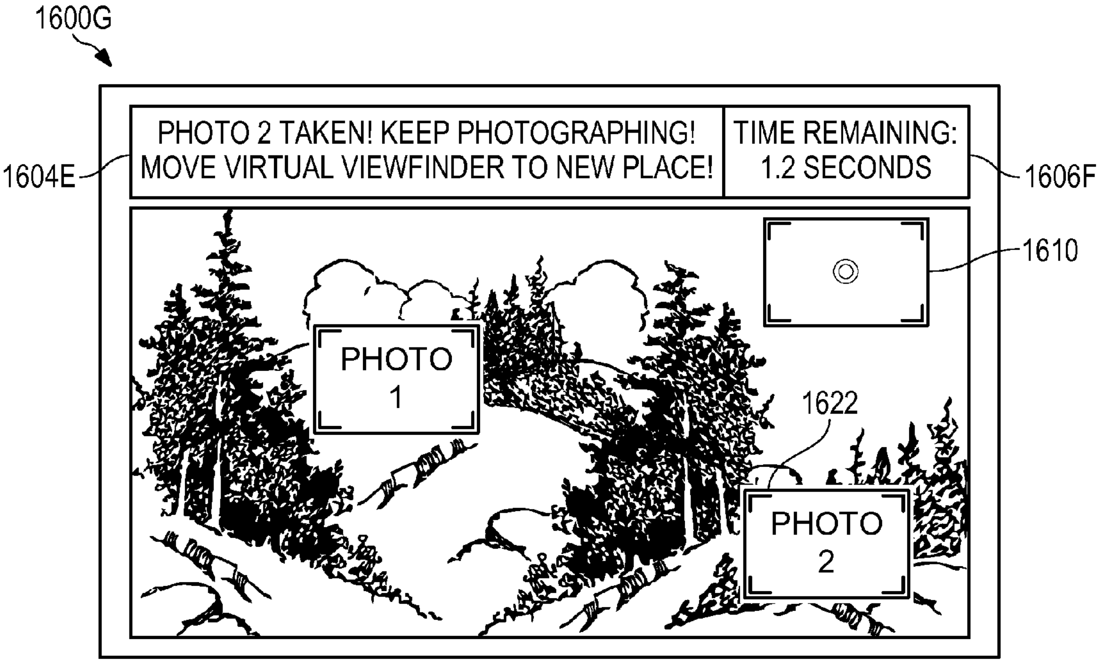
FIG. 16G is another illustration of utilizing a scrape away option on an electronic gaming device, according to one embodiment.
Figure 16H:
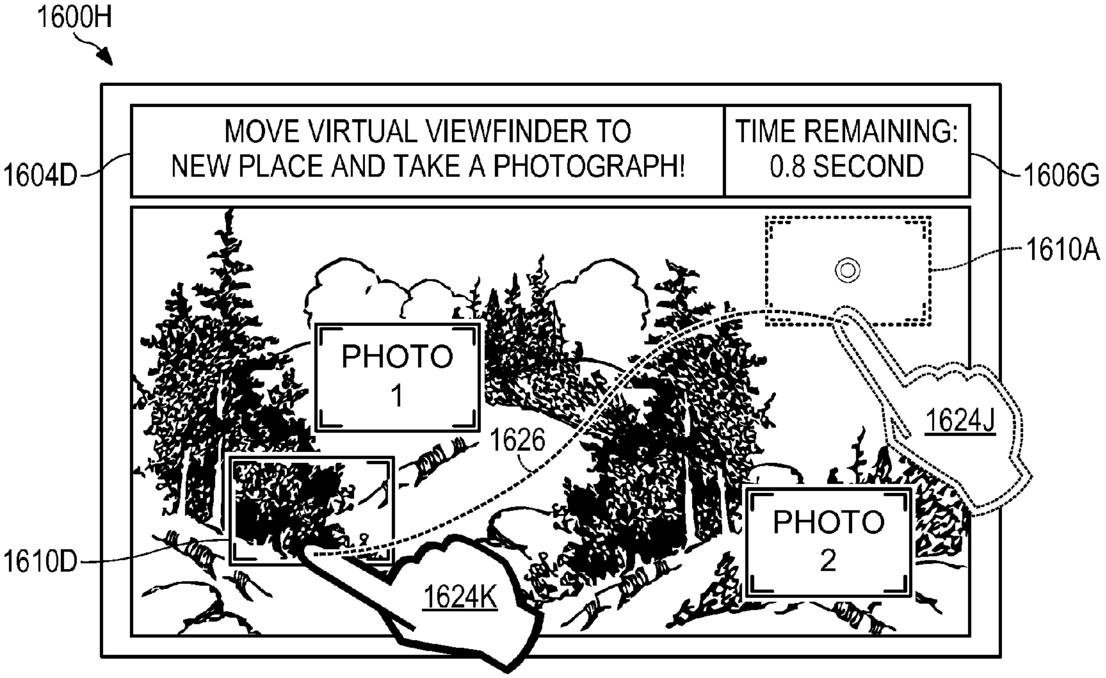
FIG. 16H is another illustration of utilizing a scrape away option on an electronic gaming device, according to one embodiment.

In FIG. 16E, another illustration of utilizing a scrape away option on an electronic gaming device is shown, according to one embodiment. In this example, a second photo selection 1622 (see FIG. 16G) may be selected by moving hand icon (e.g., reference numbers 1624G and 1624H) to select and double tab a second selection option 1610C (see FIG. 16F). Time clock area 1606F may state "TIME REMAINING: 1.2 SECONDS:" Message area 1604E may state "PHOTO 2 TAKEN! KEEP PHOTOGRAPHING! MOVE VIRTUAL VIEWFINDER TO NEW PLACE!" In various examples, a number of selections may be utilized instead of the time parameters and/or in combination with the time parameters.

Figure 16J:
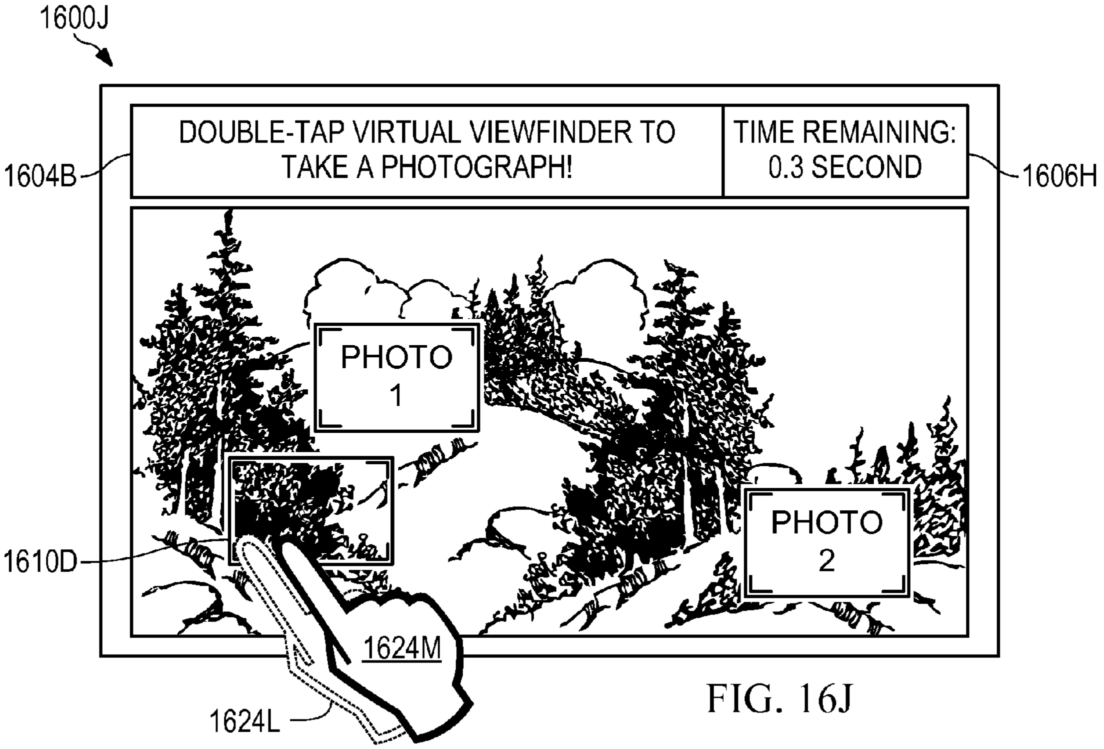
FIG. 16J is another illustration of utilizing a scrape away option on an electronic gaming device, according to one embodiment.
Figure 16K:
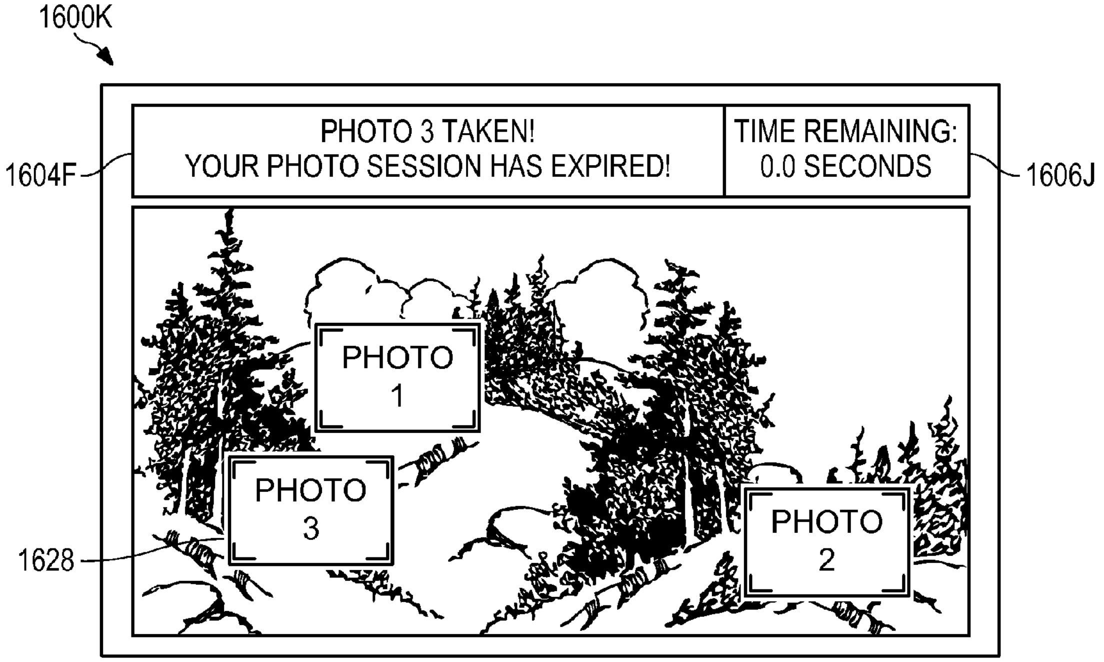
FIG. 16K is another illustration of utilizing a scrape away option on an electronic gaming device, according to one embodiment.

In another example, a third photo selection 1628 (see FIG. 16K) may be selected by moving hand icon (e.g., reference numbers 1624L and 1624M) to select and double tab a second selection option 1610D (see FIG. 16J). Message area 1604F may state "PHOTO 3 TAKEN! YOUR PHOTO SESSION HAS EXPIRED!" Time clock area 1606J may state "TIME REMAINING: 0.0 SECONDS."

Figure 16L:
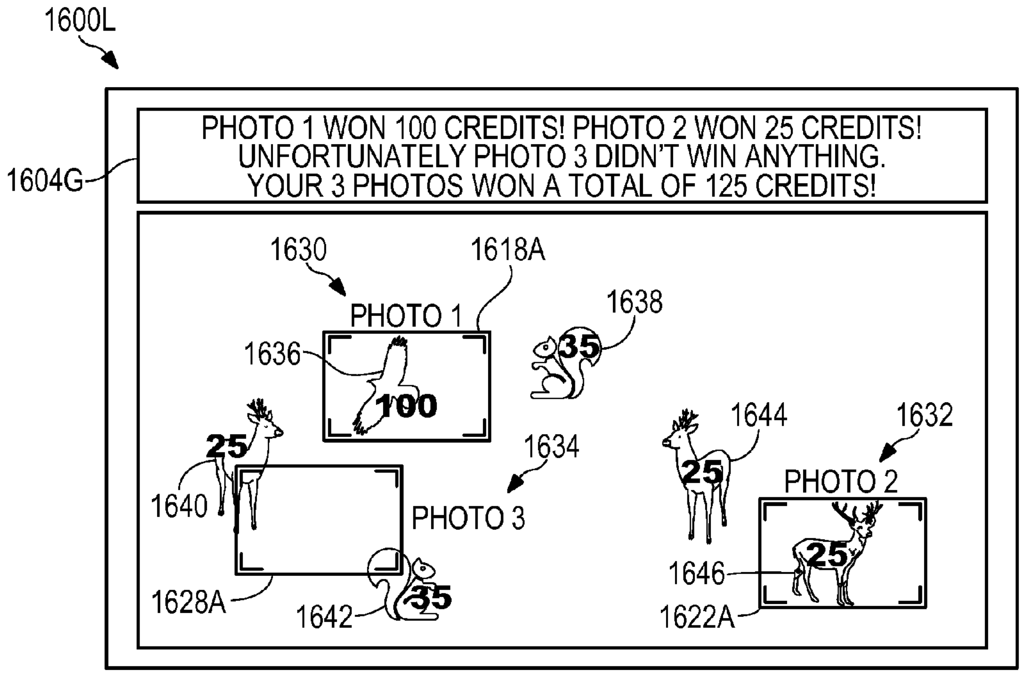
FIG. 16L is another illustration of utilizing a scrape away option on an electronic gaming device, according to one embodiment.

In FIG. 16L, another illustration of utilizing a scrape away option on an electronic gaming device is shown, according to one embodiment. In this example, message area 1604G may state "PHOTO 1 WON 100 CREDITS! PHOTO 2 WON 25 CREDITS! UNFORTUNATELY PHOTO 3 DIDN'T WIN ANYTHING. YOUR 3 PHOTOS WON A TOTAL OF 125 CREDITS!" In this example, the 100 credits were won because first photo 1618A completely captured a first image 1636. In this example, a second image 1638 was not within any photo image. In this example, a third image 1640 was not won because it is not entirely within a third photo 1628A. Further, a fourth image 1642 was not won because it is not further enough within the third photo 1628A. In addition, a fifth image 1644 was not within any photo image. Lastly, a sixth image 1646 (e.g., 25 credits) was won because it was within a second photo 1622A.

In various examples, to win the award it may be that only a portion (e.g., 1% to 99.999%) of the image needs to within the photo.

Figure 16M:
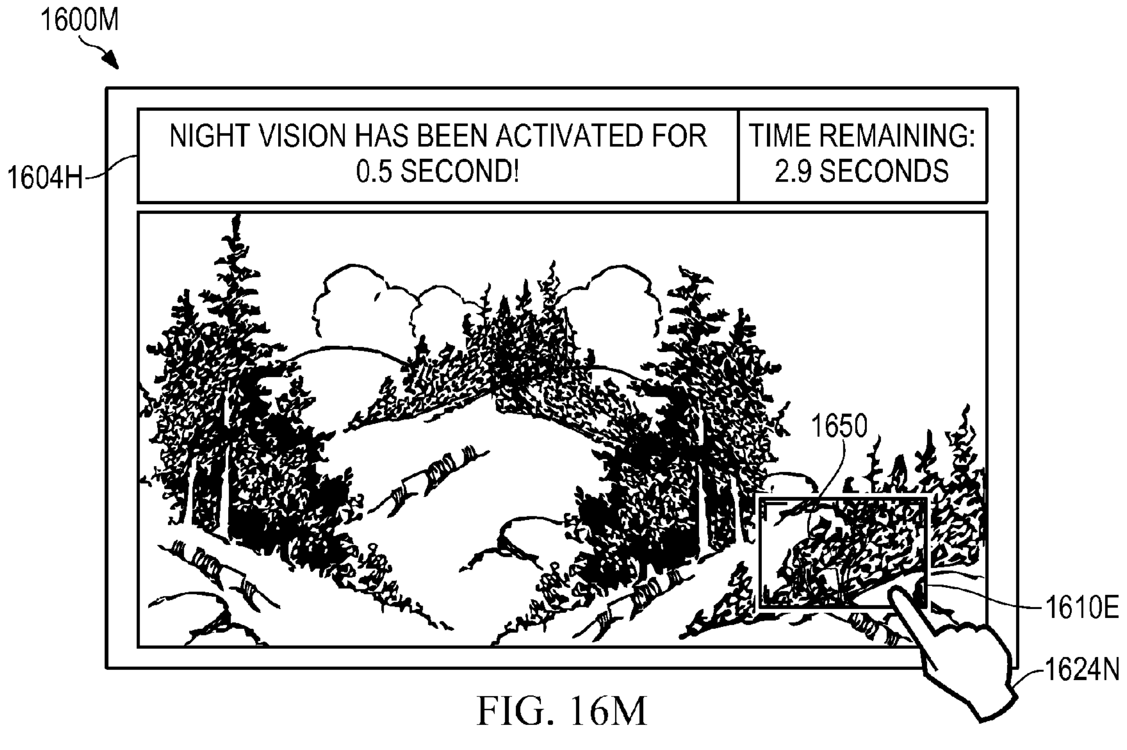
FIG. 16M is another illustration of utilizing a scrape away option on an electronic gaming device, according to one embodiment.

In FIG. 16M, another illustration of utilizing a scrape away option on an electronic gaming device is shown, according to one embodiment. A first image 1600M may include a night vision tool 1610E with a night vision area 1650. The player may be allowed to move the night vision area 1650 via hand icon 1624N to find a hidden image 1650. In this example, message area 1604H may state "NIGHT VISION HAS BEEN ACTIVATED FOR 0.5 SECOND!" This may give the player an advantage on where to put the photo vision tool to obtain the best/highest prizes.

In one example, the player may have 3 seconds (and/or any time period) to search through an image (e.g., forest). Further, the player may move their fingers around which magnifies the image underneath. In addition, a set of binoculars and/or gun scope may be utilized to magnify the glass. The player may utilize these to look into and/or around the trees in the forest. The player may be awarded when the player finds an object (e.g., a bird, deer, bear, etc.) in the image (e.g., forest). Further, a marking of a trail of where the player has already painted and/or gone may be utilized.

Figure 17:
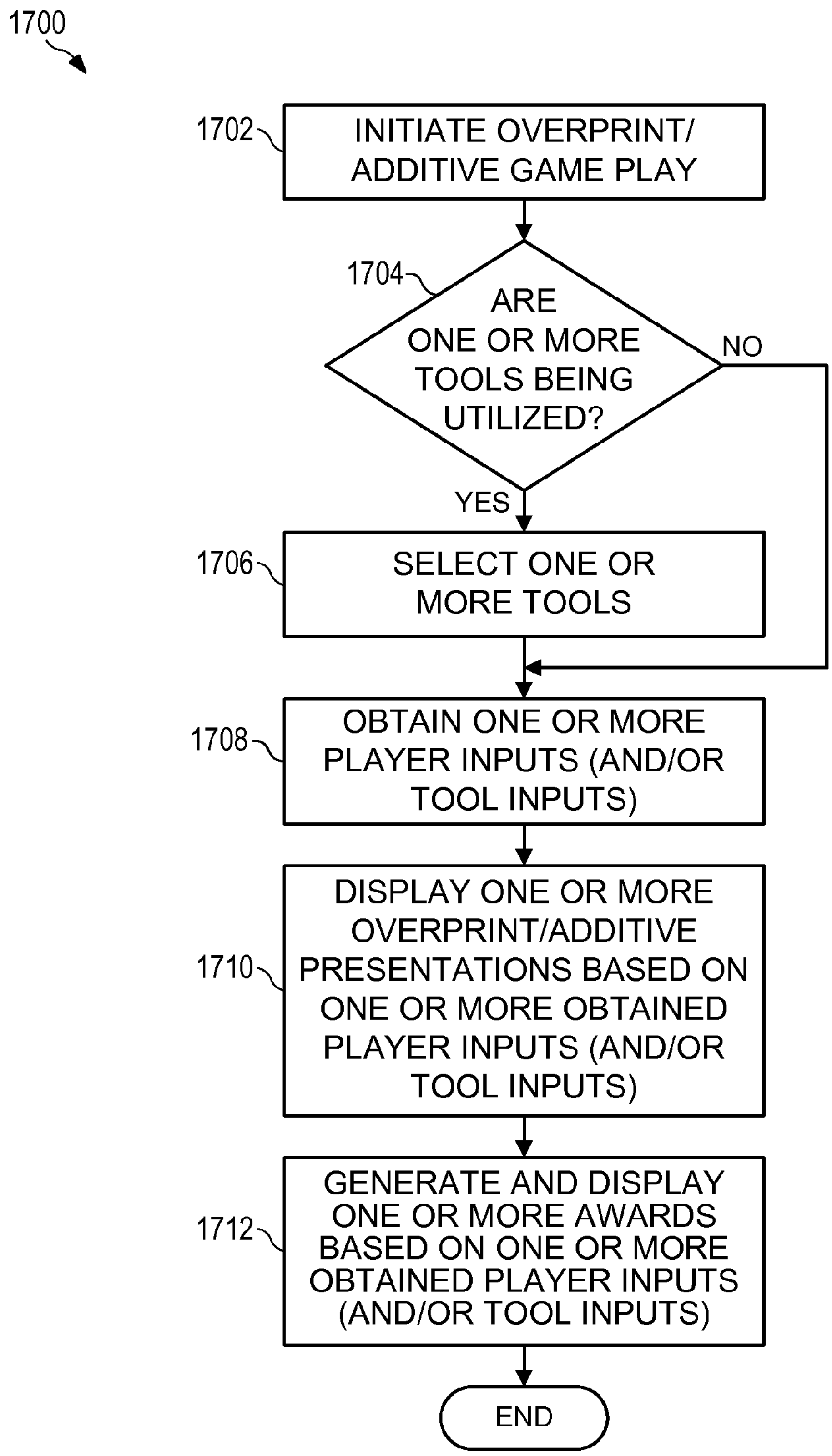
FIG. 17 is a scrape away process flow diagram, according to one embodiment.

In FIG. 17, a scrape away process flow diagram is shown, according to one embodiment. A method 1700 may include initiating overprint and/or additive game play (step 1702). The method may include one or more processors (via the electronic gaming device and/or electronic gaming system) determining whether there are one or more tools being utilized (step 1704). If one or more tools are being utilized, then the method may include selecting one or more tools (step 1706). If the one or more tools are not being utilized, then the method may include obtaining one or more player inputs (and/or tools inputs) (step 1708). The method may include displaying one or more overprint and/or additive presentations based on one or more obtained player inputs (and/or tool inputs) (step 1710). The method may include generating and displaying one or more awards based on one or more obtained player inputs (and/or tool inputs) (step 1712).

Figure 18A:
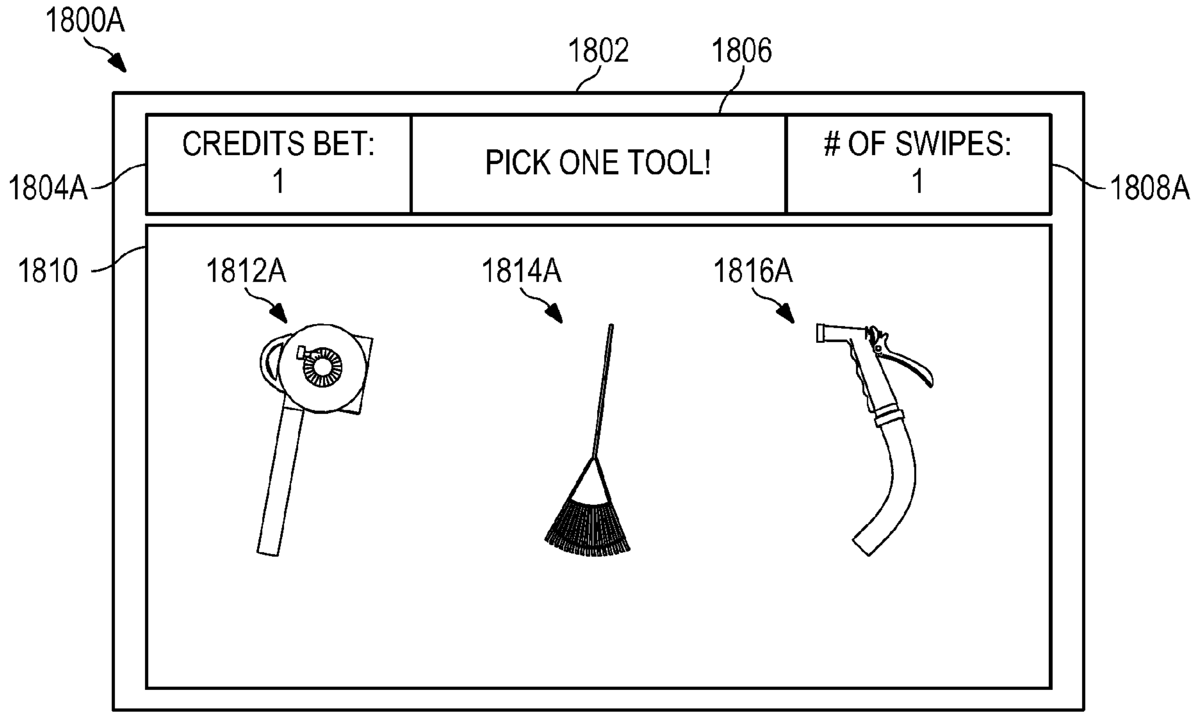
FIG. 18A is another illustration of utilizing a scrape away option on an electronic gaming device, according to one embodiment.
Figure 18B:
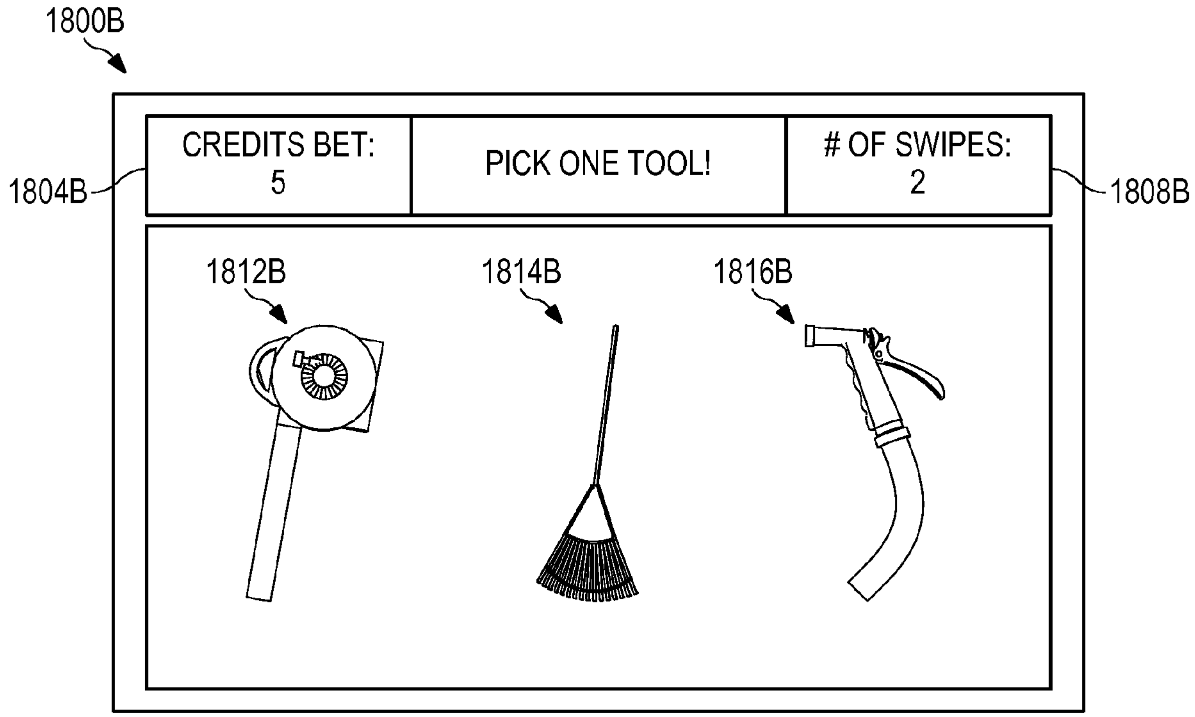
FIG. 18B is another illustration of utilizing a scrape away option on an electronic gaming device, according to one embodiment.
Figure 18C:
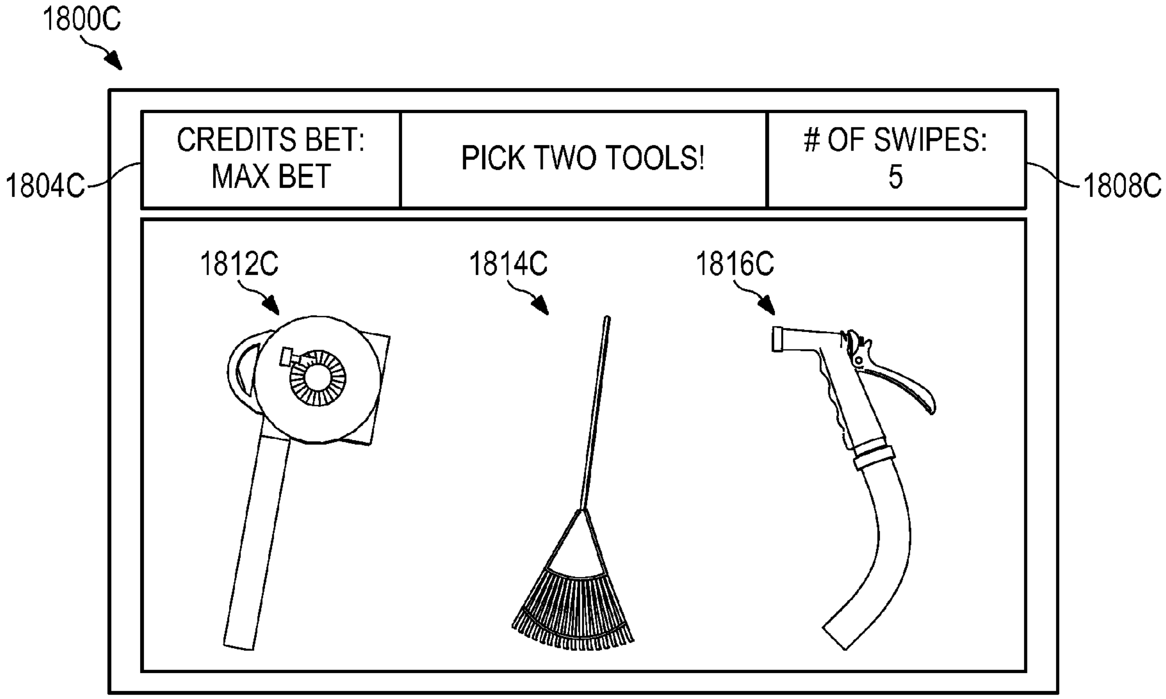
FIG. 18C is another illustration of utilizing a scrape away option on an electronic gaming device, according to one embodiment.

In FIG. 18A, another illustration of utilizing a scrape away option on an electronic gaming device is shown, according to one embodiment. A first image 1800A may include a display 1802, a wager area 1804A, a pick a tool message area 1806, a number of turns area 1808A, a display area 1810, a first tool 1812A, a second tool 1814A, and a third tool 1816A. In this example, the player has wagered one credit, therefore, the player may select one tool and utilize the tool once. Further, based on the credit amount wagered, the tool size (e.g., the size of first tool 1812A, second tool 1814A, and/or third tool 1816A) may be a small tool size. In a contrast example shown in FIG. 18B, the player has made a medium size wager (e.g., 5 credits), therefore, a fourth tool 1812B, a fifth tool 1814B, and/or a sixth tool 1816B may be bigger than (e.g., the size of first tool 1812A, second tool 1814A, and/or third tool 1816A) the tools shown in FIG. 18A. Further, the player may be allowed to utilize the selected tool twice. In addition, the player may only be allowed to select one tool based on the size of the player's wager. In FIG. 18C, another illustration of utilizing a scrape away option on an electronic gaming device is shown, according to one embodiment. In this example, the player has wagered the maximum bet amount and based on this wagering amount, the player is allow to select two tools and utilize these tools a total of 5 times. In addition, a seventh tool 1812C, an eighth tool 1814C, and a ninth tool 1816C may be larger than (e.g., the size of first tool 1812A, second tool 1814A, and/or third tool 1816A and/or fourth tool 1812B, fifth tool 1814B, and/or sixth tool 1816B) the tools shown in FIG. 18A and FIG. 18B, respectively. Further, it should be noted that the larger the tool the more area it can cover and the more effective the tool is at revealing and/or finding one or more prizes.

Figure 19A:
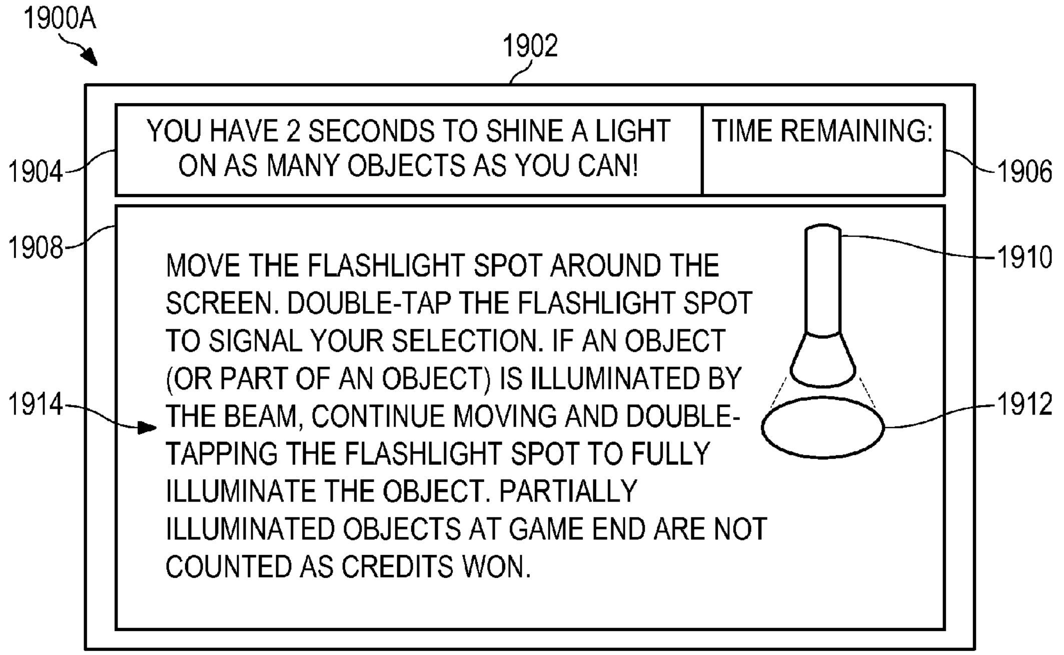
FIG. 19A is another illustration of utilizing a scrape away option on an electronic gaming device, according to one embodiment.
Figure 19B:
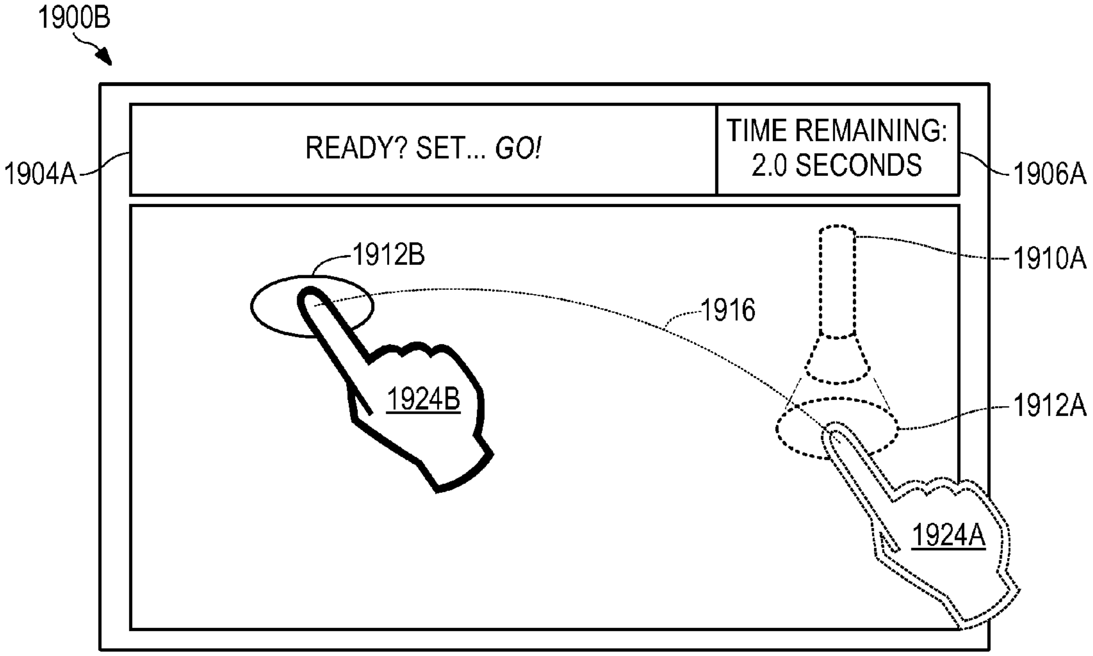
FIG. 19B is another illustration of utilizing a scrape away option on an electronic gaming device, according to one embodiment.
Figure 19C:
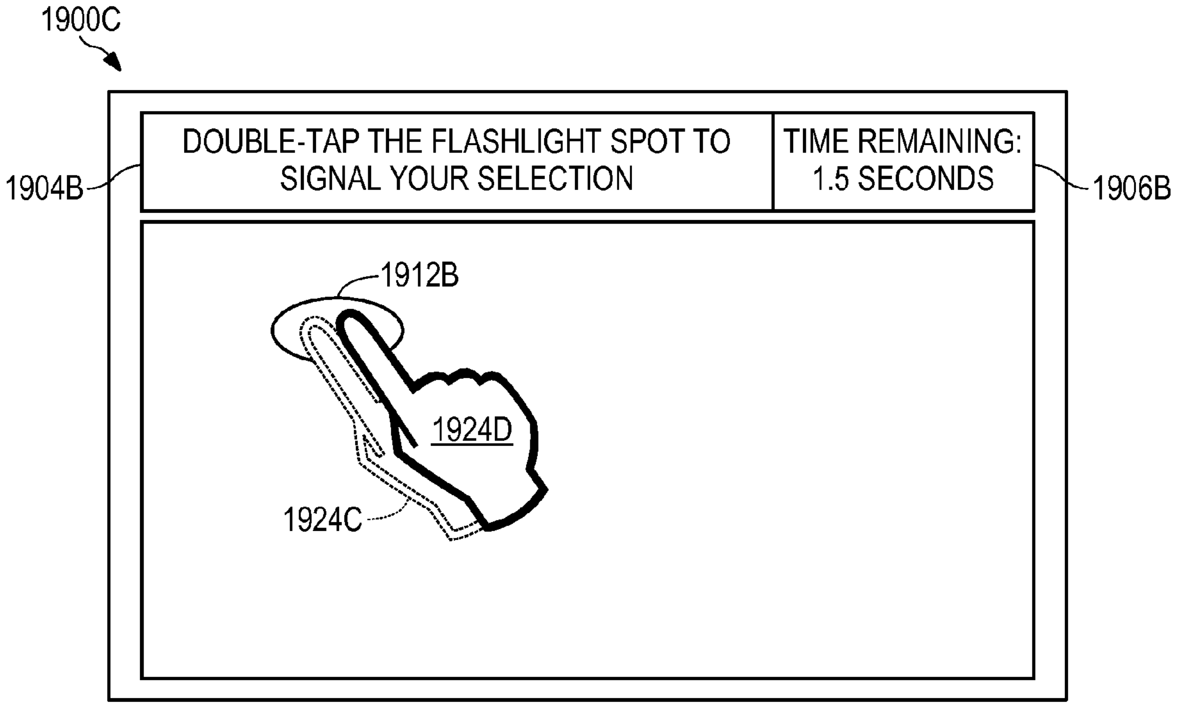
FIG. 19C is another illustration of utilizing a scrape away option on an electronic gaming device, according to one embodiment.
Figure 19D:
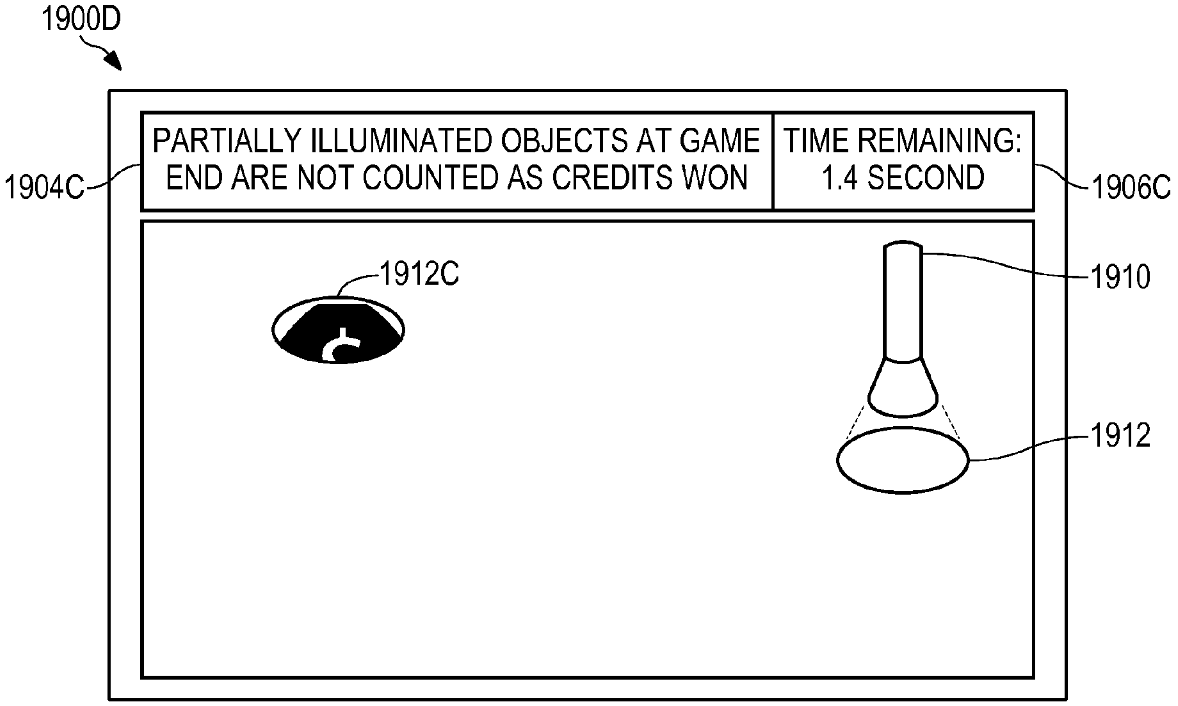
FIG. 19D is another illustration of utilizing a scrape away option on an electronic gaming device, according to one embodiment.

In FIG. 19A, another illustration of utilizing a scrape away option on an electronic gaming device is shown, according to one embodiment. A first image 1900A may include a display screen 1902, a message area 1904, a time remaining area 1906 (and/or a number of turns left area), a display area 1908, a second message area 1914, a tool 1910, and a tool affect area 1912. In this example, message area 1904 may state "YOU HAVE 2 SECONDS TO SHINE A LIGHT ON AS MANY OBJECTS AS YOU CAN!" Further, second message area 1914 may state "MOVE THE FLASHLIGHT SPOT AROUND THE SCREEN. DOUBLE-TAP THE FLASH-LIGHT SPOT TO SIGNAL YOUR SELECTION. IF AN OBJECT (OR PART OF AN OBJECT) IS ILLUMINATED BY THE BEAM, CONTINUE MOVING AND DOUBLE-TAPPING THE FLASHLIGHT SPOT TO FULLY ILLUMINATE THE OBJECT. PARTIALLY ILLUMINATED OBJECTS AT GAME END ARE NOT COUNTED AS CREDITS WON." The player may move tool 1910 and/or tool affect area 1912 via hand movement (reference numbers 1912A and 1912B) to a second location 1912B (see FIG. 19B). The player as seen in FIG. 19C has double-tabbed via tapping motion (e.g., reference numbers 1924C and 1924D) a selection area 1912B. Message area 1904B may state "DOUBLE-TAB THE FLASHLIGHT SPOT TO SIGNAL YOUR SELECTION." Further, time remaining area may have 1.5 seconds remaining. In this example, an uncovered area 1912C may show a partial prize (see FIG. 19D). Message area 1904C may state "PARTIALLY ILLUMINATED OBJECTS AT GAME END ARE NOT COUNTED AS CREDITS WON."

Figure 19E:
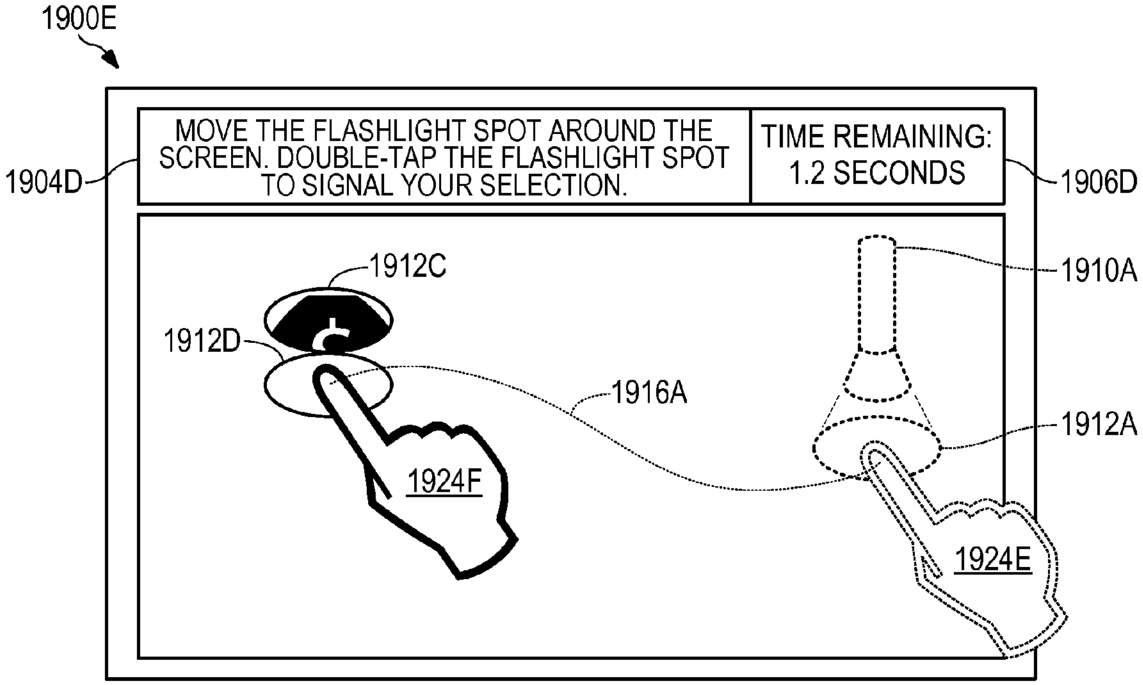
FIG. 19E is another illustration of utilizing a scrape away option on an electronic gaming device, according to one embodiment.
Figure 19F:
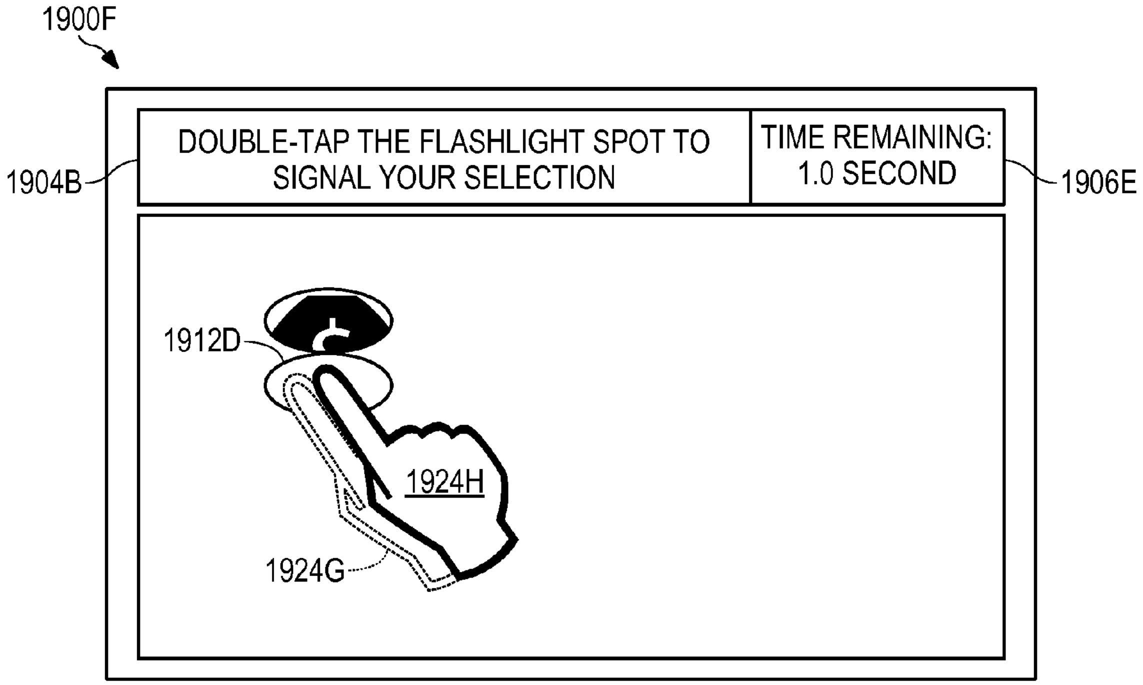
FIG. 19F is another illustration of utilizing a scrape away option on an electronic gaming device, according to one embodiment.
Figure 19G:
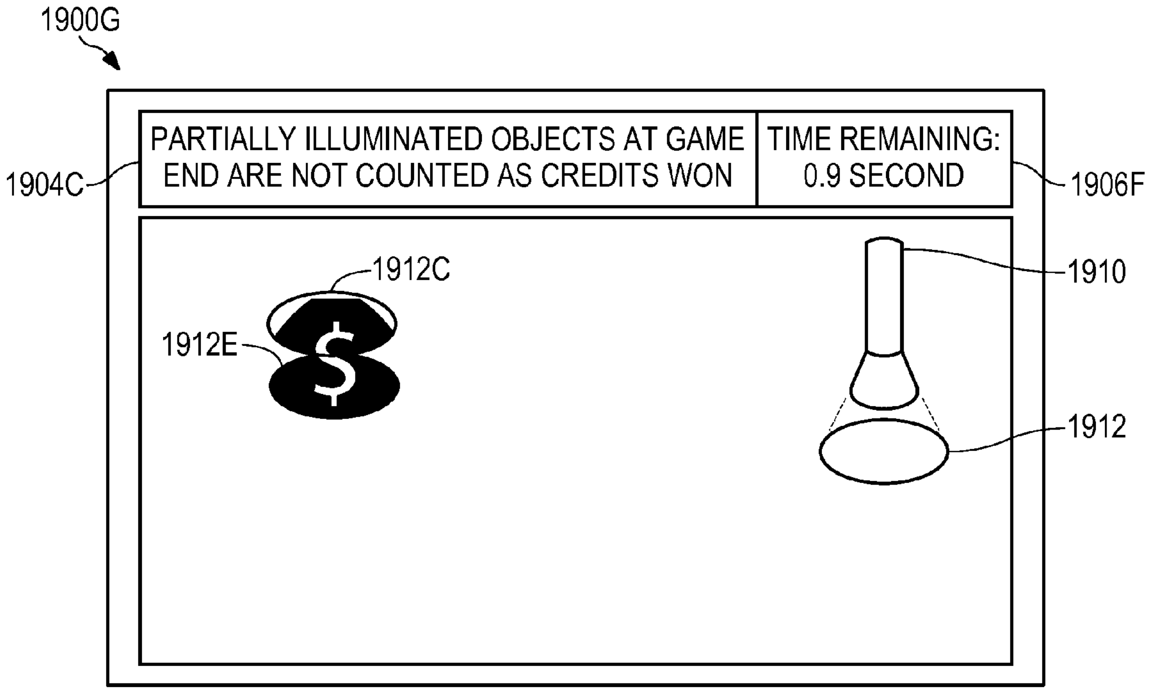
FIG. 19G is another illustration of utilizing a scrape away option on an electronic gaming device, according to one embodiment.
Figure 19H:
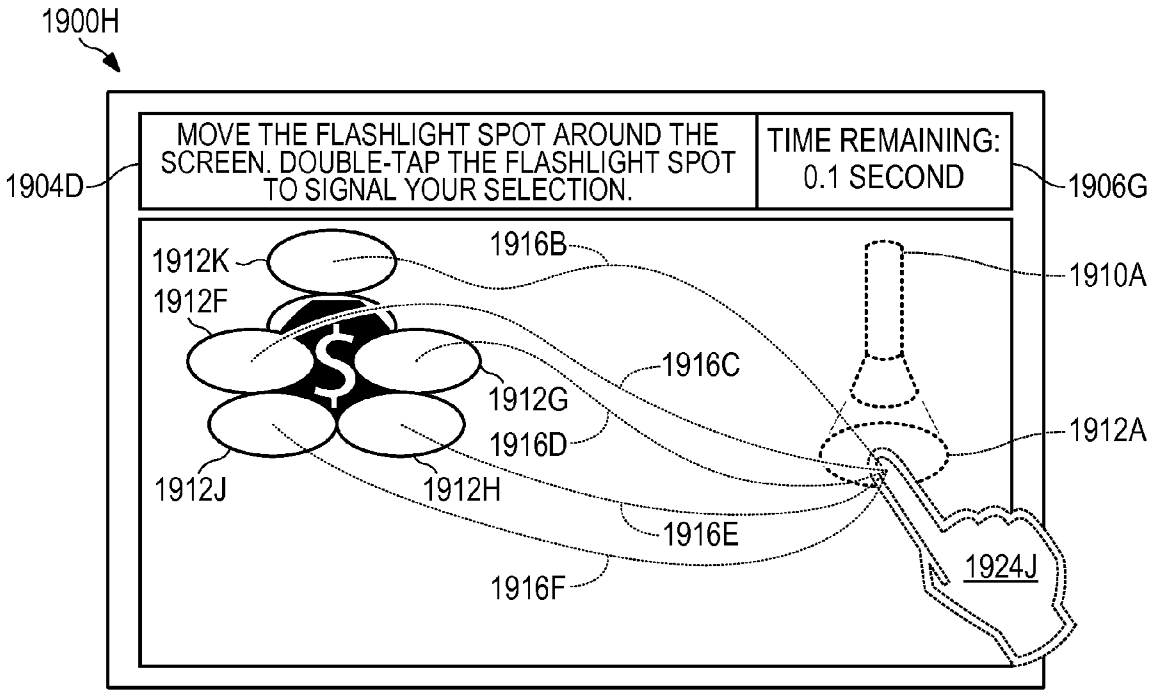
FIG. 19H is another illustration of utilizing a scrape away option on an electronic gaming device, according to one embodiment.

Further as seen in FIG. 19E, the player may move tool 1910A and/or tool affect area 1912A to a second location 1912D via a first path 1916A. In this example a second uncovered area 1912D has been selected by the player (see FIG. 19F). Further, time remaining area may have 1.0 seconds remaining. In this example, a second partial prize 1912E may be revealed. In various moves, the player has selected a second uncovered area 1912F, a third uncovered area 1912G, a fourth uncovered area 1912H, a fifth uncovered area 1912J, and a sixth uncovered area 1912K via various paths (e.g., reference numbers 1916B, 1916C, 1916D, 1916E, and 1916F). (see FIG. 19H).

Figure 19J:
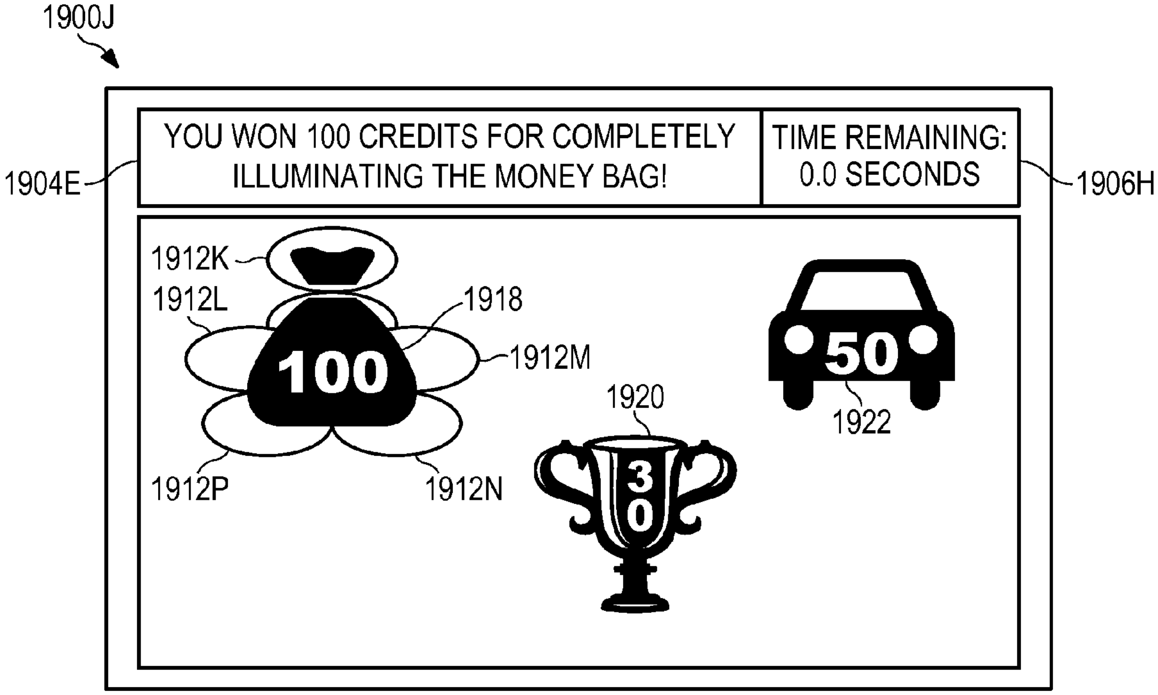
FIG. 19J is another illustration of utilizing a scrape away option on an electronic gaming device, according to one embodiment.

In FIG. 19J, another illustration of utilizing a scrape away option on an electronic gaming device is shown, according to one embodiment. In this example, a first prize 1918 of 100 credits has been completely revealed and is awarded to the player. Whereas, a second prize 1920 was not revealed and not awarded. Further, a third prize 1922 was not revealed and not awarded. Message area 1904E may state "YOU WON 100 CREDITS FOR COMPLETELY ILLUMINATING THE MONEY BAG!" Time period may state 0.0 seconds because the game is done. In another example, the flashlight may be dragged along the area while the timer is elapsing, one or more prizes may be moved in the dark where illuminating the one or more prizes fully in the time allotted would award the one or more prizes. In other words, a prize may move in the unrevealed area and once a tool is utilized to reveal the prize, the prize may be awarded. In various examples, the time period may be dependent on the wager amount (e.g., a longer time for a maximum bet, a shorter time for a minimum bet, an average time for an average bet, etc.), the length of a gaming session, a player card characteristic (e.g., black card), an amount won, an amount lost, a time of day, a special event, and/or any other gaming characteristic and/or any other gaming entity activity.

Figure 20A:
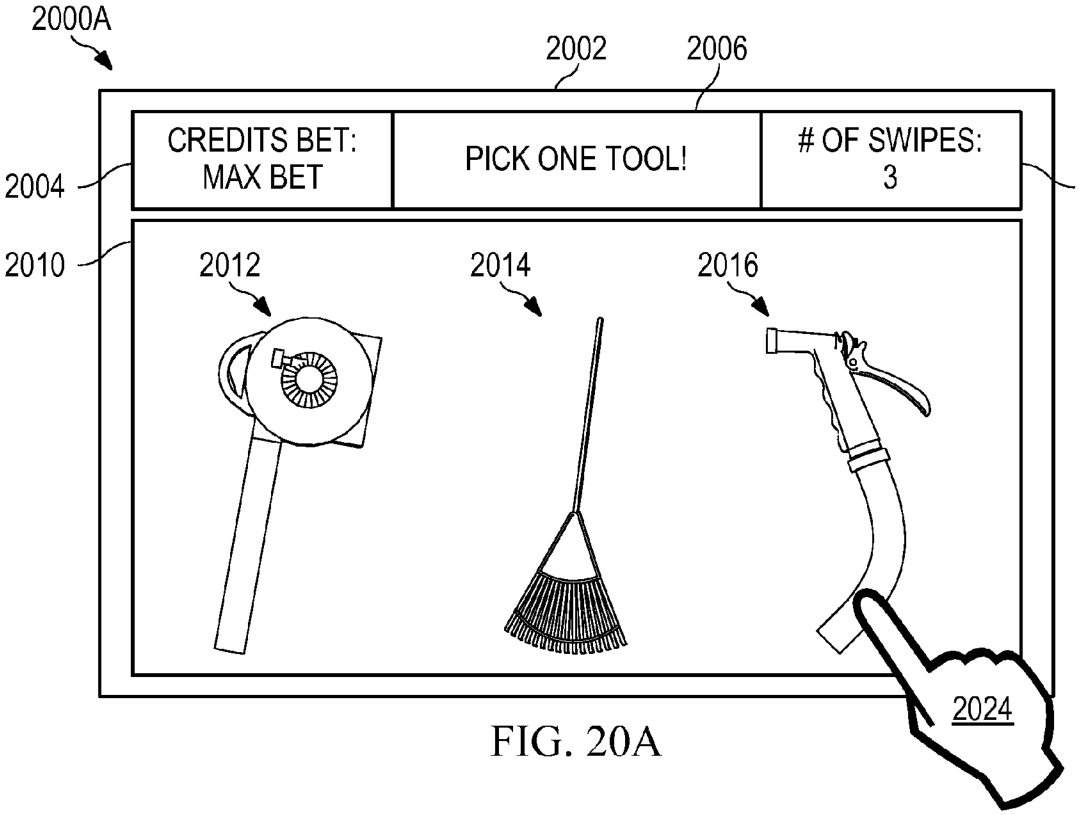
FIG. 20A is another illustration of utilizing a scrape away option on an electronic gaming device, according to one embodiment.
Figure 20B:
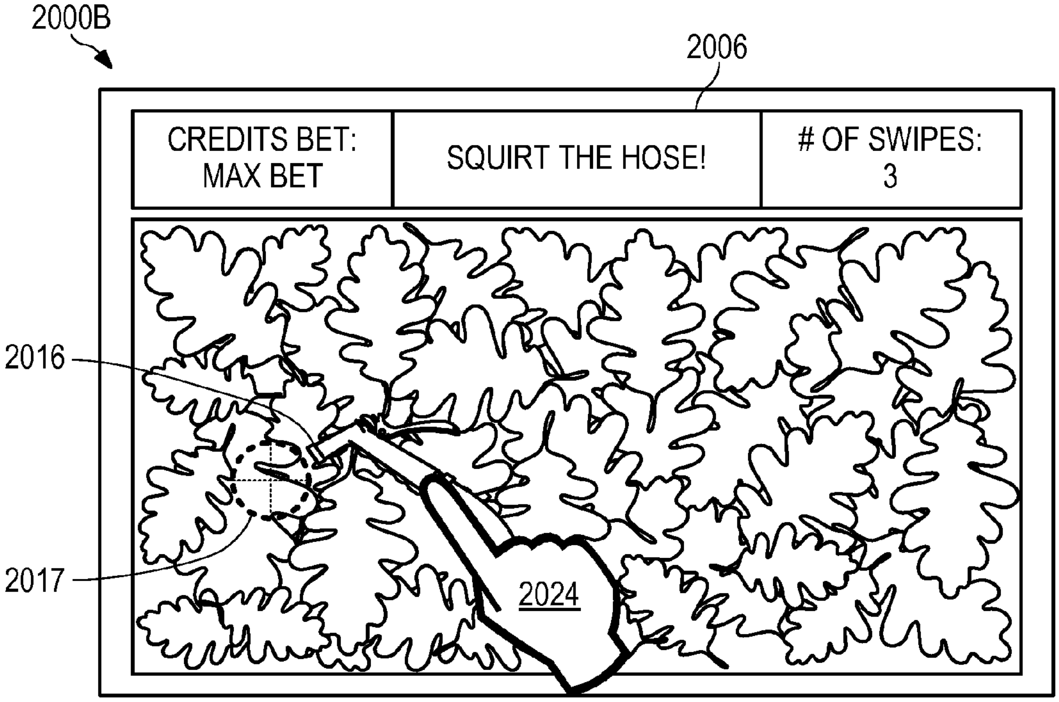
FIG. 20B is another illustration of utilizing a scrape away option on an electronic gaming device, according to one embodiment.

In FIG. 20A, another illustration of utilizing a scrape away option on an electronic gaming device is shown, according to one embodiment. A first image 2000A may include a projection screen 2002 (and/or any other secondary screen—not attached to the electronic gaming machine screen), a wagering amount area 2004, a tool picking message area 2006, a number of turns area 2008, a display area 2010, a first tool 2012, a second tool 2014, and a third tool 2016. The player via hand 2024 and/or any other selection method may select the third tool 2016. The player may utilize third tool 2016 and select a target point 2017 (see FIG. 20B).

Figure 20C:
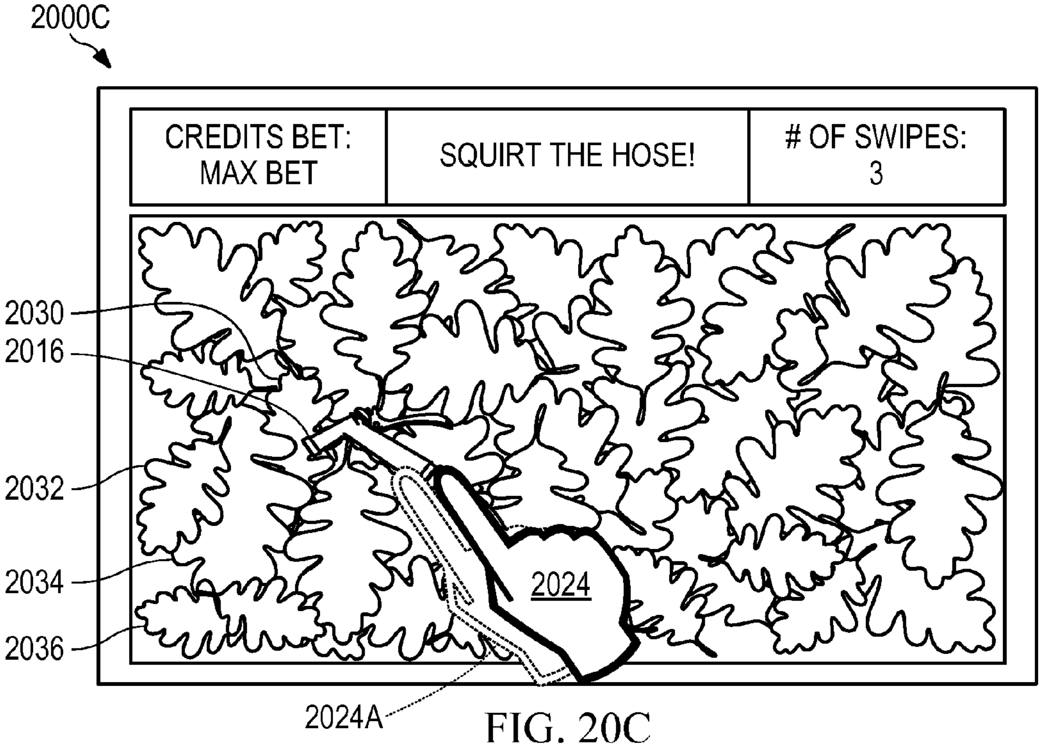
FIG. 20C is another illustration of utilizing a scrape away option on an electronic gaming device, according to one embodiment.

In this example, the player has targeted target point 2017 and initiated third tool 2016. In this example shown in FIG. 20C, third tool 2016 had the ability to remove a first object 2030, a second object 2032, a third object 2034, and a fourth object 2034. In one example, the player double-taps (e.g., reference numbers 2024 and 2024A) to initiate third tool 2016. In this example, the player can utilize the third tool 2016 three times as seen in the number of turn's area 2008.

Figure 20D:
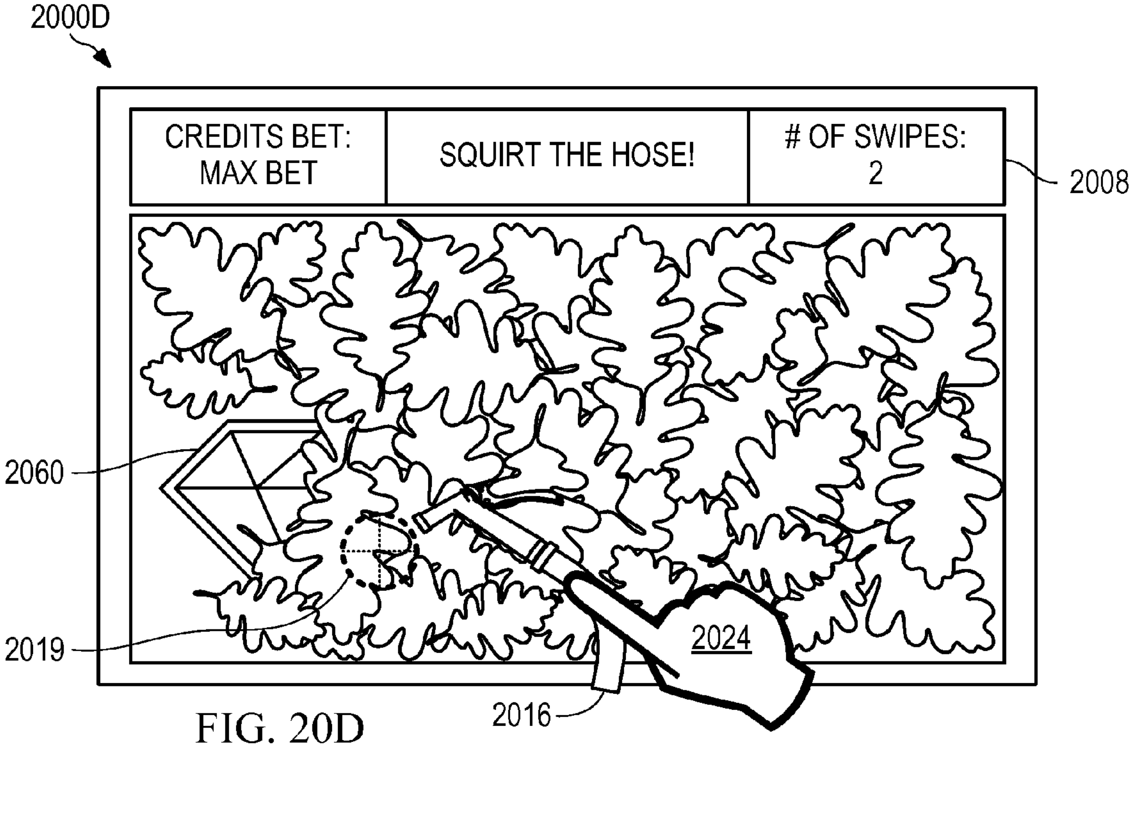
FIG. 20D is another illustration of utilizing a scrape away option on an electronic gaming device, according to one embodiment.
Figure 20E:
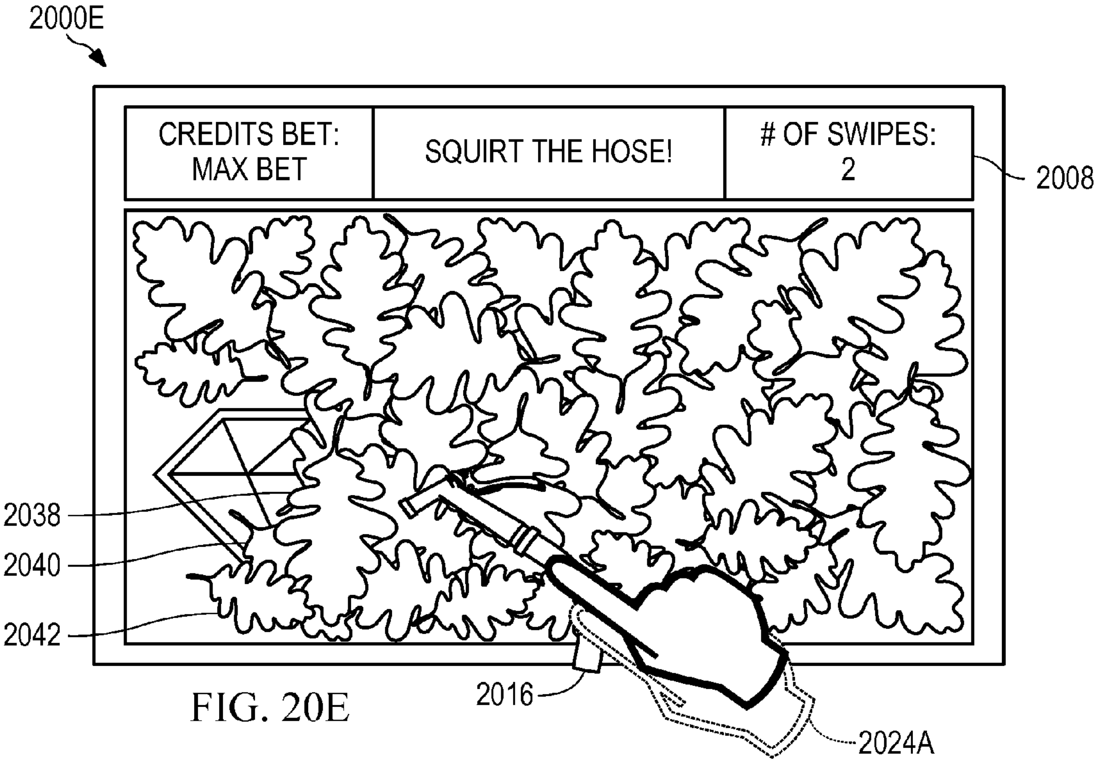
FIG. 20E is another illustration of utilizing a scrape away option on an electronic gaming device, according to one embodiment.

In FIG. 20D, another illustration of utilizing a scrape away option on an electronic gaming device is shown, according to one embodiment. In this example, the player has targeted a second target point 2019 and initiated third tool 2016. In this example shown in FIG. 20E, third tool 2016 had the ability to remove a fourth object 2038, a fifth object 2040, and a sixth object 2042. In one example, the player double-taps (e.g., reference numbers 2024 and 2024A) to initiate third tool 2016. In this example, the player can utilize the third tool 2016 two more times as seen in the number of turn's area 2008.

Figure 20F:
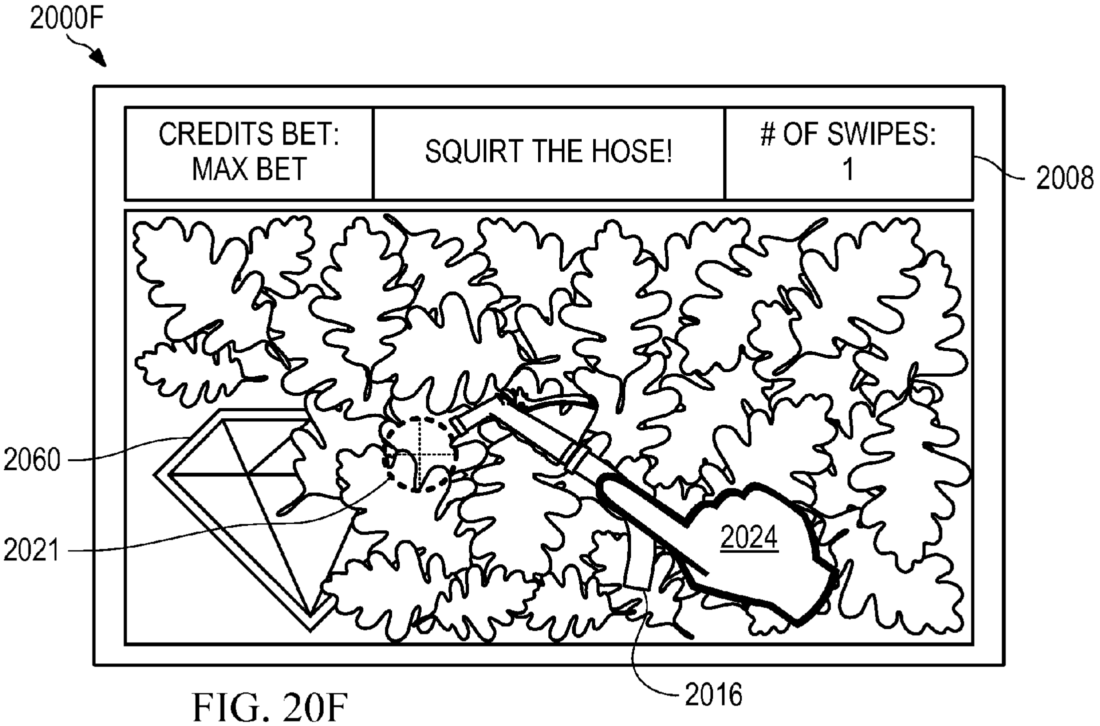
FIG. 20F is another illustration of utilizing a scrape away option on an electronic gaming device, according to one embodiment.
Figure 20G:
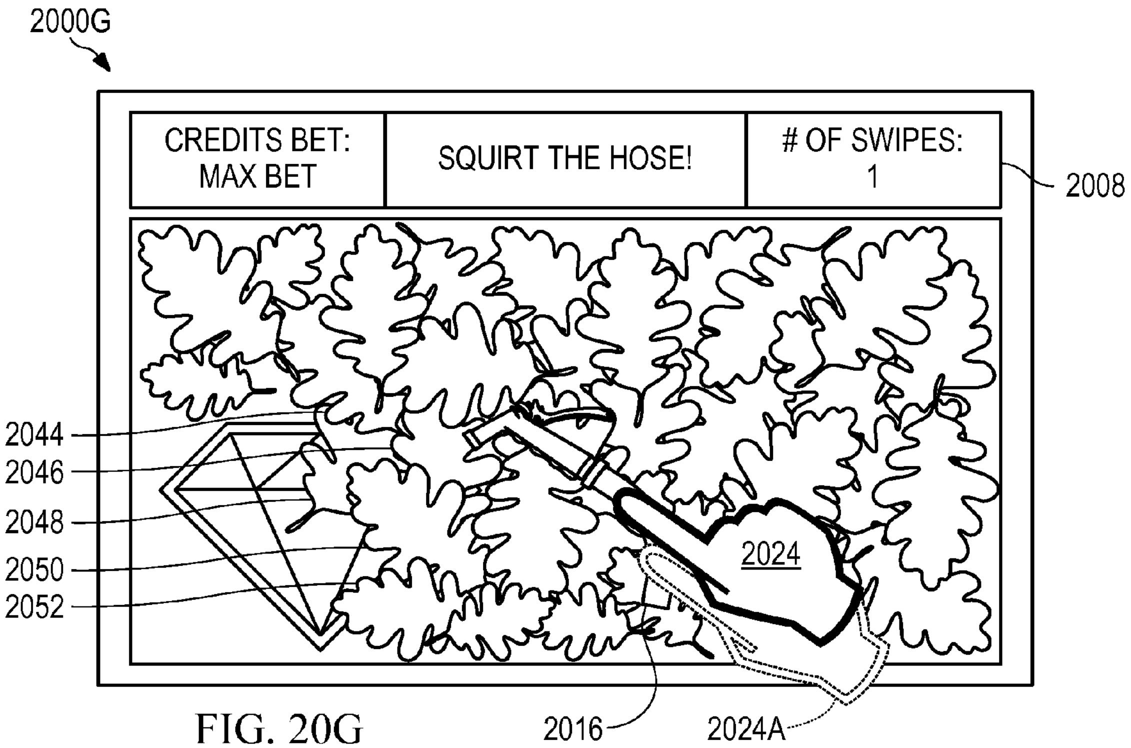
FIG. 20G is another illustration of utilizing a scrape away option on an electronic gaming device, according to one embodiment.
Figure 20H:
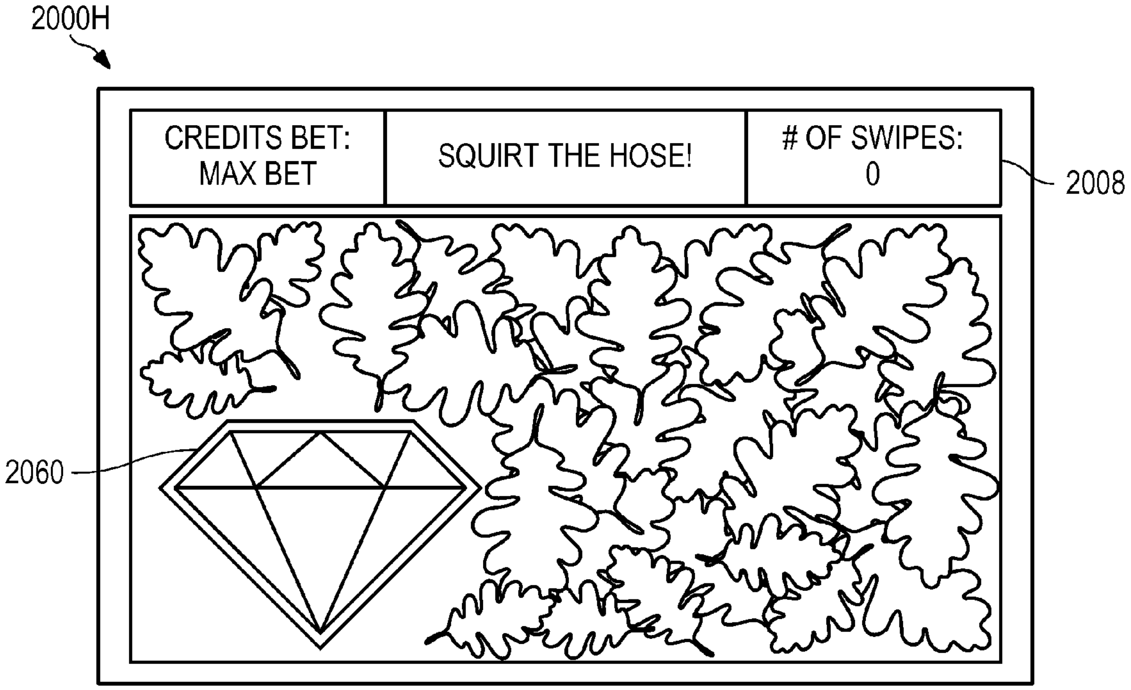
FIG. 20H is another illustration of utilizing a scrape away option on an electronic gaming device, according to one embodiment.
Figure 20J:
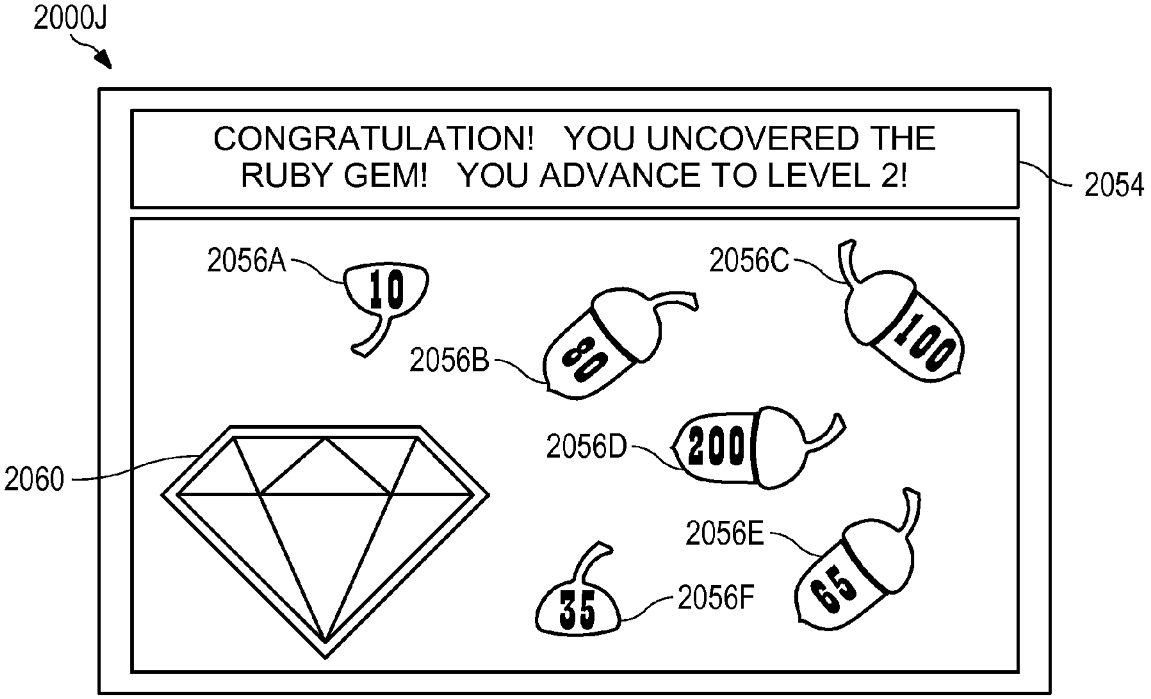
FIG. 20J is another illustration of utilizing a scrape away option on an electronic gaming device, according to one embodiment.

In FIG. 20F, another illustration of utilizing a scrape away option on an electronic gaming device is shown, according to one embodiment. In this example, the player has targeted a third target point 2021 and initiated third tool 2016. In this example shown in FIG. 20G, third tool 2016 had the ability to remove a seventh object 2044, an eighth object 2046, a ninth object 2048, a tenth object 2050, and an eleventh object 2052. In one example, the player double-taps (e.g., reference numbers 2024 and 2024A) to initiate third tool 2016. In this example, the player can utilize the third tool 2016 one more time as seen in the number of turn's area 2008. After the last tool utilization, the player has revealed a first prize 2060 (see FIG. 20H). In this example, first prize 2060, a second prize 2056A, a third prize 2056B, a fourth prize 2056C, a fifth prize 2056D, a sixth prize 2056E, and a seventh prize 2056F were available for the player to win. Second prize 2056A, third prize 2056B, fourth prize 2056C, fifth prize 2056D, sixth prize 2056E, and seventh prize 2056F are credit type prizes. Whereas, first prize 2060 rewarded the player by advancing game play to level 2 as seen in FIG. 20J. The message area stated "CONGRATULATION! YOU UNCOVERED THE RUBY GEM! YOU ADVANCE TO LEVEL 2!"

In various examples, the player may utilize third tool 2016, then utilize second tool 2014, then utilize first tool 2012, and then utilize third tool 2016 again. In other words, the player may change tools on different turns. If the player has four turns, then the player can change the tool four times. Further, the system, device, and/or method may allow the player to change tools less frequently. If there are N turns, then the player may change tools at less than N times.

Figure 21A:
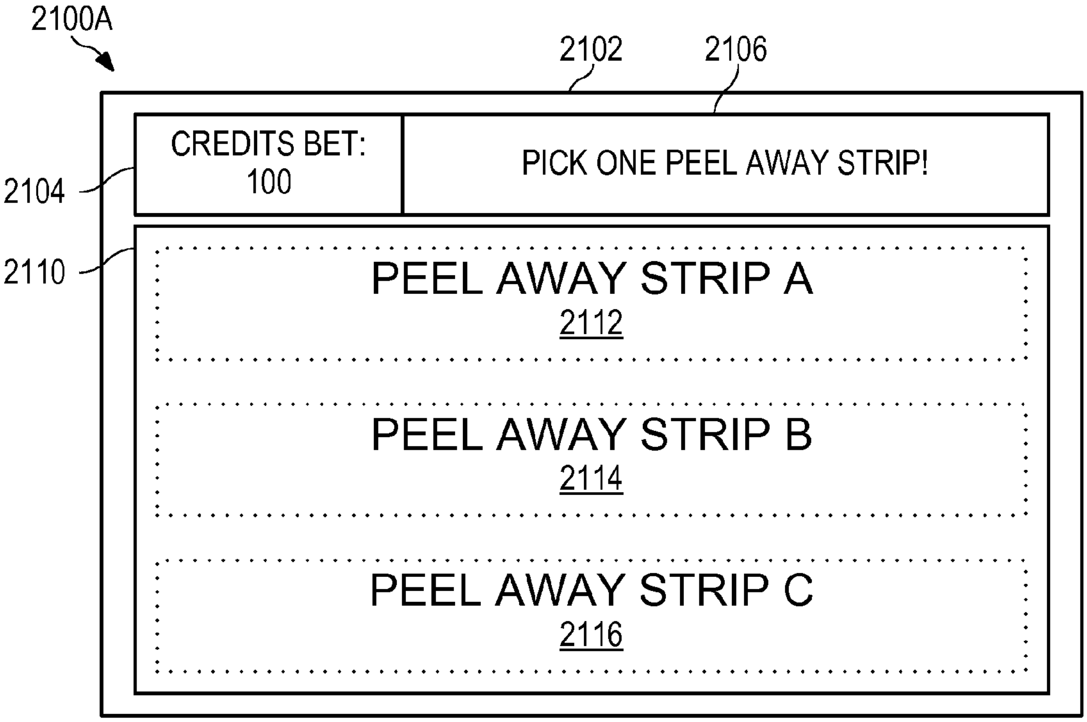
FIG. 21A is another illustration of utilizing a scrape away option on an electronic gaming device, according to one embodiment.

In FIG. 21A, another illustration of utilizing a scrape away option on an electronic gaming device is shown, according to one embodiment. A first image 2100A may include a display screen 2102, a credit wager amount area 2104, a message area 2106, a display area 2110, a first peel away option 2112, a second peel away option 2114, and a third peel away option 2116. Message area 2106 may state "PICK ONE PEEL AWAY STRIP!"

Figure 21B:
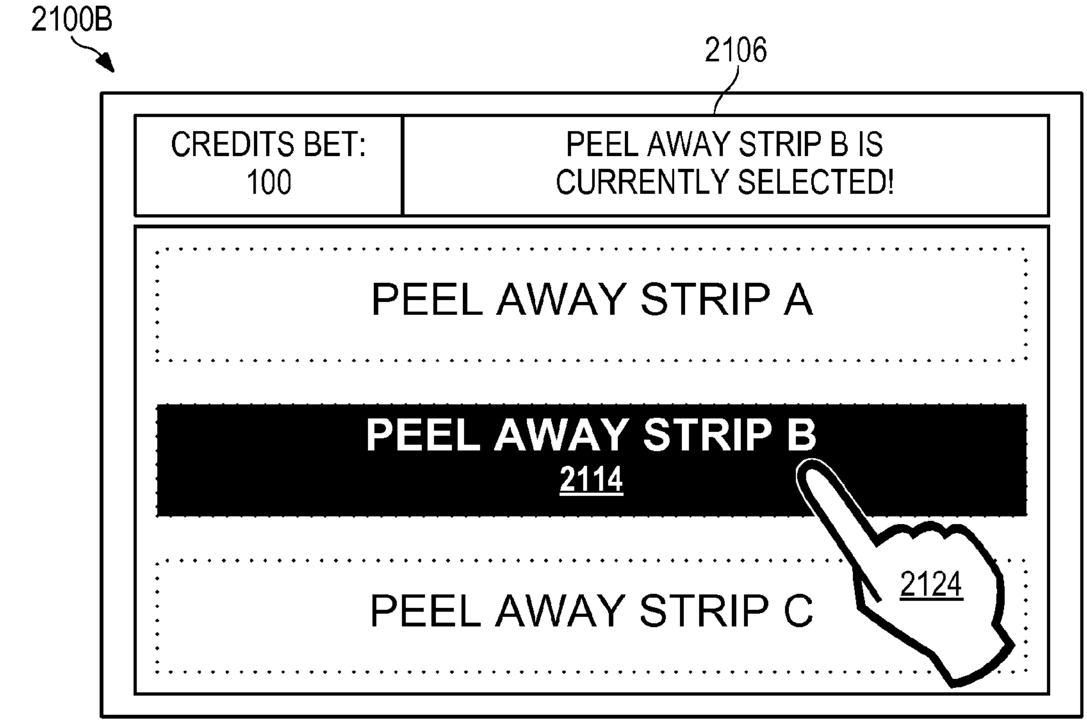
FIG. 21B is another illustration of utilizing a scrape away option on an electronic gaming device, according to one embodiment.
Figure 21C:
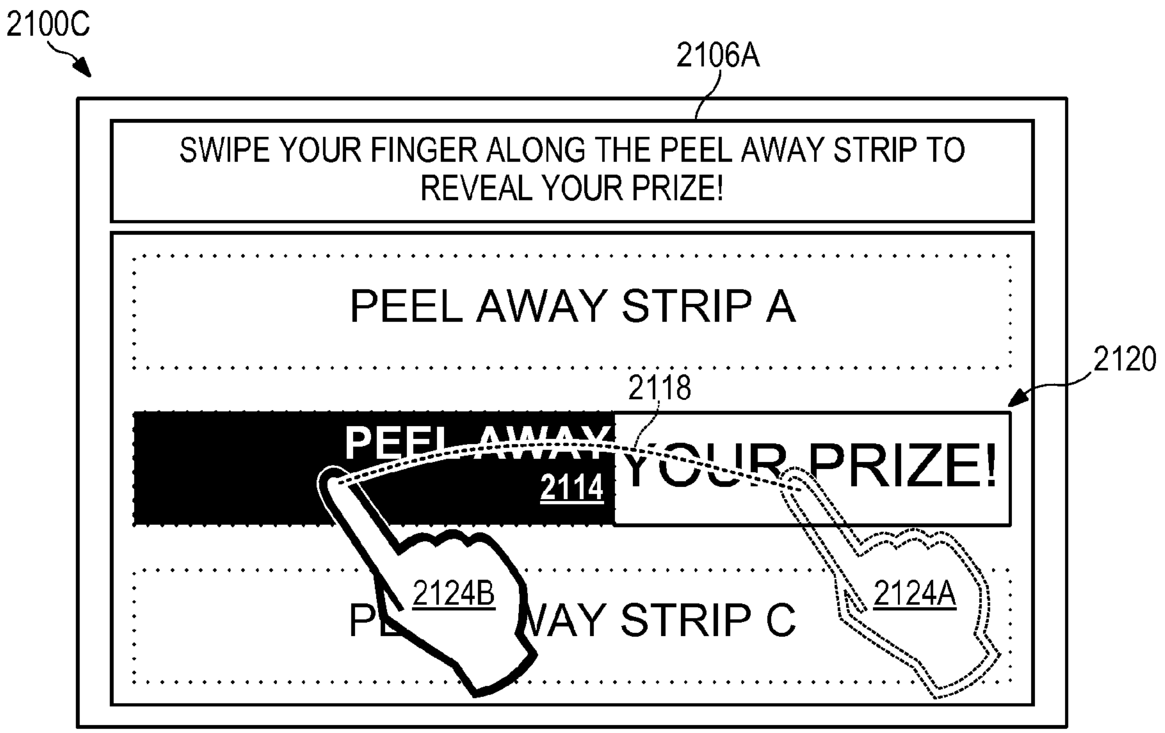
FIG. 21C is another illustration of utilizing a scrape away option on an electronic gaming device, according to one embodiment.
Figure 21D:
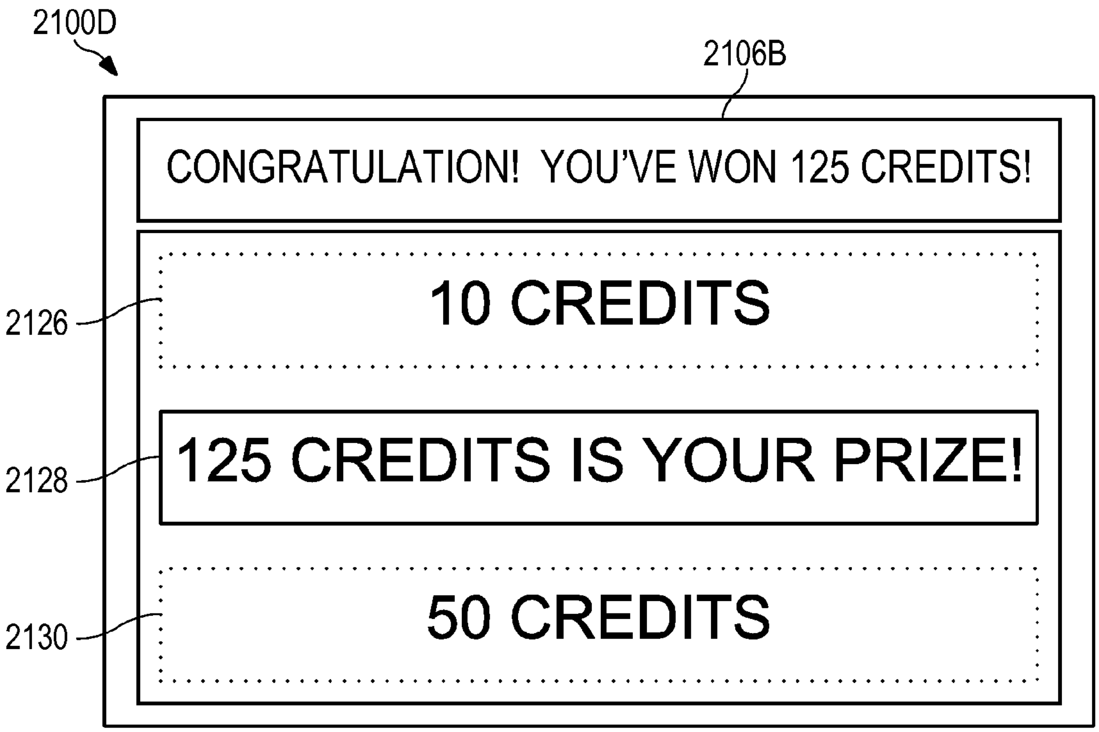
FIG. 21D is another illustration of utilizing a scrape away option on an electronic gaming device, according to one embodiment.

In this example, second peel away option 2114 may be selected by the player via a hand icon 2124 as shown in FIG. 21B. Message area 2106 may state "PEEL AWAY STRIP B IS CURRENTLY SELECTED!" In this example shown in FIG. 21C, the player may swipe their finger via a first path 2118 to reveal one or more prizes. In various examples, any other selection and/or revealing procedure may be utilized. In this example, a first prize 2120 may be revealed. In this example, a second prize 2126 which was not selected was 10 credits. Further, first prize 2120 may be 125 credits. In addition, a third prize 2130 which was not selected was 50 credits (see FIG. 21D).

Figure 22A:
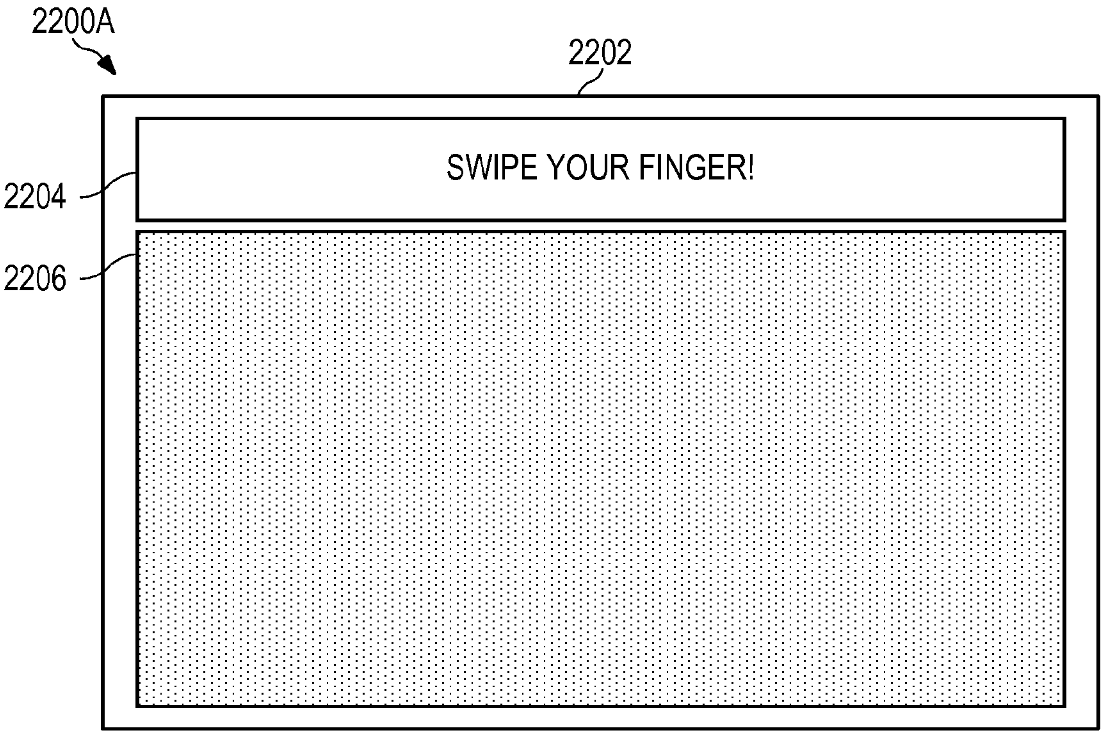
FIG. 22A is another illustration of utilizing a scrape away option on an electronic gaming device, according to one embodiment.
Figure 22B:
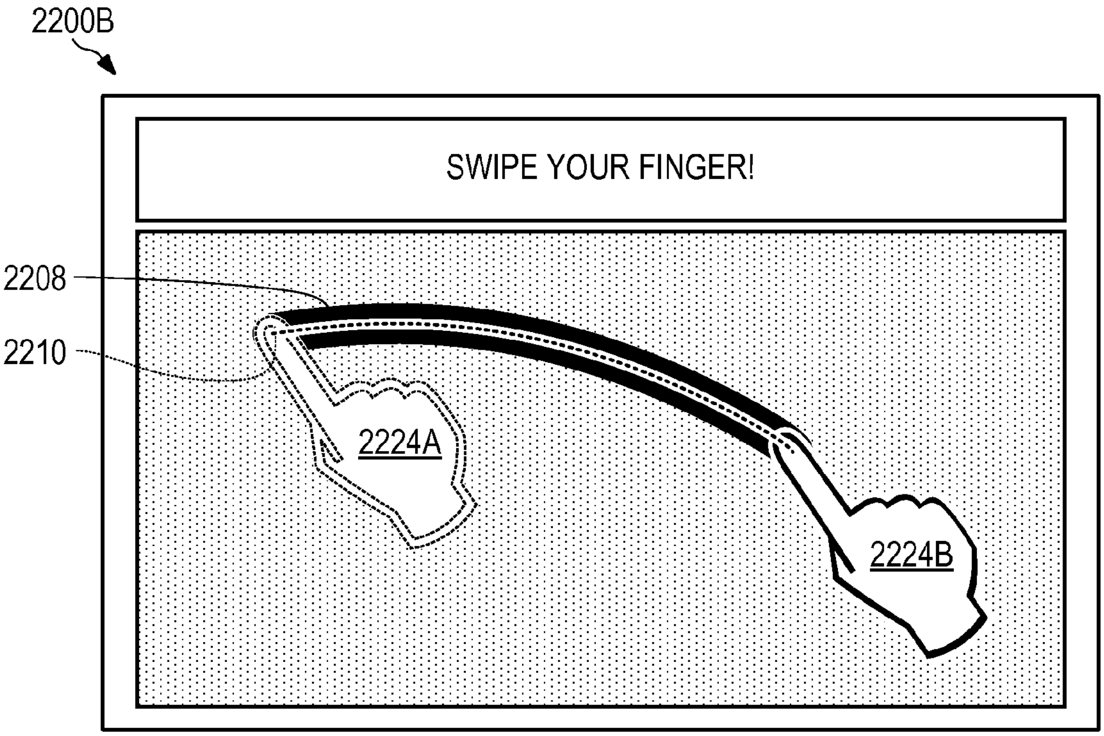
FIG. 22B is another illustration of utilizing a scrape away option on an electronic gaming device, according to one embodiment.
Figure 22C:
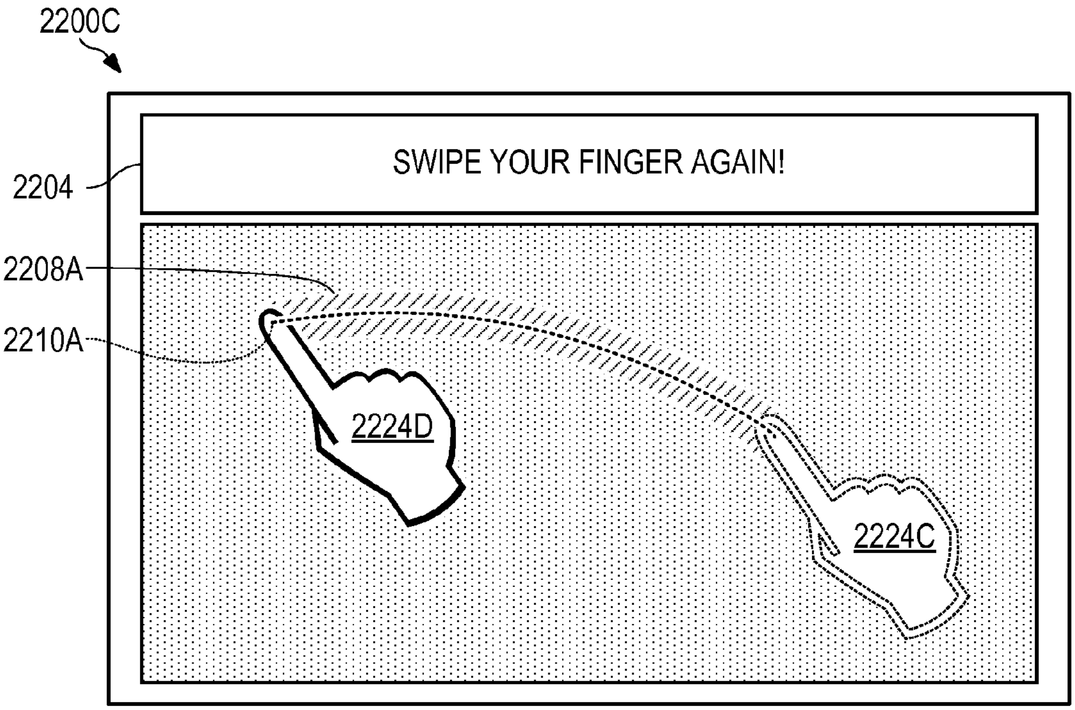
FIG. 22C is another illustration of utilizing a scrape away option on an electronic gaming device, according to one embodiment.
Figure 22D:
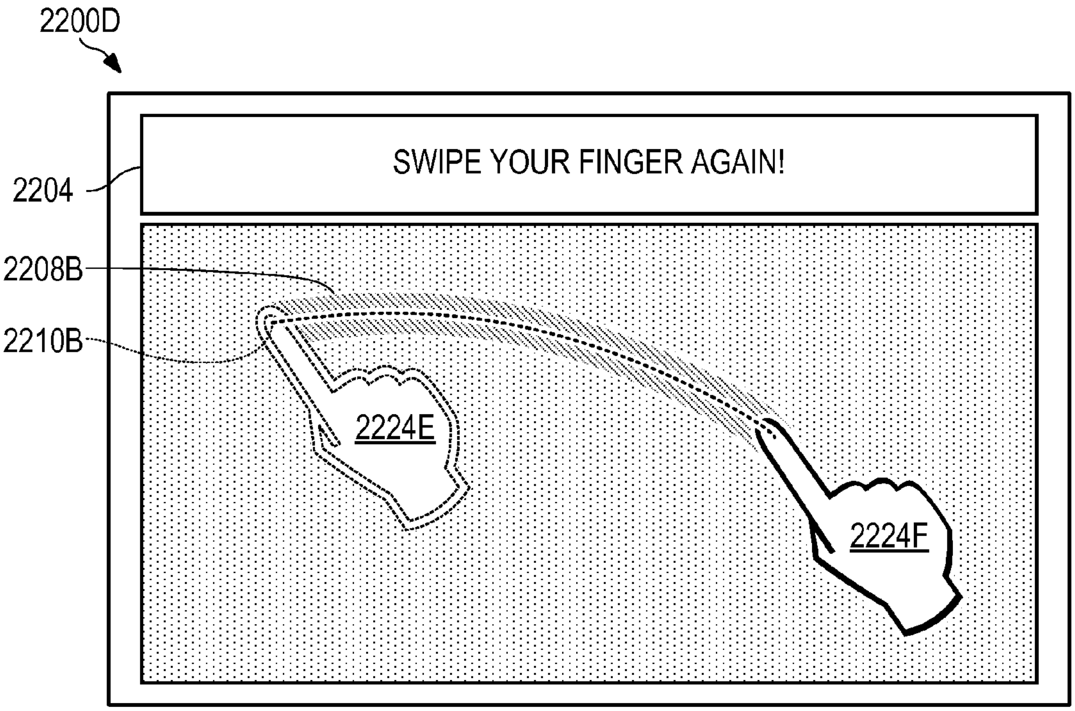
FIG. 22D is another illustration of utilizing a scrape away option on an electronic gaming device, according to one embodiment.
Figure 22E:
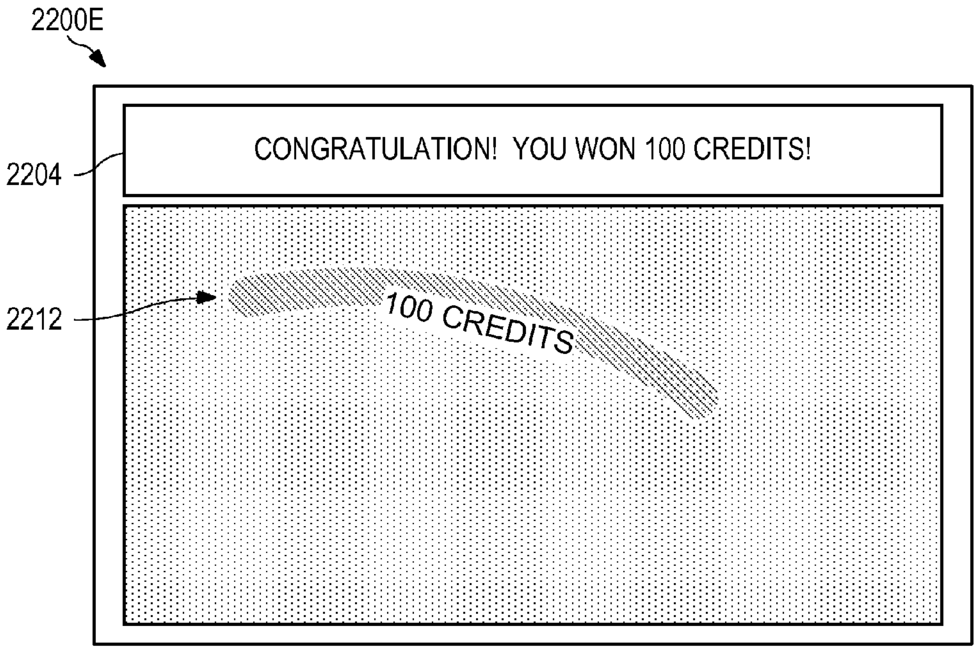
FIG. 22E is another illustration of utilizing a scrape away option on an electronic gaming device, according to one embodiment.
Figure 22F:
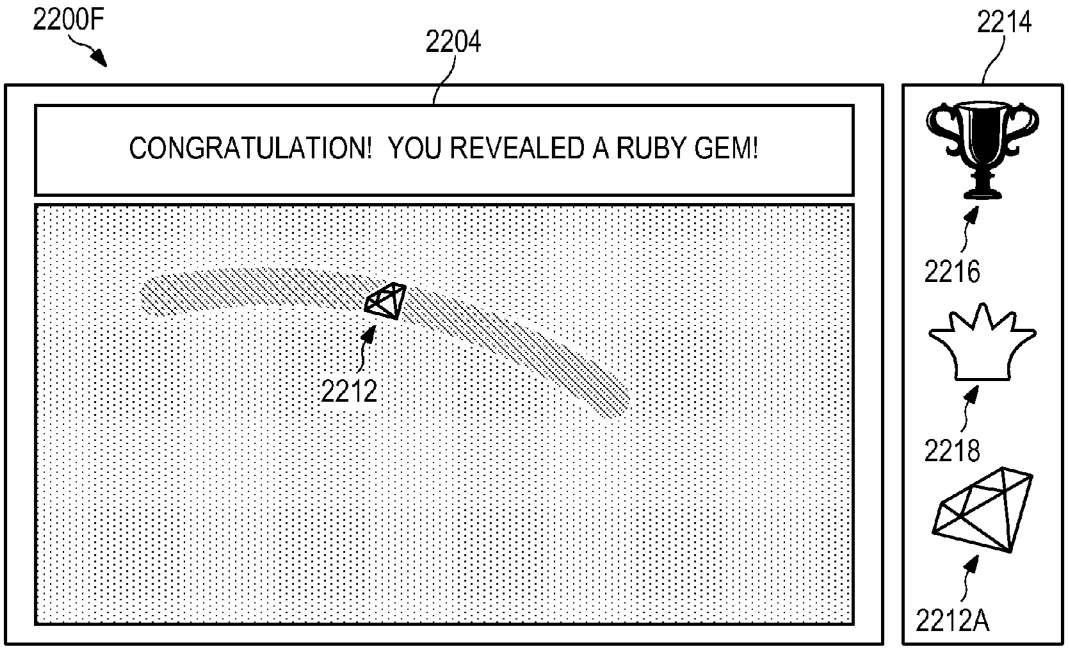
FIG. 22F is another illustration of utilizing a scrape away option on an electronic gaming device, according to one embodiment.

In FIG. 22A, another illustration of utilizing a scrape away option on an electronic gaming device is shown, according to one embodiment. A first image 2200A may include a display screen 2202, a message area 2204, and an active screen area 2206. The player may swipe via a first path 2210 along the active screen area 2206 (e.g., reference numbers 2224A and 2224B) (see FIG. 22B). In this example, the first path 2210 created a first color area 2208. The player may make a second swipe via a second path 2210A along the active screen area 2206 (e.g., reference number 2224C and 2224D) (see FIG. 22C). In this example, the second path 2210A created a second color area 2208A. The player may make a third swipe via a third path 2210B along the active screen area 2206 (e.g., reference number 2224E and 2224F) (see FIG. 22D). In this example, the third path 2210B created a third color area 2208B. In one example shown in FIG. 22E, after the player removes a certain number of levels (e.g., changes in color areas) the player obtains a first prize (e.g., 100 credits). In another example shown in FIG. 22F, after the player removes a certain number of levels (e.g., changes in color areas) the player obtains the first prize 2212 (e.g., ruby gem—Level changing prize). In various examples, a first level changing prize 2212, a second level changing prize 2216, a third level changing prize 2218, and a fourth level changing prize 2212A can be won by the player.

Figure 23A:
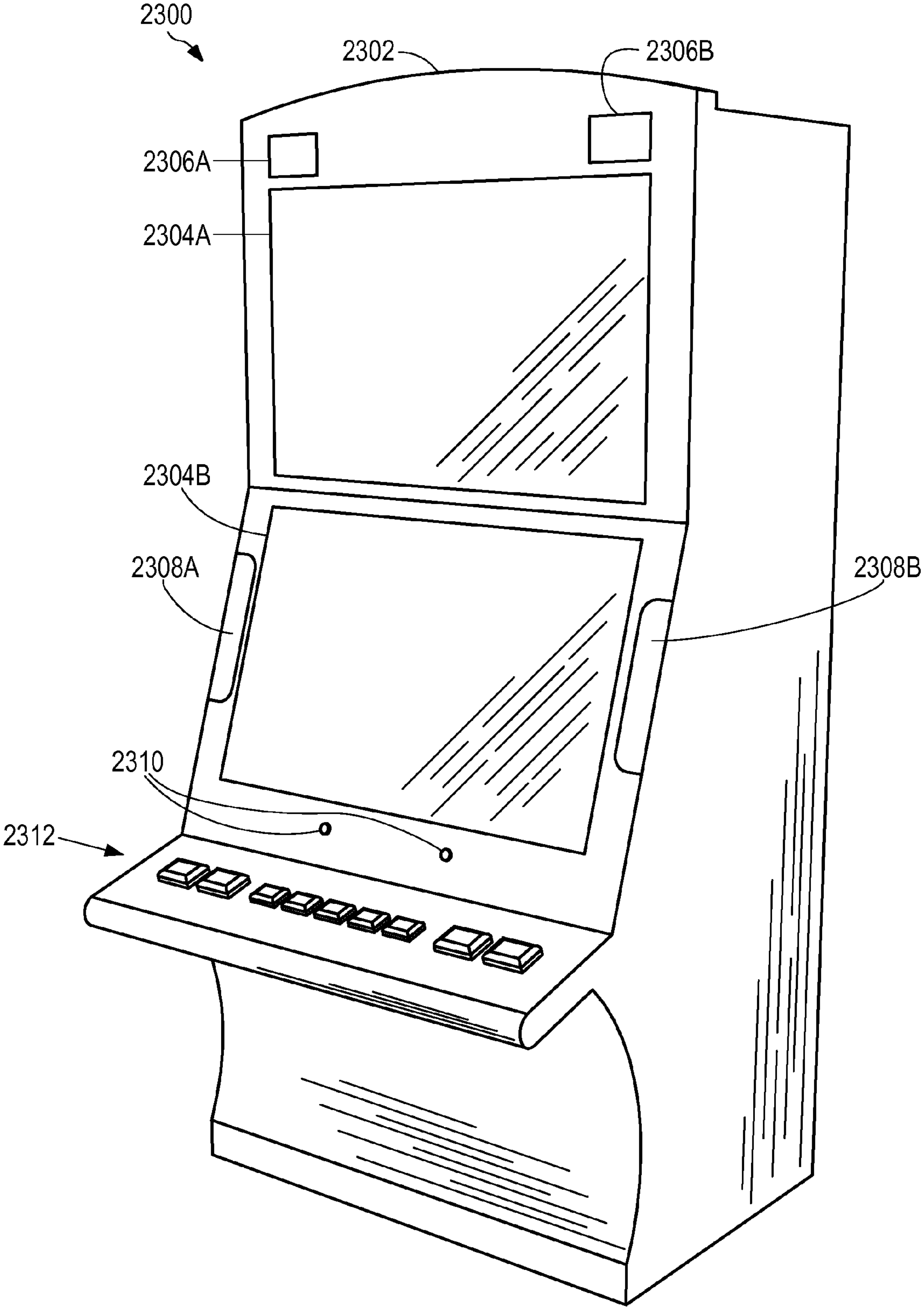
FIG. 23A is another illustration of utilizing a scrape away option on an electronic gaming device, according to one embodiment.

In FIG. 23A, another illustration of utilizing a scrape away option on an electronic gaming device is shown, according to one embodiment. A first image 2300 may include a gaming cabinet front. In one example, gaming cabinet front 2302 may serve as the primary face of electronic gaming device 100 to interact with a player and/or allow a player to interact with electronic gaming device 100.

Electronic gaming device 100 may include at least one display device. As illustrated in FIG. 23A, electronic gaming device 100 may include a base display 2304B and/or a second display 2304A. In one embodiment, base display 2304B may be the primary display for a first game. In another embodiment, the second display 2304A may be the primary display for a second and/or bonus game. For example, base display 2304B may display a reel-type video slot game, and upon a triggering condition, second display 2304A may display a bonus game.

In one embodiment, base display 2304B and second display 2304A may display separate portions of a common image. For example, second display 2304A may display a top portion of a wheel spinning while the base display 2304B may display the bottom portion of the same wheel spinning.

Electronic gaming device 100 may also include one or more speakers 2306A and 2306B. In one embodiment, one or more speakers 2306A and 2306B may work in a synchronized manner to provide a surround sound effect. For example, as an object is displayed moving across base display 2304B from left to right, one or more speakers 2306A and 2306B may produce sound in such a manner as to create an audible sense of similar left to right movement. In another embodiment, the one or more speakers 2306A and 2306B may work asynchronously. In another embodiment, a first speaker (e.g., 2306A) may produce sounds associated with a first symbol appearing in a play of a game, and a second speaker (e.g., 2306B) may produce sounds associated with a second symbol appearing in a play of the game.

Electronic gaming device 100 may further include one or more side lights 2308A and 2308B. In one embodiment, the one or more side lights 2308A and 2308B may primarily be used to increase the appeal of electronic gaming device 100. For example, one or more side lights 2308A and 2308B may flash, change intensity, and/or change color while the game is in a state of non-use, which may attract a person walking by electronic gaming device 100. In another example, one or more side lights 2308A and 2308B may flash, change intensity, and/or change color based on a particular outcome achieved in a play of a game on electronic gaming device 100, which may create excitement for a player as it may create a noticeable event attracting other players in the area. In another embodiment, one or more side lights 2308A and 2308B may have one or more functional purposes. In one example, side lights 2308A and 2308B may supplement and/or replace the functionality typically provided by a gaming system candle, which may work to identify specific gaming machines for casino personnel and/or specific conditions of such gaming machines.

Electronic gaming device 100 may also include one or more input devices 2312. In one embodiment, one or more input devices 2312 may include physical buttons. In one embodiment, one or more input devices may include a touchscreen device. For example, a touchscreen device associated with base display 2304B may act as an input device. In another example, a separate touchscreen device may be located on gaming cabinet front and may represent physical buttons. In one embodiment, one or more input devices 2312 may include a keypad, a mouse, a rollerball, a joystick, a pedal, and/or any combination thereof.

Electronic gaming device 100 may also include one or more depth image sensing devices 2310. While FIG. 23A may display one or more depth image sensing devices 2310 located below base display 2304B, it is contemplated that one or more depth image sensing devices 2310 may be located in various locations, including but not limited to, above base display 2304B, above second display 2304A, in one or more locations on gaming cabinet front, on a side of the gaming cabinet other than gaming cabinet front, and/or any other location. In another example, one or more cameras may be utilized only and/or in conjunction with one or more depth image sensing devices 2310.

In one embodiment, electronic gaming device 100 may not include separate one or more input devices 2312, but instead may only utilize one or more depth image sensing devices 2310. In another embodiment, a player may utilize one or more input devices 2312 and/or may utilize gestures that electronic gaming device 100, via one or more depth image sensing devices 2310, recognizes in order to make inputs for a play of a game. As discussed more fully below, a player may interact with electronic gaming device 100 via one or more depth image sensing devices 2310 for a plurality of various player inputs.

In one embodiment, one or more depth image sensing devices 2310 may include at least two similar devices. For example, each of the at least two similar devices may independently sense depth and/or image of a scene. In another example, such similar depth image sensing devices may then communicate information to one or more processors, which may utilize the information from each of the similar depth image sensing devices to determine the relative depth of an image from a captured scene.

In another embodiment, one or more depth image sensing devices 2310 may include at least two different devices. For example, and discussed in more detail below, one of the at least two different devices may be an active device and/or one of the at least two different devices may be a passive device. In one example, such an active device may generate a wave of measurable energy (e.g., light, radio, etc.). In another example, such a passive device may be able to detect reflected waves generated by such an active device. In another example, such an active device and such a passive device may each communicate data related to their respective activity to a processor, and such processor may translate such data in order to determine the depth and/or image of a scene occurring near electronic gaming device 100.

Figure 23B:
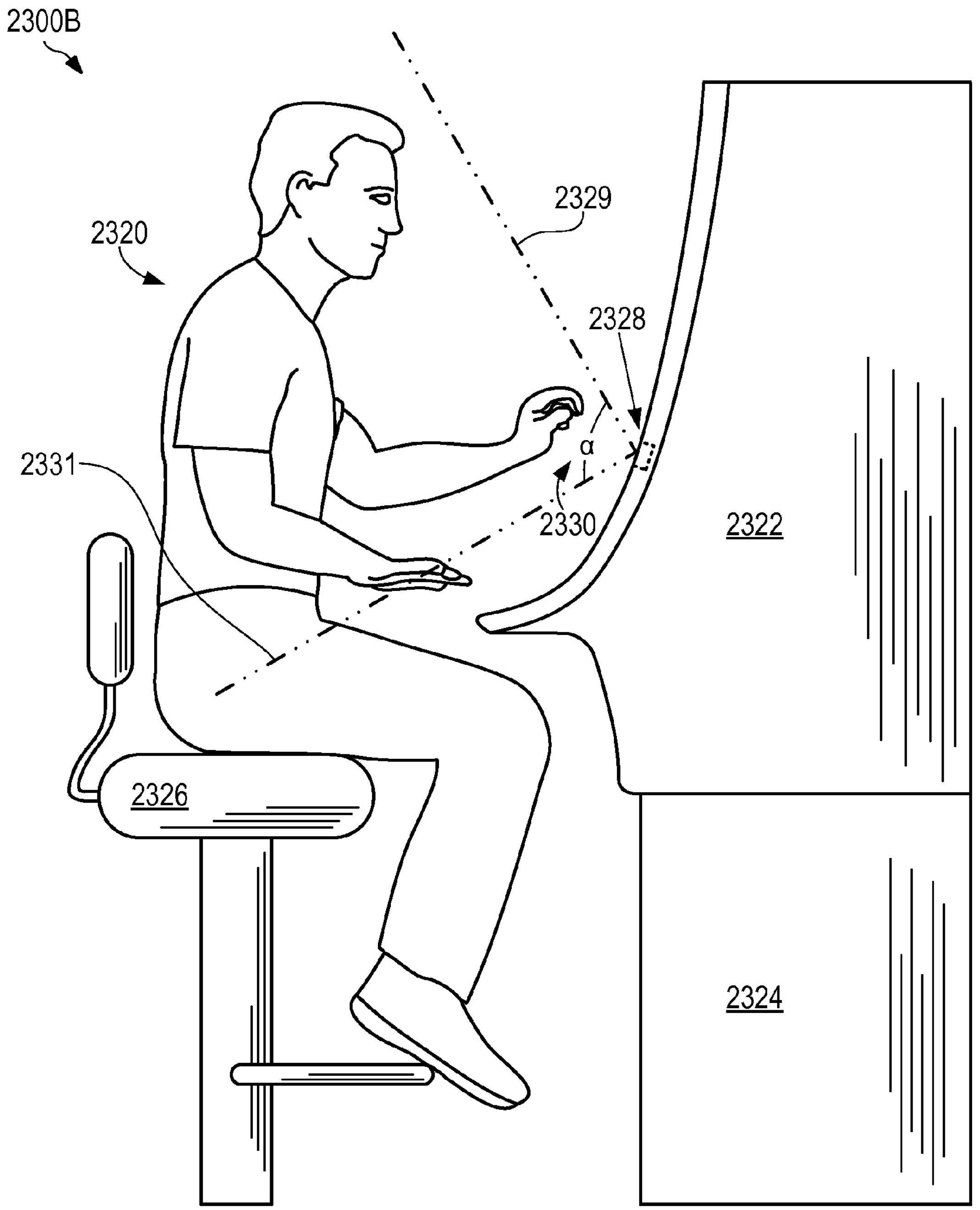
FIG. 23B is another illustration of utilizing a scrape away option on an electronic gaming device, according to one embodiment.

In FIG. 23B, another illustration of utilizing a scrape away option on an electronic gaming device is shown, according to one embodiment. In this illustrative example, a player 2320 may be seated on a seat 2326 in front of an exemplary gaming system. Gaming system may have a gaming cabinet side 2322, which may be immediately adjacent to gaming cabinet front from FIG. 23A. The gaming system may be positioned on a base 2324 (e.g., pedestal) in order to provide, in association with seat 2326, a more comfortable environment for the interaction and/or playing of the gaming system.

The gaming system of FIG. 23B may also include one or more depth image sensing devices 2310 on the gaming cabinet front, which is represented in FIG. 23B by hidden lines at 2328. In one embodiment, one or more depth image sensing devices 2310 may have a first field edge 2329 and a second field edge 2331, which together may help define a field angle 2330. It should be appreciated that since FIG. 23B is a 2D drawing, first field edge 2329, second field edge 2331, and field angle 2330 are illustrated as 2D lines and angles respectively for illustrative purposes only, and that in a real world 3D application, such field edges and field angle may be accurately represented in various different manners. For example, first field edge 2329, second field edge 2331, and field angle 2330 may be 2D representations of a sample segment of a 3D cone-shaped field. In another example, first field edge 2329, second field edge 2331, and field angle 2330 may be 2D representations of a sample segment of multiple, partially overlapping 3D cone-shaped fields. It should be appreciated that representations of field angles and field boundaries contained herein may simply be exemplary in nature, and may not intend to limit the extent of any particular field angle and/or field boundary.

In one embodiment, first field edge 2329, second field edge 2331, and field angle 2330 may define the limits of a scene, which is capable of being sensed by one or more depth image sensing devices 2310 (and/or 2328). For example, if a portion of a scene occurs outside of both the first field edge 2329 and second field edge 2330, then one or more depth image sensing devices 2310 may not recognize such an occurrence, and therefore may not detect any change thereof. In another embodiment, first field edge 2329, second field edge 2331, and field angle 2330 may define relative limits of a scene, which is capable of being sensed by one or more depth image sensing devices 2310 to a relative degree of certainty. For example, if a portion of a scene repeatedly occurs just above the first field edge 2329, then one or more depth image sensing devices 2310 may only recognize such occurrence a percentage of the time (e.g., 10%).

In one embodiment, first field edge 2329, second field edge 2331, field angle 2330, and/or any combination thereof may move and/or shift to obtain one or more scenes. For example, first field edge 2329 and second field edge 2331 may move while keeping field angle 2330 constant. This movement may be based on the movement of one or more objects. In one example, a person moving from scene one to scene two may trigger the movement and/or shifting of first field edge 2329, second field edge 2331, field angle 2330, and/or any combination thereof.

In one embodiment, player 2320 may not be made aware of first field edge 2329 and/or second field edge 2331. In another embodiment, player 2320 may be made aware of first field edge 2329 and/or second field edge 2331. This may occur via a display screen, which indicates the viewable area (e.g., sensed area). In one example, one or more depth image sensing devices 2310 may include, and/or electronic gaming device 100 may separately include, a visible light generator which may cause a light that is generally visible to the human eye to be generated along first field edge 2329 and/or second field edge 2331. In one example, such a visible light may be a visible laser. In another example, such a visible light might be a colored light.

In another example, one or more depth image sensing devices 2310 includes, and/or electronic gaming device 100 separately includes, a visible light generator which may cause a light that is generally visible to the human eye to be generated along a different field edge from both the first field edge 2329 and/or second field edge 2331. For example, depth image sensing device 2328 may include a visible light generator which generates a visible light having two field edges which are in between first field edge 2329 and/or second field edge 2331, such that the visible light's field angle is smaller than field angle 2330. In such an example, such a smaller visible light field angle may be beneficial in informing player 2320 of a more optimal field for which scene changes may be detected.

Figure 24A:
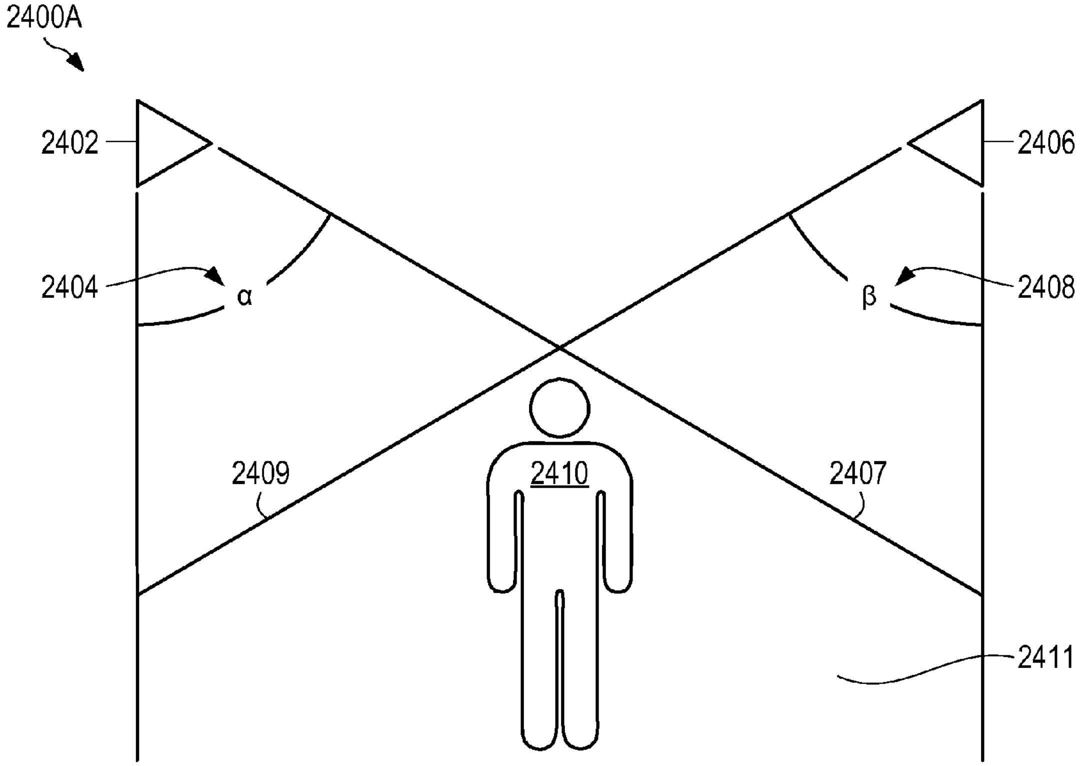
FIG. 24A is another illustration of utilizing a scrape away option on an electronic gaming device, according to one embodiment.

FIG. 24A may illustrate an exemplary top plan view of one or more depth image sensing devices 2310, in accordance with one embodiment. As illustrated, one or more depth image sensing devices 2310 may include a first source 2402. First source 2402 may have a source angle 2404. One or more depth image sensing devices 2310 may also include a first sensor 2406, which may have an associated sensor angle 2408. Source angle 2404 and sensor angle 2408 may together define a first field edge 2407 and a second field edge 2409. Together, first field edge 2407 and second field edge 2409 may define a field for which a body 2410 may be detected.

In one embodiment, first source 2402 may be a light source. In one example, first source 2402 may be a light source that produces a light that is typically not visible to the human eye. In another example, first source 2402 may be an infrared ("IR") light source.

In one embodiment, first sensor 2404 may be an active-pixel sensor ("APS"). In another embodiment, first sensor 2404 may be a complementary metal-oxide-semiconductor sensor ("CMOS sensor"). In another embodiment, first sensor 2404 may be a charge-coupled device ("CCD") image sensor. In another embodiment, first sensor 2404 may be an APS imager or an active-pixel image sensor.

In one embodiment, first source 2402 may be a sound source. In one example, first source 2402 may be a sound source that produces a sound that is typically not perceptible to the human ear. In another example, first source 2402 may produce an ultrasonic sound wave.

In one embodiment, first sensor 2404 may be a piezoelectric transceiver. In another embodiment, first sensor 2404 may include one or more piezoelectric crystals. In another embodiment, first sensor 2404 may include one or more microphones.

In one embodiment, operation of one or more depth image sensing devices 2310 may include first source 2402 generating waves of energy within source angle 2404, and first sensor 2406 may detect the return, bouncing, and/or distortion of such generated waves within first sensor angle 2408. For example, first source 2402 may generate an IR light, which may illuminate and reflect or otherwise bounce off of physical objects located within first field 2410, and first sensor 2406 may be a CMOS sensor, which may detect such reflected IR light. In this manner, it is possible to analyze the resulting data, which may include data about the IR light transmission and the resulting detection of the reflected IR light, to determine the composition of a scene occurring within first field 2411.

In one embodiment, the composition of a scene and/or body occurring at least partially within an associated field may be determined in a 3D basis (and/or a 2D basis). In one example, one or more depth image sensing devices 2310 may help determine the relative depth and/or position of multiple physical objects within an associated field. In another example, the movement of a physical object within an associated field may be detected in a 3D sense, and the associated gaming system may respond to such 3D movements, as discussed more fully below. In one example, one or more depth image sensing devices 2310 may help determine the identity of one or more physical objects within an associated field. For example, an IR light source may illuminate a player's hand, and an associated CMOS sensor may detect the reflected IR light off of the player's hand, and the processing of the data from the IR light source and/or the CMOS sensor may then recognize the object within the scene as a player's hand.

In one embodiment, a source may be a laser, which may be beamed across an entire field of play, and a sensor may measure reflected light. In one example, the sensor may detect varying colors of reflected light, and an associated game logic controller may interpret the varying colors to determine objects and/or object depths within the field of play. It should be appreciated that laser light sources may, when reflected off of objects, have different characteristics such as color, depending on the size and/or location of the objects. In one embodiment, the source is a light source. In another embodiment, the source is an IR light source. In one embodiment, the sensor may be an IR video graphics array ("VGA") camera.

In one embodiment, one or more depth image sensing devices 2310 may include a capacitive proximity sensor, a capacitive displacement sensor, a Doppler effect sensor, an eddy-current sensor, an inductive sensor, a laser rangefinder, a magnetic sensor, a magnetic proximity fuse, a passive optical sensor, a passive thermal infrared sensor, a photocell sensor, a radar, a reflection of ionizing radiation sensor, sonar, an ultrasonic sensor, and/or any combination thereof.

In one embodiment, one or more depth image sensing devices 2310 may include a video camera. In one example, such a video camera may detect objects and movement. The data from the video camera may be used to determine a relative 2D position and/or movement of such objects.

In one embodiment, one or more depth image sensing devices 2310 may include only a single source and/or only a single sensor. In another embodiment, one or more depth image sensing devices 2310 may include multiple sources and/or multiple sensors. In another embodiment, one or more depth image sensing devices 2310 may include various-sized sources and sensors. For example, a large depth image sensing device may capture larger movements, such as the moving and/or waving of a player's arm, while a smaller depth image sensing device may capture more fine movements, such as the moving of a player's fingers.

In various embodiments, one or more sources, one or more sensors, one or more field edges, one or more fields, one or more field levels, one or more field strengths, and/or any combination thereof may be moved, shifted, strengthened, weakened, varied, and/or modified in any way to obtain one or more scenes.

In one embodiment, one or more scenes (e.g., moving, static, and/or any other type) may be obtained from one or more gaming devices to generate a bigger scene. For example, a first gaming device may obtain a first scene image of three people doing an activity (e.g., playing an interactive game), a second gaming device may obtain a second scene image of two people doing the same activity, and a third gaming device may obtain a third scene image of four people watching the same activity. In one example, these images (e.g., first scene image, second scene image, and/or third scene image) may be combined to generate an integrated scene of all nine people (e.g., three from first scene image, two from second scene image, and four from third scene image).

In one embodiment, one or more depth image sensing devices 2310 may include a video camera. In one example, such a video camera may detect objects and movement. The data from the video camera may be used to determine a relative 2D position and/or movement of such objects. In another example, the 2D data may be combined with 3D data to generate one or more scenes.

In one embodiment, one or more depth image sensing devices may include only a single source and/or only a single sensor. In another embodiment, one or more depth image sensing devices may include multiple sources and/or multiple sensors. In another embodiment, one or more depth image sensing devices may include various-sized sources and sensors. In one example, a single gaming system may include one or more larger sized depth image sensing devices and may also include one or more smaller sized depth image sensing devices. In one example, the use of multiple but different-sized sources and sensors may help in capturing both large scene changes as well as small scene changes, which may add both reliability and functionality to such a gaming system. For example, a large depth image sensing device may capture larger movements, such as the moving and/or waving of a player's arm, while a smaller depth image sensing device may capture more fine movements, such as the moving of a player's fingers.

In various examples, the gaming system may utilized one or more small sized depth image sensing devices (e.g., one or more sources and/or one or more sensors), one or more medium sized depth image sensing devices (e.g., one or more sources and/or one or more sensors), one or more large sized depth image sensing devices (e.g., one or more sources and/or one or more sensors), and/or any combination thereof.

Figure 24B:
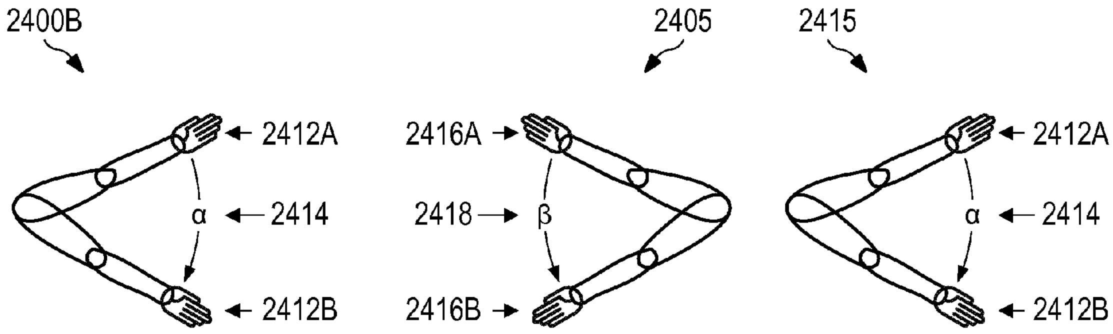
FIG. 24B is another illustration of utilizing a scrape away option on an electronic gaming device, according to one embodiment.

FIG. 24B is an illustration of exemplary human gesturing inputs, according to one embodiment. FIG. 24B may generally illustrate both a left arm gesture 2405 and a right arm gesture 2415.

Referring to left arm gesture 2405, one or more depth image sensors may detect a player's left arm movement. It should be appreciated that a gaming system may detect and/or interpret movements of a left and/or a right arm, in accordance with exemplary FIG. 24B, and that for descriptive purposes only the illustrated arms are identified as "left" or "right" arms, but that the teachings herein apply equally to the non-identified arm. For example, left arm gesture 605 illustrates a left arm, but the teachings herein apply equally to a right arm.

In one embodiment, a gaming system 200 may determine a first left arm limit of movement 2412A and/or a second left arm limit of movement 2412B. In another embodiment, the gaming system may determine based on one or more left arm limits of movement a left arm angle of movement 2414.

In one example, the gaming system may determine an average left arm angle of movement 2414 from multiple determined left arm angles of movements. For example, if a player waved his arm up and down five times, the gaming system may determine five separate left arm angle of movement 2414, and may then average the five separate left arm angle of movements to determine a left arm angle of movement to utilize as a player's input. In another example, a gaming system may compare one left arm angle of movement 2414 to one or more reference models in order to determine the correlative player input to associate with the player's gesturing. In another example, the gaming system and/or method may evaluate one or more data points to determine whether the parameters are within a certain range to initiate game play and/or any other action.

In another embodiment, the gaming system may interpret data received from the one or more depth image sensing devices to determine components of a detected body part. For example, the gaming system may detect a player moving his left arm (e.g., 2405), and may detect the relative position of the player's shoulder, elbow, and/or wrist, as also generally shown at 2405. In another example, the gaming system may determine, from the plurality of possible angles created by movement of the shoulder, elbow, and/or wrist, a reference left arm angle of movement to utilize as a player's input.

In one example, left arm gesture 2405 may be used to place a wager on a play of a game. For example, a gaming system may determine that a player moved his hand from first left arm limit of movement 2412A to second left arm limit of movement 2412B, which may indicate that the player wishes to bet a predetermined maximum amount (and/or start the game). The game system may then implement the bet, and then wait for an input to begin the game. In another example, the gaming system may query the player to confirm the received input. For example, the gaming system may repeat the gesture it registered in order to attempt to avoid any misinterpreted inputs. In another example, a confirmation may happen once by obtaining the player's agreement that all, a plurality, some, a few, and/or one movement is binding.

In another example, for each of a plurality of left arm gesture 2405 a player may make, the gaming system increments the bet per line that will be applied to the next play of the game. For example, if a player makes five up-and-down movements, the gaming system would interpret the movements as an indication that the player wishes to bet five credits per line.

In another example, the direction of movement may also provide additional data utilized by the gaming system to determine the player input. For example, a movement in one direction (e.g., from first left arm limit of movement 2412A to position second left arm limit of movement 2412B) may indicate a desired input of increasing a bet, while a movement in a different direction (e.g., from position of second left arm limit of movement 2412B to position of first left arm limit of movement 2412A) may indicate a desired input of decreasing a bet. In this manner, the player may have a simple mechanism to control their desired input, yet may have sufficient enough control to make specific selections, and/or may correct certain inputs.

In another example, the gaming system may attempt to detect left arm angle of movement 2414 in real time and may increase or decrease a wager depending on the detected angle. For example, a gaming system may detect a player's arm at first left arm limit of movement 2412A, and may further detect the player's arm as it moves to second left arm limit of movement 2412B, and may dynamically determine an associated left arm angle of movement 2414, and may increase the wager as left arm angle of movement 2414 changes (e.g., increases) and/or decrease the wager as left arm angle of movement 2414 changes (e.g., decreases). In one example, the gaming system may determine the final desired wager after left arm angle of movement 2414 remains relatively unchanged for a period of time (e.g., 1 to 2 seconds, etc.). In another example, the gaming system may determine one or more actions based on comparing one or more movements with one or more profiles on a player's card. In another example, the gaming system may determine one or more actions based on comparing one or more movements to a movement history during a current playing session (e.g., the system learns the player's moves).

In another example, left arm angle of movement 2414 may at least partially indicate a desired aspect of the player's input. For example, a left arm movement (e.g., 2405) may indicate a player's desire to spin a set of reels to begin a new play of a game. In another example, the gaming system may detect an associated left arm angle of movement 2414 with the player's input in order to determine a rate of reel spin. For example, a greater left arm angle of movement 2414 may be interpreted by the gaming system to indicate a desired faster spin, while a smaller left arm angle of movement 2414 may be interpreted by the gaming system to indicate a desired slower rate of reel spin. In another example, the gaming system may instead of, or in addition to, interpreting left arm angle of movement 2414 to determine the speed of reel spin, interpret the time it takes a player to move his hand from first left arm limit of movement 2412A to second left arm limit of movement 2412B to determine the speed of reel spin. For example, if a player moves his hand from a first position (e.g. 2412A) to a second position (e.g., 2412B) in a very rapid manner, the gaming system may interpret such movement as indicating a desire to spin the reels at a faster pace (e.g., from speed one to speed two).

In another example, the gaming system may interpret the direction of movement in order to determine the direction of reel spin. For example, if a player moved his hand from a top position (e.g., 2412A) to a bottom position, the gaming system may interpret such movement as a desire to spin the reels in a traditional top-to-bottom manner. In another example, if a player moved his hand from a bottom position (e.g., 2412B) to a top position (e.g., 2412A), the gaming system may interpret such movement as a desire to spin the reels in a less traditional bottom-to-top manner.

In another example, left arm gesture 2405 may be utilized by a gaming system to determine the number of paylines a player desires to wager on. In one example, detection of a movement by a player's arm from a first position (e.g., 2412A) to a second position (e.g., 2412B) may be interpreted by the gaming system as an input to increase the number of paylines that will be actively played in a subsequent play of the game. In another example, detection of a movement by a player's arm from a second position (e.g., 2412B) to a first position (e.g., 2412A) may be interpreted by the gaming system as an input to decrease the number of paylines that will be actively played in a subsequent play of the game. In another example, the gaming system may attempt to detect left arm angle of movement 2414 in real time and may increase or decrease the number of active paylines depending on the detected angle. For example, a gaming system may detect a player's arm at first left arm limit of movement 2412A, and may further detect the player's arm as it moves to second left arm limit of movement 2412B, and may dynamically determine an associated left arm angle of movement 2414, and may increase the number of active paylines as left arm angle of movement 2414 changes (e.g., increases) and/or decrease the number of active paylines as left arm angle of movement 2414 changes (e.g., decreases). In one example, the gaming system may determine the final desired number of active paylines after left arm angle of movement 2414 remains relatively unchanged for a period of time (e.g., 1 to 2 seconds, etc.).

An exemplary two arm gesture 2415 may be detected and/or interpreted by a gaming system. A two arm gesture 2415 may include a first right arm limit of movement 2416A and/or a second right arm limit of movement 2416B, along with left arm gesture 2405 (and reproduced adjacent to right arm gesture 2415A for illustrative purposes). In another embodiment, the gaming system may determine based on one or more right arm limits of movement a right arm angle of movement 2418. All examples utilized in this disclosure may be utilized with two arm gesture 2415 including any example disclosed with left arm gesture 2405.

In one embodiment, one or more commands interpreted by a gaming system via one or more depth image sensors may require additional movements by a player, which may be beneficial to attempt to avoid misinterpreted gestures. In one such example, a player may input a desired wager via an appropriate left arm gesture 2405, but may be required by the gaming system to confirm the wager by producing an adequate right arm movement 2415. For example, after a player has input a desired wager via left arm gesture 2405, right arm gesture 2415A, and/or two arm gesture 2415, which may happen to be lifting the left arm up-and-down once, the player may then be required to confirm the determined wager by providing an appropriate right arm gesture 2415, which may happen to be moving the right arm from left-to-right. In one example, a player may be required to move his right arm from first right arm limit of movement 2416A to second right arm limit of movement 24168, so that right arm angle of movement 618 meets and/or exceeds a predetermined angle.

In another embodiment, both (e.g., two arm gesture 2415) left arm gesture 2405 and right arm gesture 2415A may be utilized by a gaming system to determine that a player desires to bet maximum on a subsequent game. In one example, if a gaming system detects that a player has made gestures with both arms (e.g., 2415), then the gaming system may interpret such gestures as a player's input to bet the maximum amount, and may therefore not require additional input to confirm the wager and/or may not be required to further analyze associated angle of movements (e.g. 2414 and/or 2418) and/or other gestures for the purposes of determining an exact one of a plurality of possible inputs. In such an embodiment, it may be desirable to utilize two simultaneous gestures to indicate a "maximum" input, such as a maximum bet, in order to reduce a need to require a separate confirmation input and/or an exact gesture and/or associated gesture recognition to determine an exact input, which individually and/or collectively may slow down the rate of play on a gaming system by the player.

In another embodiment, both left arm gesture 2405, right arm gesture 2415A, and/or two arm gesture 2415 may be utilized by gaming system 200 to determine that a player desires to play a maximum number of paylines for a subsequent game. In one example, if a gaming system detects that a player has made gestures with both arms (e.g., 2415), then the gaming system may interpret such gestures as a player input to play a maximum number of paylines, and may therefore not require additional input to confirm the wager and/or may not be required to further analyze associated angle of movements (e.g., 2414 and/or 2418) and/or other gestures for the purposes of determining an exact one of a plurality of possible inputs. In such an embodiment, it may be desirable to utilize two simultaneous gestures to indicate a "maximum" input, such as all paylines, in order to reduce a need to require a separate confirmation input and/or an exact gesture and/or associated gesture recognition to determine an exact input, which individually or collectively may slow down the rate of play on a gaming system by the player.

In one embodiment, one arm gesture (e.g., 2405) may be utilized to increase an input, and a different arm gesture (e.g., 2415A) may be utilized to decrease an input. For example, left arm gesture 2405 may be utilized to increase the number of paylines to be played and/or the wager per payline, and right arm gesture 2415A may be utilized to decrease the number of paylines to be played and/or wager per payline.

In one embodiment, it may be desirable to allow a player to only use a single arm to make inputs in place of an input that may also allow the use of two arms. It is contemplated that such a feature would be useful in allowing the utilization of such a gaming system by persons that do not have two complete arms and/or have difficulty using both arms. In one such example, a player may be able to utilize left arm gesture 2405 to indicate a desired bet, and then may be able to fold their arm across their body so that it is in a similar position of right arm gesture 2415A, and make an appropriate right arm gesture to confirm the wager.

Figure 24C:
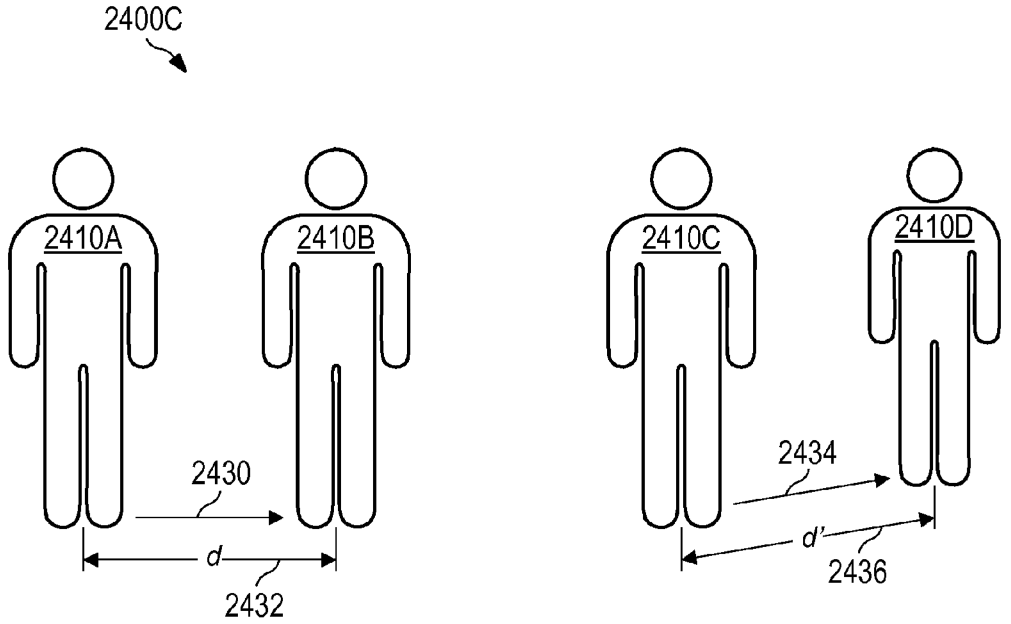
FIG. 24C is another illustration of utilizing a scrape away option on an electronic gaming device, according to one embodiment.

In FIG. 24C, another illustration of exemplary human gesturing inputs is shown, according to one embodiment. FIG. 24C illustrates one or more multiplayer embodiments.

In one embodiment, one or more depth image sensing devices may detect two or more players in 2D. One example of this embodiment may include the detection of a first 2D player 2410A and a second 2D player 2410B. In another example, a gaming system may, via one or more depth image sensing devices, determine a 2D effective distance 2430 between a first 2D player 2410A and a second 2D player 2410B. In another example, the gaming system may determine a 2D median distance 2432 between such players.

In one embodiment, one or more depth image sensing devices may detect two or more players in 3D. One example of this embodiment may include the detection of a first 3D player 2410C and a second 3D player 2410D. In another example, a gaming system may, via one or more depth image sensing devices, determine a 3D effective distance 2434 between first 3D player 2410C and second 3D player 2410D. In another example, the gaming system may determine a 3D median distance 2436 between such players.

In one embodiment, a community gaming event may allow for multiple players to make gestures as inputs to a play of the event. For example, a gaming system may allow for a first player (e.g., 2410A or 2410C) making an input to the community game and may allow a second player (e.g., 2410B or 2410D) to also make an input to the community game. In one embodiment, such inputs by first and second players may be simultaneous. In one embodiment, such inputs by first and second players may follow an indicated order.

In one embodiment, a gaming system may include a community display device. In another embodiment, the community display device may be utilized to display a community game. In another embodiment, the community game may include one or more objects and/or characters that are individually and/or collectively modified based on one or more detected characteristics of a first player (e.g., 2410A or 2410C) and/or a second player (e.g., 2410B or 2410D).

For example, a community display may present a community price guessing game, wherein each player is allowed to make a single guess as to the price of a certain item. In one example, the gaming system may determine that a first player (e.g., 2410A or 2410C) may make a first selection, and may display instructions for the first player to stand and move his/her body to a position that equates to his/her selection. In one example, the community display device may present an icon moving along a listing of prices, wherein the movement may be correlated with the movement of the first player (e.g., 2410A or 2410C), and may stop based on when the first player (e.g., 2410A or 2410C) stops. The community display may then present a second icon moving along the listing of prices, wherein the movement may be correlated with the movement of the second player (e.g., 2410B or 2410D), and may stop based on when the second player (e.g., 2410B or 2410D) stops. The community display may then reveal the actual price and the determined winner based on the relative proximity of each of the players.

In one embodiment, a gaming system may utilize the relative position of multiple persons in order to determine their associated community game position. For example, gaming system 200 may determine the location of a first player (e.g., 2410A or 2410C) based on the detection of the first player relative a fixed point, and may then determine the location of a second player (e.g., 2410B or 2410D) based on the detection of the second player relative to the first player. In one such example, a gaming system may determine and/or utilize a detected effective distance (e.g. 2430 or 2434) and/or a mean distance (2432 or 2436).

In one embodiment, a community display device may present instructions in conjunction with a play of a community game to position two or more players relative to each other. For example, a gaming system may detect an effective distance (e.g. 2430 or 2434) and/or a mean distance (2432 or 2436) between two players, and instruct them to move based on such determination. In one example, it may be desirous to move players further apart for safety reasons, and/or may prevent a collision amongst players during play of the community game. In another example, instructions may be in written and/or verbal form, and may be communicated to the players via one or more audio/visual devices. In another example, a community display device may present icons indicative of each player, and may include a graphical illustration, which may help suggest where the players are suggested to move. For example, a community display device may present two virtual contestants; each one associated with a different real-world player, and may include a graphical indication of danger and/or arrows to indicate to the players that they are positioned too close to each other for an upcoming play of a community game. In another example, a player may move from a first position 2410A to a second location 2410B to initiate one or more actions. In another example, a play may jump from a third position 2410C to a fourth position 2410D to initiate one or more actions.

Figure 24D:
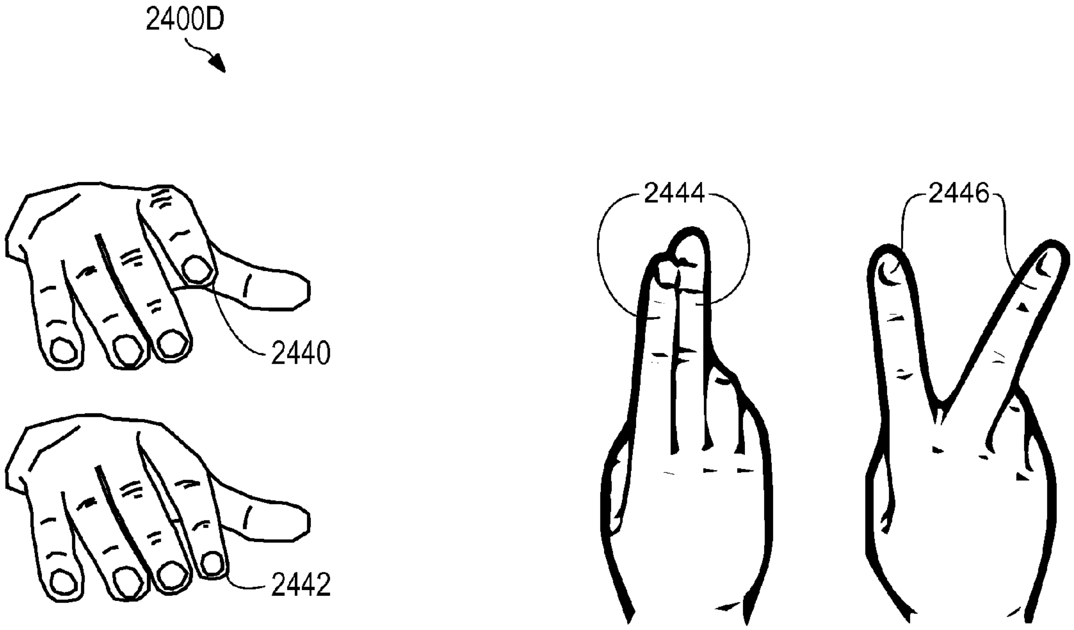
FIG. 24D is another illustration of utilizing a scrape away option on an electronic gaming device, according to one embodiment.

FIG. 24D is another illustration of exemplary human gesturing inputs, according to one embodiment. FIG. 24D may illustrate exemplary single hand movements, which may be detected and/or interpreted by a gaming machine, according to one embodiment herein.

In one embodiment, a gaming system, via one or more depth image sensors, may detect and/or interpret a single finger gesture 2445. In another embodiment, a gaming system may detect and/or interpret an individual finger moving from a first finger position 2440 to a second finger position 2442. In another embodiment, a gaming system may detect and/or interpret a multi-finger gesture 2455. In another embodiment, a gaming system may detect and/or interpret multiple fingers in a first double finger position 2444 and then may detect and/or interpret multiple fingers in a second double finger position 2446. In still another embodiment, a gaming system may detect one or more fingers moving from a first position (e.g., 2440 or 2444) to a second position (2442 or 2446). In another embodiment, a gaming system may detect one or more fingers in a first position (e.g., 2440 or 2444) at a first time, and then may detect the one or more fingers in a second position (e.g., 2442 or 2446) at a second time, and the gaming system may then determine one or more gestures (e.g., actions) to associate with such detection. In one embodiment, a gaming system may interpret a single movement of a player's one or more fingers from a first position (e.g. 2440 or 2444) to a second position (e.g., 2442 or 2446) as indicating a desired player input. In another embodiment, a gaming system may require repetitive movements of a player's one or more fingers from a first position (e.g. 2440 or 2444) to a second position (e.g., 2442 or 2446) before attributing a desired player input. In other example, gaming system 200 and/or method may utilize player profiles, dynamic learning models, data from a loyalty card, and/or any other process to determine player input.

In one embodiment, gaming system 200 may detect a player gesture including the movement of one or more fingers, and may determine a desired player input to attribute to such detected gesture. In one example, gaming system 200 may comprise a blackjack game, and gaming system 200 may attribute a "hit" input to a repetitive single finger gesture 645, and/or may attribute a "split" input to multi-finger gesture 2455.

In one example, one or more finger gestures may be detected and/or interpreted in order to provide input into a secondary and/or bonus game. For example, a bonus game may include an offer/acceptance game mechanic, and a player may have the ability to accept a current offer by utilizing one or more finger gestures (e.g., 2445, 2455, etc.).

In another example, one or more finger gestures may be utilized to determine input related to parameters for a game. For example, one or more finger gestures may be utilized to input a player's desired wager. In one example, a player may move a finger from a first position (e.g., 2440) to a second position (e.g., 2442), and gaming 200 system may increment the wager based on such movements and/or gestures. In another example, gaming system 200 may increment the wager based on each such movements and/or gestures it detects prior to initiation of a new game. In another example, a player may move a finger from a first position (e.g., 2440) to a second position (e.g., 2442), and gaming system 200 may increment the number of active paylines based on such movements or gestures. In another example, gaming system 200 may increment number of active paylines based on each such movements or gestures it detects prior to initiation of a new game.

In one example, a gaming system may begin a new play of the game based on one or more finger gestures (e.g., 2445, 2455, etc.). For example, a gaming system may cause a plurality of reels to spin based on the detection of one or more multiple finger gestures (e.g., 2455). In one example, a gaming system may require a multiple finger gesture in order to begin a new play of a game in order to insure that a more deliberate gesture is received in an attempt to avoid misinterpreted gestures.

Figure 24E:
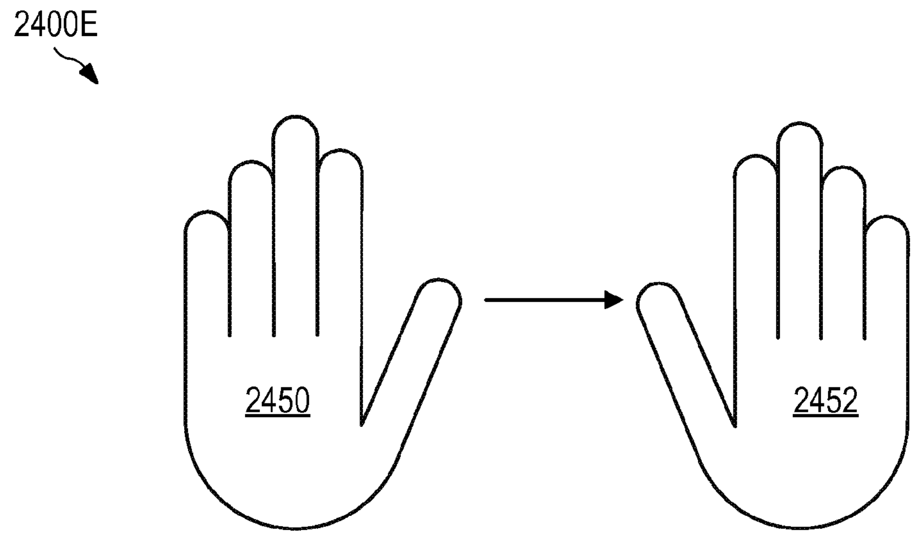
FIG. 24E is another illustration of utilizing a scrape away option on an electronic gaming device, according to one embodiment.

FIG. 24E is another illustration of human gesturing inputs, according to one embodiment. FIG. 24E may illustrate single hand movements, which may be detected and/or interpreted by a gaming machine, according to one embodiment.

FIG. 24E may illustrate a single hand gesture 2465, which may include a forward facing hand 2450 being flipped to a backward facing hand 2452. In one embodiment, such a deliberate gesture may be desirable to avoid misinterpreted and/or accidental player gestures. It is contemplated that a gaming system requiring deliberate player gestures may be beneficial and/or more desirable to play, operate, own, and/or manage. For example, a player may use forward facing hand 2450 to backward facing hand 2452 to alert a gaming system that the player wants to spin the reel more rapidly. In another example, the player may use forward facing hand 2450 to backward facing hand 2452 to alert a gaming system that the player wants to order another drink. A list of gestures and their allocated actions may be programmed at the beginning of each game, may be saved on a player's card, may be universally used throughout the casino, and/or may be determined in any other way.

It should be noted that patron servicing (e.g., drink orders, waitress calls, emergency responses, etc.) may be communicated over an independent controller and/or a communication device attached to electronic gaming device 100 and/or electronic gaming system 200. Further, these independent controller and/or communication device may not be connected to the game logic controller. In one example, these systems may be part of a player tracking system.

In one example, single hand gesture 2465 may be utilized in a secondary and/or bonus game. For example, a bonus game may include a mechanism which allows a player to select one or more selections to reveal possible awards. In another example, a gaming system may detect a player's hand in 3D (and/or 2D), and display an associated virtual icon on a display device, which moves based on the player's detected hand, over and around the one or more selections. Once a player has made the decision on which selection to pick, the player simply has to hold his hand in a position that causes the display device to present the associated virtual icon at such selection, and then flip their hand from forward facing hand 2450 to backward facing hand 2452, and the gaming system may interpret such gesture as indicating the player's desire to choose that selection. In another example, the selection procedure may be timed so that once the timer is up the selection is made. The gaming system may then turn over the chosen selection, and reveal the associated outcome. It is contemplated that in such an example, it may be beneficial to utilize an input that is both deliberate and that closely resembles the action being displayed on the one or more display devices (e.g., the flipping of the hand/selection) in an effort to make the game mechanic and gesture input easily understood by a player while also attempting to avoid misinterpreted and/or mistaken player inputs.

In another example, single hand gesture 2465 may be utilized in providing game information to a player. For example, a player may access a game information screen, which may comprise a plurality of pages of information, and may navigate through such pages by flipping their hand, as generally shown in single hand gesture 2465. In one example, a gaming system may display the information page changing in a manner that reflects how a player's hand is turning. For example, if a player's hand moves from forward facing hand 2450 to backward facing hand 2452 in a rapid manner, the gaming system may display the page changing rapidly. In another example, the gaming system may display a page turning in a manner that may connote a physical page actually being turned by the player's hand as it moves from forward facing hand 2450 to backward facing hand 2452. Further, one or more reels may be moved, one or more symbols may be moved, one or more game themes may be changed, and/or any other element may be moved and/or changed by using a gesture.

Figure 24F:
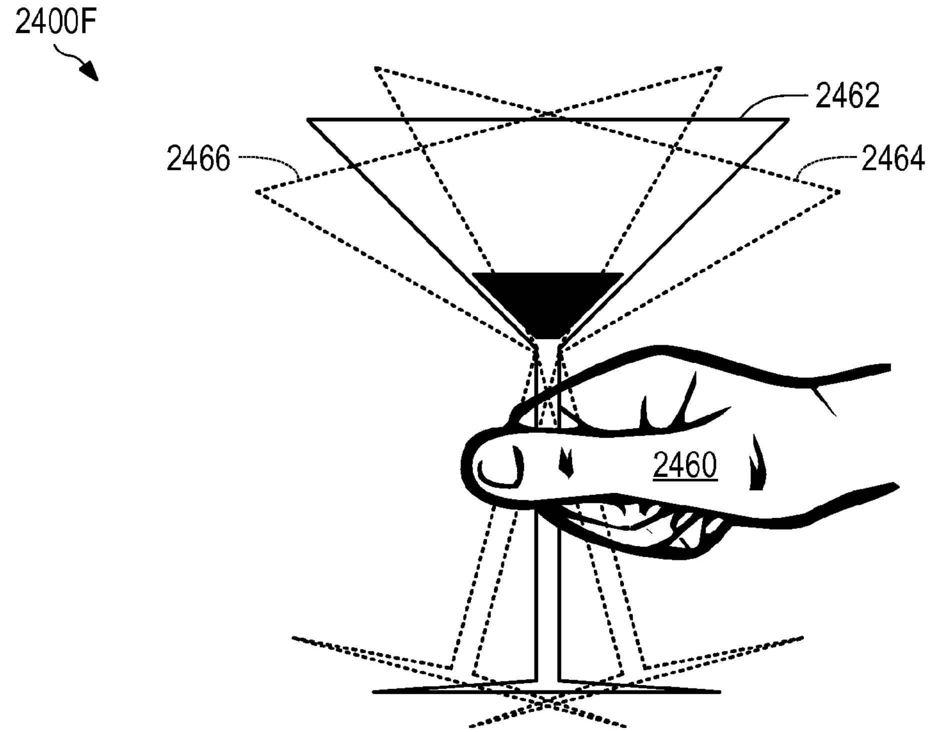
FIG. 24F is another illustration of utilizing a scrape away option on an electronic gaming device, according to one embodiment.

FIG. 24F illustrates another embodiment where a gaming system may detect and/or interpret a player gesture. FIG. 24F may illustrate a player's gesture that may include a bodily part of a player (e.g., a player's hand 2460) and a physical object (e.g., a glass 2462), as generally shown a request image 2475. In FIG. 24F, a gaming system may detect and/or interpret glass 2462 being shaken by player's hand 2460, which is generally illustrated by a first glass outline 2464 and a second glass outline 2466.

In one example, a gaming system may detect a player shaking and/or otherwise moving their glass (e.g., 2475), and/or interpret such action as a player desiring drink service. In another example, the gaming system may cause a message to be sent to a nearby drink station and/or bar, which may cause a waitress to visit the gaming system in order to assist the player. In another embodiment, the gaming system may cause a drink menu to be displayed on one or more associated display devices, which may allow a player to make a further input to select what drink to be delivered to the player. In one example, the drink selection may be based on the player's past history and/or a profile on the player's card.

Figure 24G:
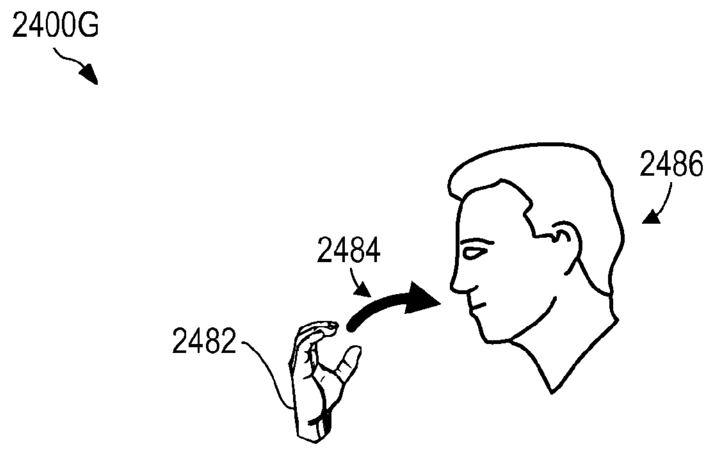
FIG. 24G is another illustration of utilizing a scrape away option on an electronic gaming device, according to one embodiment.
Figure 24H:
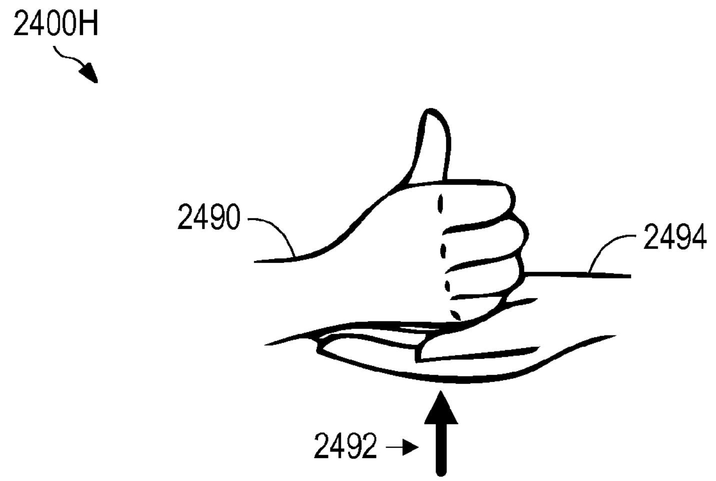
FIG. 24H is another illustration of utilizing a scrape away option on an electronic gaming device, according to one embodiment.
Figure 24J:
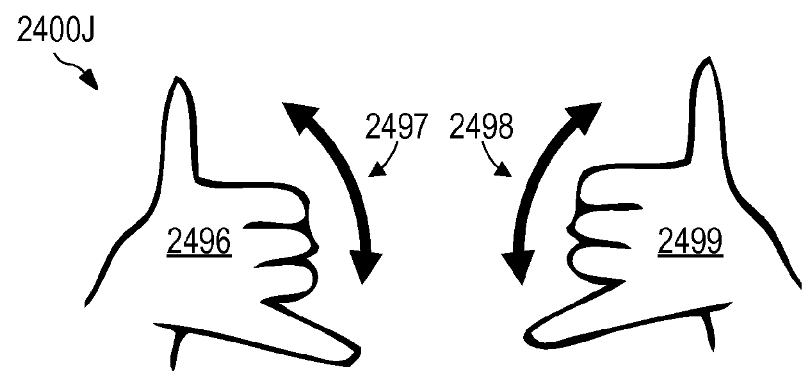
FIG. 24J is another illustration of utilizing a scrape away option on an electronic gaming device, according to one embodiment.

FIG. 24G is another illustration of exemplary human gesturing inputs, according to one embodiment. FIG. 24G may illustrate sign language (e.g., American Sign Language or "ASL") movements, which may be recognized by a gaming system, according to one embodiment.

In one embodiment, a gaming system may recognize the sign language movements for "eat" as generally shown in a first sign language gesture 2480. In one example, a gaming system may recognize a player's hand 2482 moving towards (as generally shown at 2484) a player's head 2486 as indicating a player's desire to order food. First sign language gesture 2480 may be used for a gaming system to recognize that the player would like food service, a menu of available food options, and/or a waitress to come to the gaming system.

In another embodiment, a gaming system may recognize the sign language movements for "help" as generally shown in second sign language gesture 2488, which may include a player's firsthand 2490 in a first position on top of a player's second hand 2490 in a flat position. Both hands may move upwards together in an upward hand direction 2492. In one example, a gaming system may recognize second sign language gesture 2488 as a desired input by the player to show a help screen on an associated display device. In another example, a gaming system may recognize second sign language gesture 2488 as an indication of an emergency situation, and cause a message to be sent to local security personnel in order to assist the player. In another example, a gaming system may recognize second sign language gesture 2488 as an indication that the player would like a waitress to come to the gaming system.

In another embodiment, a gaming system may recognize the sign language movement for "play" as shown in a third sign language gesture 2495, which may include a player's firsthand 2496 and a player's second hand 2499 moving in a back and forth manner (as illustrated by first arrow 2497 and second arrow 2498). In one example, a gaming system may recognize third sign language gesture 2495 as a desired input to begin a new game, and cause a new game to start (e.g., cause the reels to spin or a new hand of cards to be dealt). In another example, a gaming system may recognize third sign language gesture 2495 as an indication that the player is ready to play, and may therefore exit out of any informational screens or demo modes that are currently being displayed. In another example, a gaming device may recognize third sign language gesture 2495 as an indication to verbally announce, "It's game time!" and/or any other words.

In one embodiment, a gaming system may recognize multiple sign language movements (e.g., first sign language gesture 2480, second sign language gesture 2488, and/or third sign language gesture 2495). In another embodiment, a gaming system may only recognize a single sign language movement (e.g., first sign language gesture 2480, second sign language gesture 2488, or third sign language gesture 2495) as a game input. In another embodiment, a gaming system may recognize one or more sign language inputs (e.g., first sign language gesture 2480, second sign language gesture 2488, and/or third sign language gesture 2495) in addition to one or more non-sign language gestures (e.g., a player coughing to indicate a need for a drink, a player rubbing his tummy to indicate hunger, a player holding up an empty glass and shaking it to indicate a refill is needed, etc.), which could be made by a player. Any of these elements may be combined.

Figure 25:
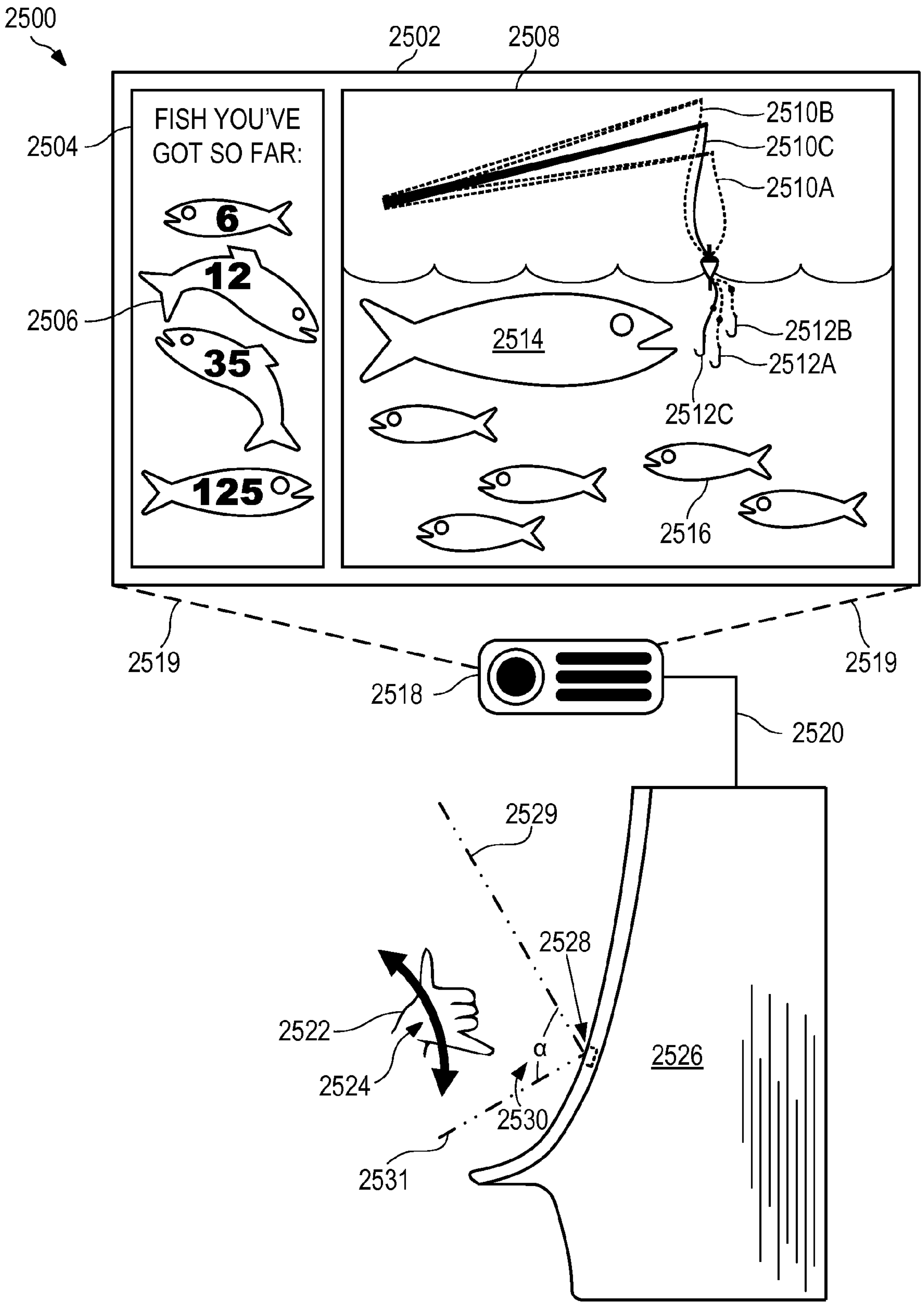
FIG. 25 is another illustration of utilizing a scrape away option on an electronic gaming device, according to one embodiment.

In FIG. 25, another illustration of utilizing a scrape away option on an electronic gaming device is shown, according to one embodiment. In this example, a message area 2504, one or more captured prizes 2506, a first rod position 2510A, a second rod position 2510B, a third rod position 2510C (e.g., tool position), a first hook position 2512A, a second hook position 2512B, a third hook position 2512C, a first potential prize 2514 and a second potential prize 2516 may be displayed. In one example, a first screen 2502 may be a primary screen, a secondary screen, an external screen, and/or a projection screen which may be connected via a connection device 2518. In this example, one or more human gesturing motions (e.g., reference numbers 2522 and 2524—may be utilized to move one or more tools—first rod position 2510A, a second rod position 2510B, a third rod position 2510C (e.g., tool position), a first hook position 2512A, a second hook position 2512B, a third hook position 2512C) to try to obtain one or more prizes.

Figure 26:
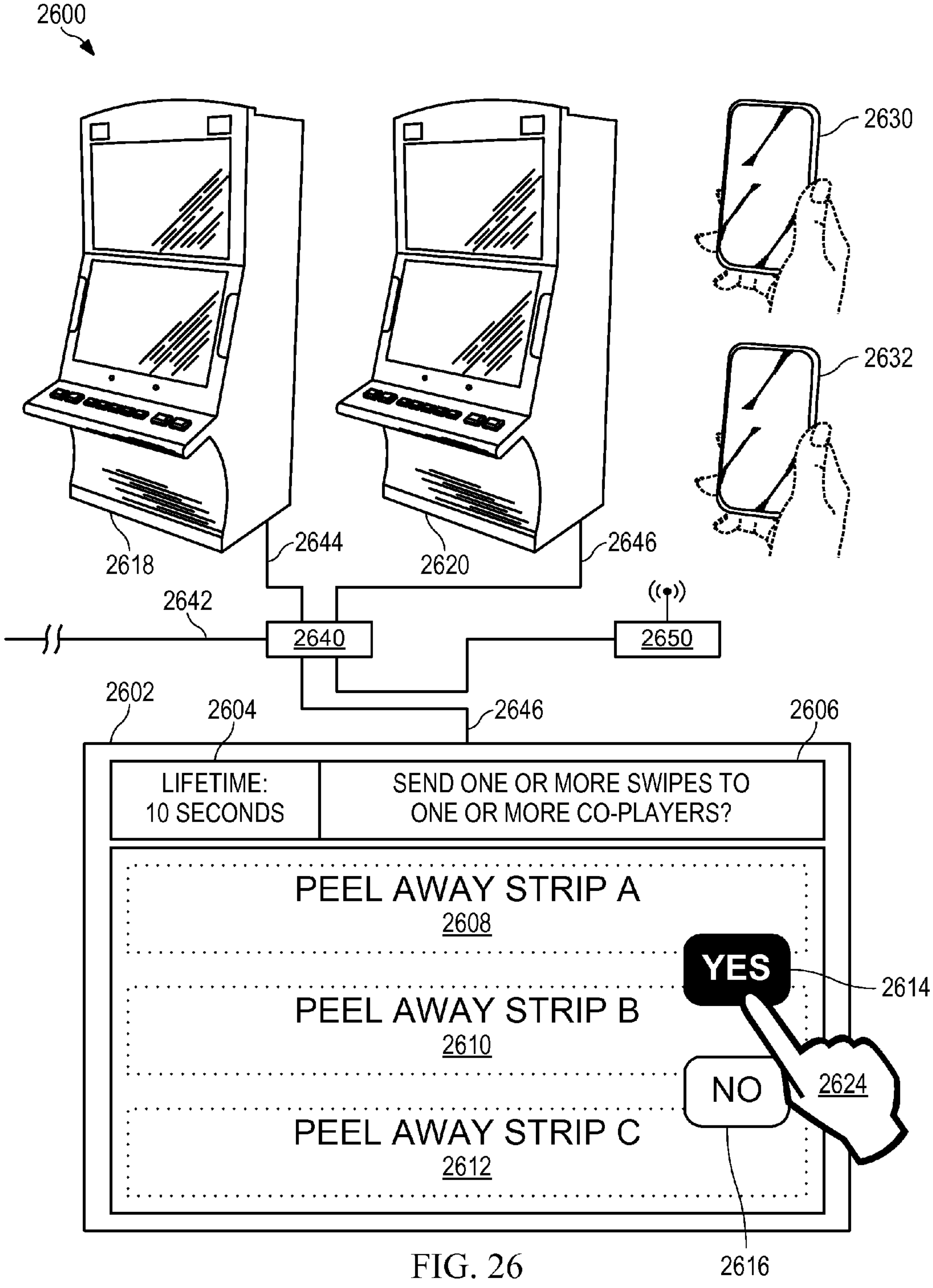
FIG. 26 is another illustration of utilizing a scrape away option on an electronic gaming device, according to one embodiment.

In FIG. 26, another illustration of utilizing a scrape away option on an electronic gaming device is shown, according to one embodiment. In this example, a first electronic gaming device 2618, a second electronic gaming device 2620, a first mobile device 2630, a second mobile device 2632, and an Nth gaming device 2602 are connected via one or more devices (e.g., reference numbers 2640 and 2650). In this example, a player may send one or more swipes to one or more co-players playing on first electronic gaming device 2618, second electronic gaming device 2620, first mobile device 2630, and second mobile device 2632. The player may indicate acceptance via a first option 2614 and/or rejection via a second option 2616.

Figure 27A:
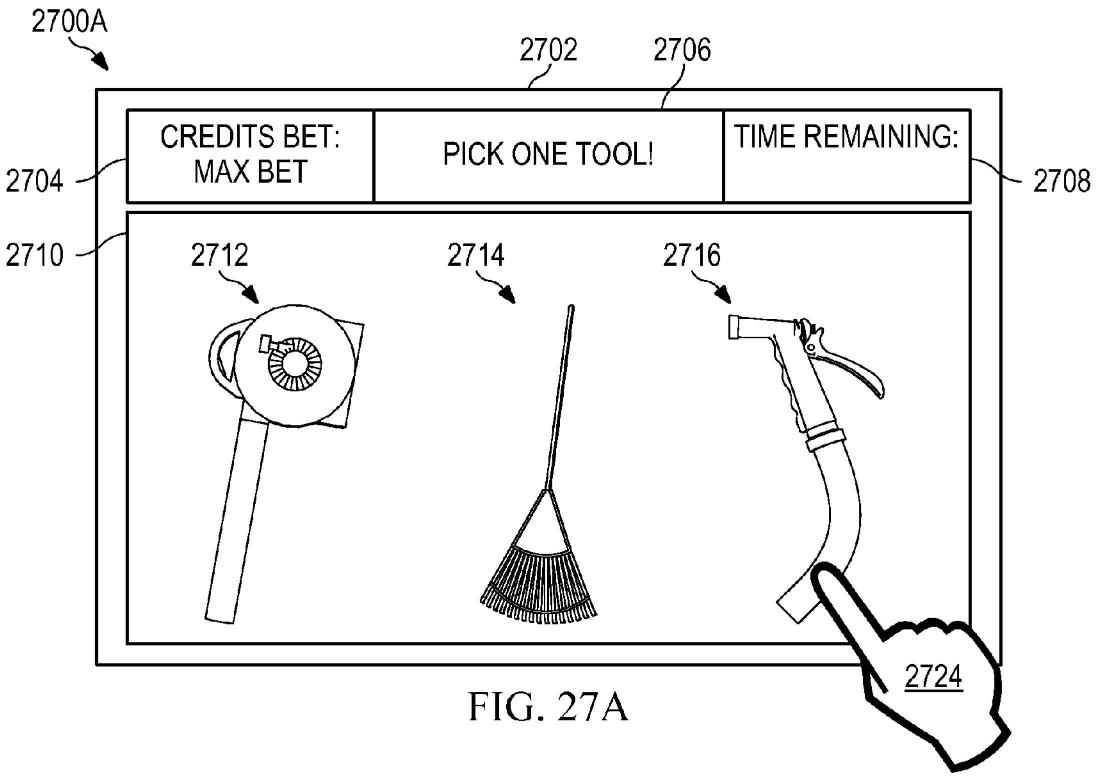
FIG. 27A is another illustration of utilizing a scrape away option on an electronic gaming device, according to one embodiment.
Figure 27B:
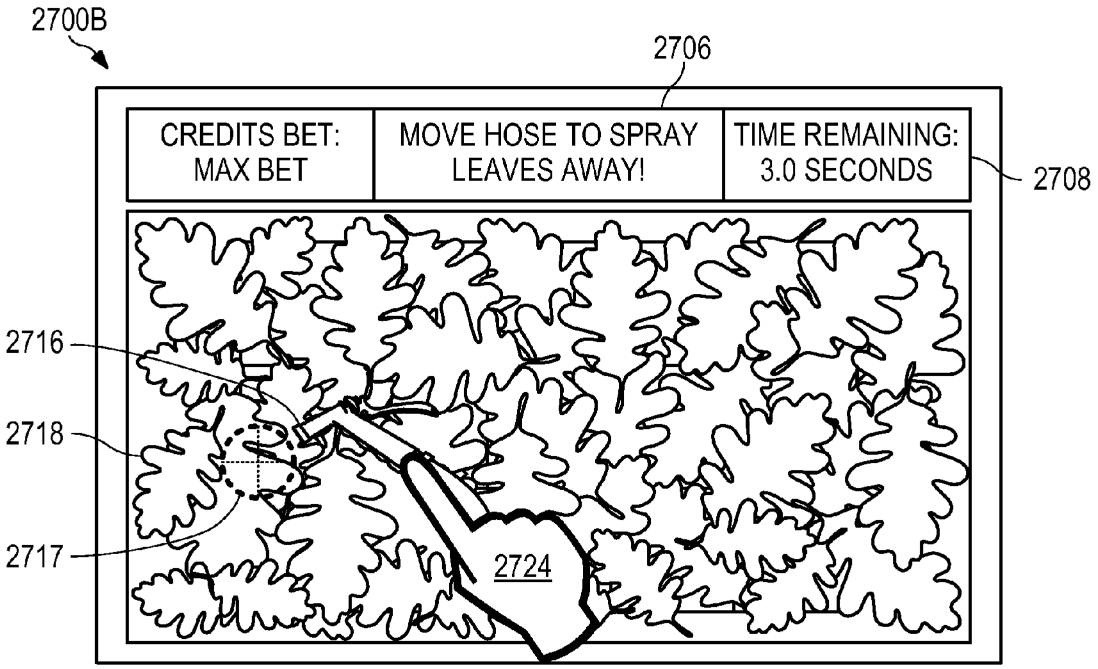
FIG. 27B is another illustration of utilizing a scrape away option on an electronic gaming device, according to one embodiment.
Figure 27C:
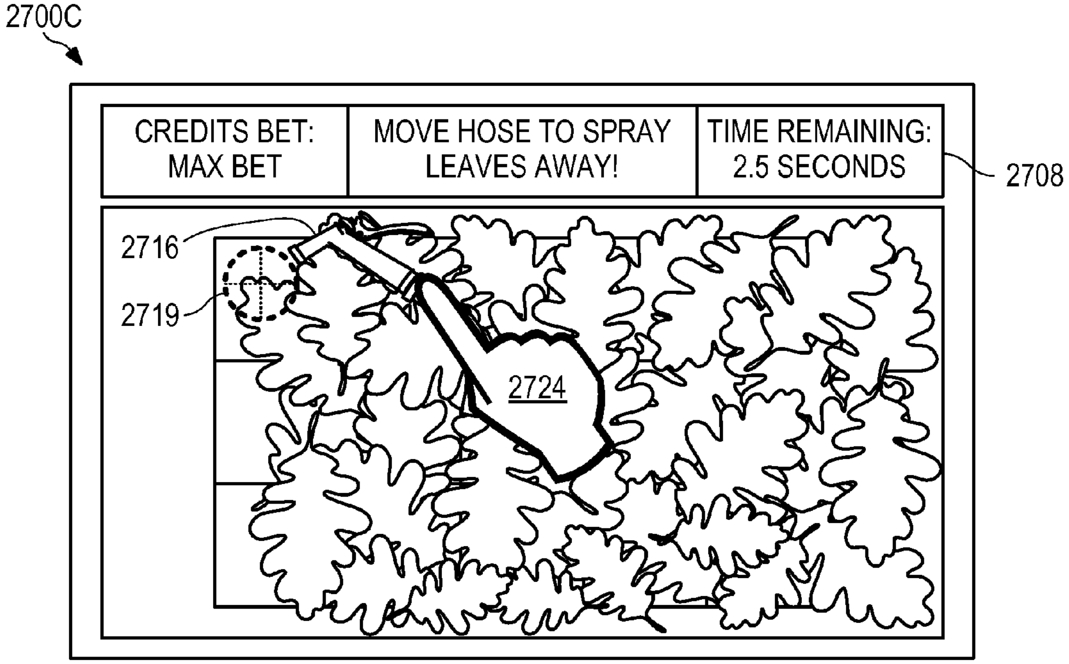
FIG. 27C is another illustration of utilizing a scrape away option on an electronic gaming device, according to one embodiment.
Figure 27D:
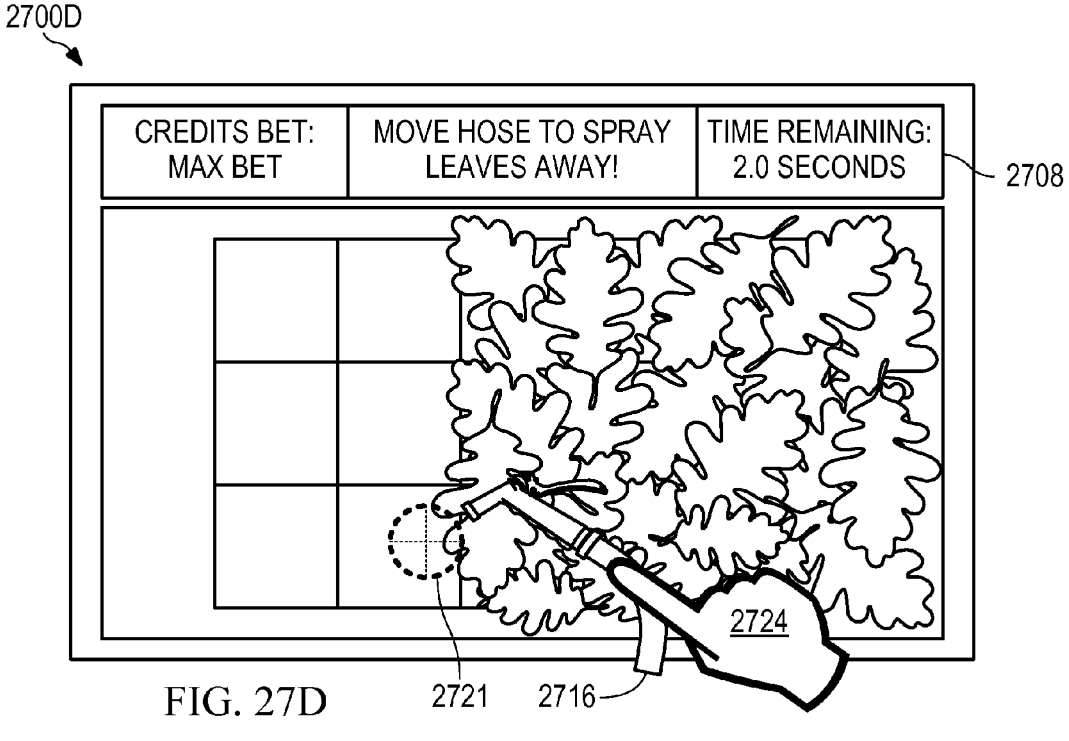
FIG. 27D is another illustration of utilizing a scrape away option on an electronic gaming device, according to one embodiment.
Figure 27E:
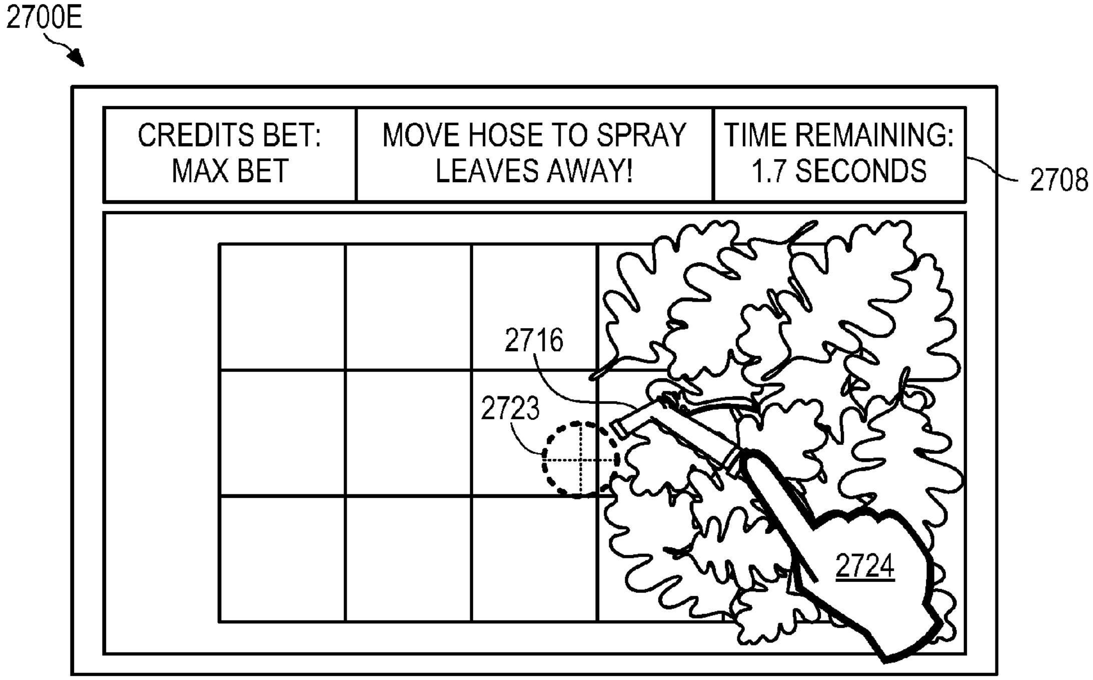
FIG. 27E is another illustration of utilizing a scrape away option on an electronic gaming device, according to one embodiment.
Figure 27F:
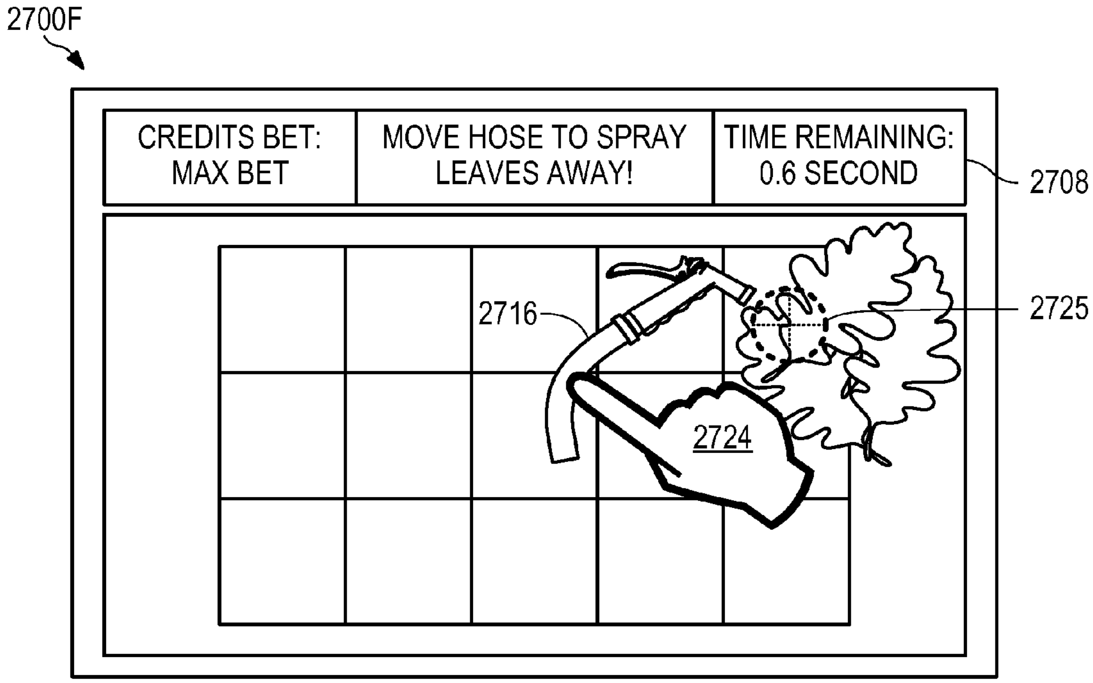
FIG. 27F is another illustration of utilizing a scrape away option on an electronic gaming device, according to one embodiment.
Figure 27G:
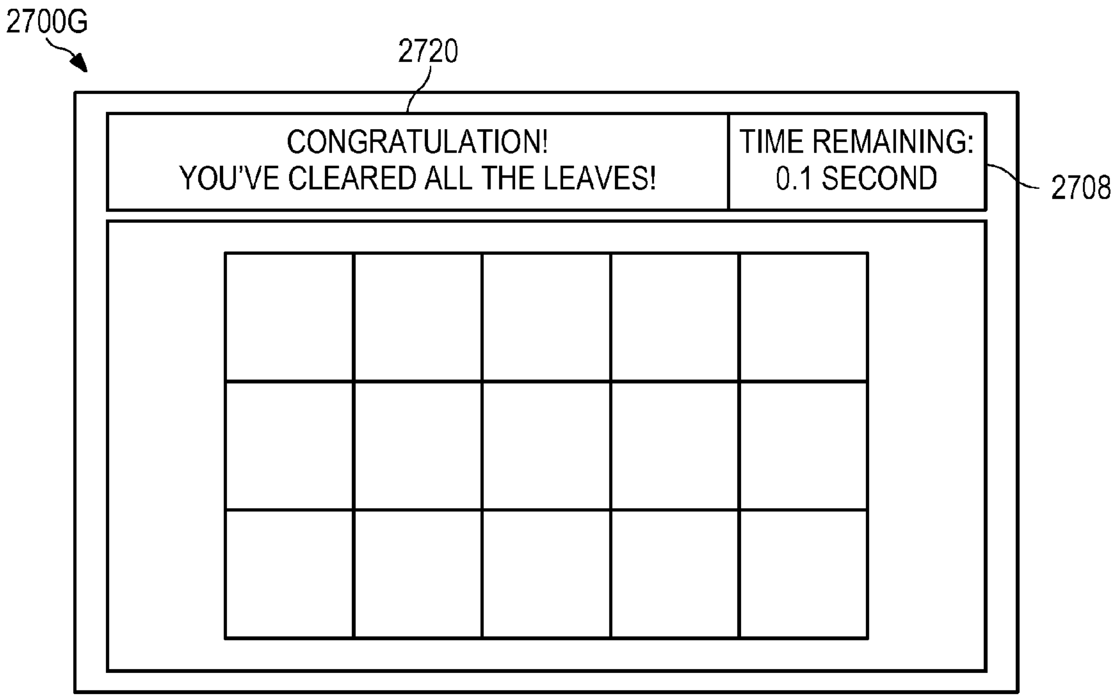
FIG. 27G is another illustration of utilizing a scrape away option on an electronic gaming device, according to one embodiment.
Figure 27H:
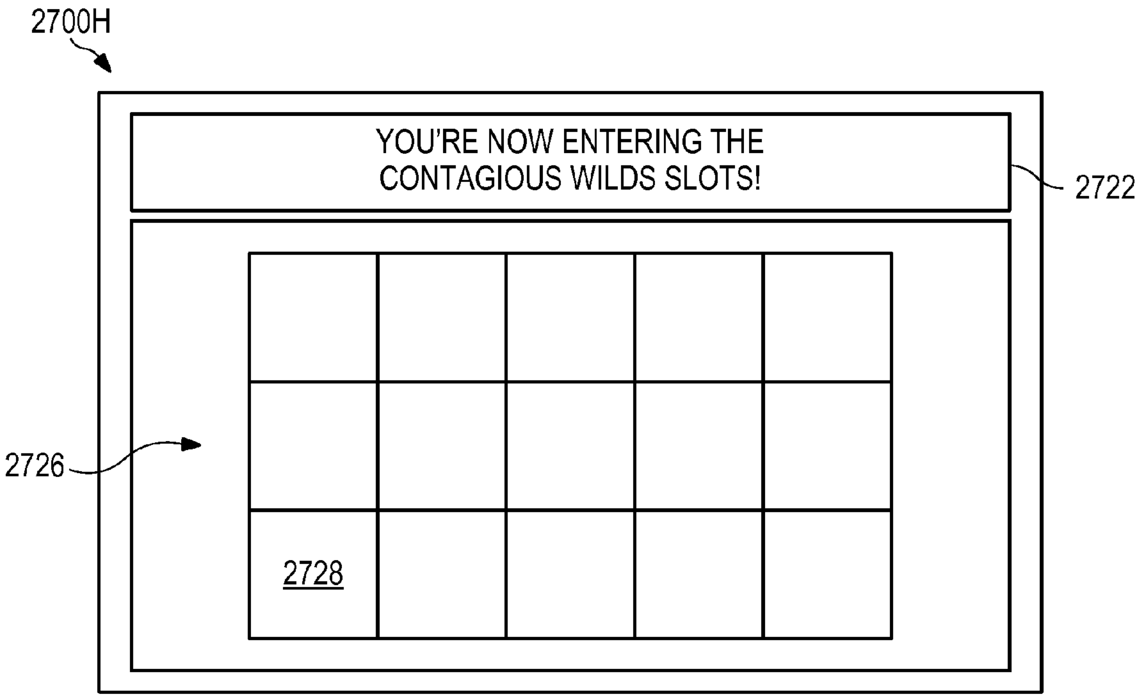
FIG. 27H is another illustration of utilizing a scrape away option on an electronic gaming device, according to one embodiment.

In FIG. 27A, another illustration of utilizing a scrape away option on an electronic gaming device is shown, according to one embodiment. In this example, the player may select a first tool 2712, a second tool 2714, and a third tool 2716. The player may focus third tool 2716 at a first targeted area 2717 which removes a first object 2718 (see FIG. 27B). In various examples, the player moves third tool 2716 to a second target area 2719, a third target area 2721, a fourth target area 2723, and a fifth target area 2725 to remove various objects (see FIG. 27C, FIG. 27D, FIG. 27E, FIG. and 27F). In FIG. 27G, the player has removed all of the objects which entered the player into a new game (e.g., contagious wild gaming option, etc.), a secret game, a new game title, new gaming options, and/or any combination thereof (see FIG. 27H).

Figure 28:
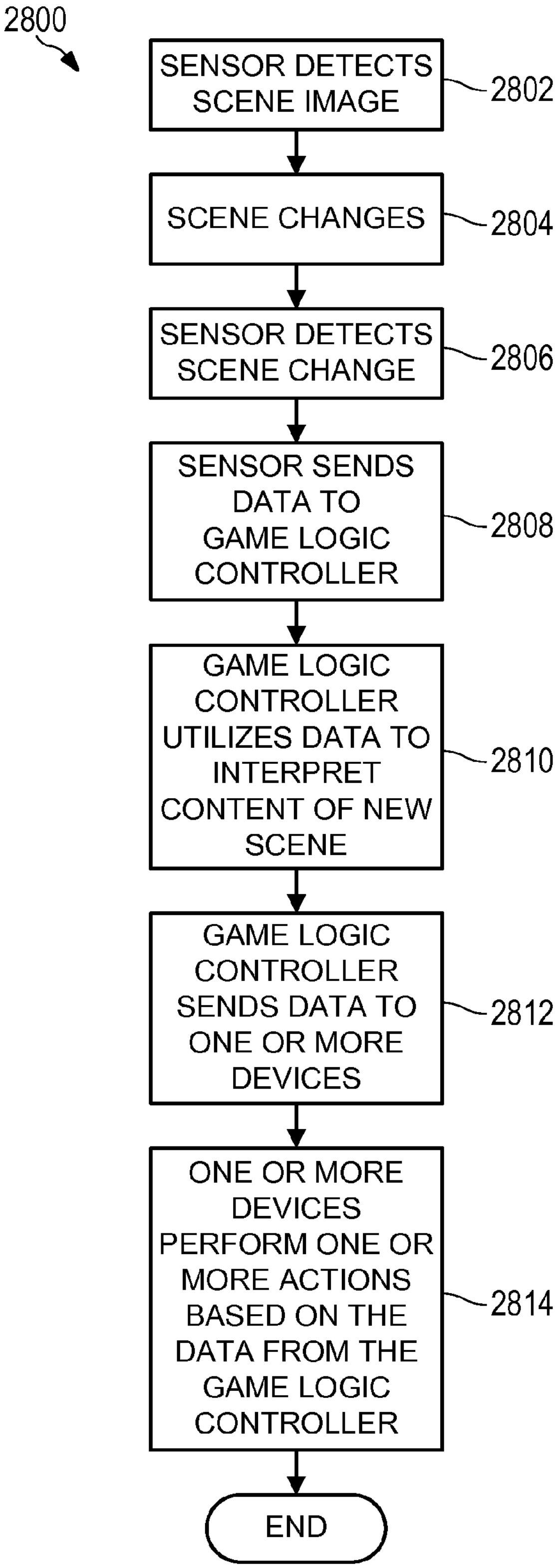
FIG. 28 is a process flow diagram, according to one embodiment.

FIG. 28 is a flow diagram for depth image sensing of a scene, according to one embodiment of the present disclosure. The method illustrated in FIG. 28 may be a method of detecting a scene change 2800, and may include one or more sensors detecting a scene image (step 2802). In one embodiment, the sensor may detect the scene image in 2D (and/or 3D). For example, the one or more sensors may include a type of camera, which may detect the relative position of pictured objects. In another embodiment, the one or more sensors may detect the scene image in 3D. For example, the sensor may include an IR light source and a CMOS sensor, which may cooperatively work to help determine the relative 3D position of objects within a scene.

At step 2804, the scene detected at step 2802 may change. In one embodiment, the changed scene may be a player attempting to interact with the gaming system via one or more depth image sensing devices. In another embodiment, the changed scene may be a player moving unaware of the one or more depth image sensing devices.

At step 2806, the sensor may detect the scene change. In one embodiment, the at least one depth image sensor may detect movement of a physical body within the scene. For example, at least one depth image sensor may detect the actual movement of a player's hand from a first position to a second position, thereby determining that there was a scene change. In another embodiment, the at least one depth image sensor may periodically detect the scene and communicate data related to the detected scenes, which may then be compared to detect changes in the scene. For example, one or more depth image sensing devices may scan a field at intervals of one second, and upon a first scan of the field detects a player's hand at a first position, and upon a second scan detects the player's hand at a second position. This data may then be utilized to determine that there was a scene change. The timed intervals may be any length of time (e.g., 1 second, 2 seconds, 3 seconds, 10 seconds, 5 minutes, etc.).

At step 2808, the sensor may send data to a game logic controller. In one embodiment, such data may be transmitted wirelessly. In another embodiment, such data may be transmitted via a wired connection. In another embodiment, such data could be communicated via a bus connection (e.g., for example, a universal serial bus ("USB") connection).

At step 2810, the game logic controller may utilize the data received from the sensors to interpret the content of the new scene. In one embodiment, the data may be basic data, which may represent at a digital level the content of the scene change, with no associated interpretation. For example, the data may only include a 3D representation of the changed scene, but may not include any associated interpretation of what any of the bodies (and/or objects) within the scene are and/or what the bodies (and/or objects) are doing. In such an example, the game logic controller may then interpret the entire scene, and may include what any of the bodies (and/or objects) within the scene are and what the bodies (and/or objects) are doing.

In one embodiment, the data may be basic data, which may represent at a digital level the content of the scene change, along with one or more associated interpretations. For example, the data may include a 3D representation of the changed scene and one or more associated interpretations of what any of the bodies (and/or objects) within the scene are and/or what the bodies (and/or objects) are doing (e.g., moving hand, etc.). In such an example, the game logic controller may then interpret the entire scene based on and/or partially based on the one or more associated interpretations and the raw data.

In another example, the data may only include a 2D representation of the changed scene, but may not include any associated interpretation of what any of the bodies (and/or objects) within the scene are or what the bodies (and/or objects) are doing. In such an example, the game logic controller may then interpret the entire scene, and may include what any of the bodies (and/or objects) within the scene are and what the bodies (and/or objects) are doing.

In one embodiment, the data may be basic data, which may represent at a digital level the content of the scene change along with one or more associated interpretations. For example, the data may include a 2D representation of the changed scene and one or more associated interpretations of what any of the bodies (and/or objects) within the scene are and/or what the bodies (and/or objects) are doing (e.g., moving hand, etc.). In such an example, the game logic controller may then interpret the entire scene based on and/or partially based on the one or more associated interpretations and the raw data.

In another example, the data may include both a 3D representation and a 2D representation of the changed scene, but may not include any associated interpretations of what any of the bodies (and/or objects) within the scene are or what the bodies (and/or objects) are doing. In such an example, the game logic controller may then interpret the entire scene, and may include what any of the bodies (and/or objects) within the scene are and what the bodies (and/or objects) are doing.

In one embodiment, the data may be basic data, which may represent at a digital level the content of the scene change, along with one or more associated interpretations. For example, the data may include both a 2D representation and a 3D representation of the changed scene and one or more associated interpretations of what any of the bodies (and/or objects) within the scene are and/or what the bodies (and/or objects) are doing (e.g., moving hand, etc.). In such an example, the game logic controller may then interpret the entire scene based on and/or partially based on the one or more associated interpretations and the raw data.

In another embodiment, the data transmitted to the game logic controller at step 2810 may include at least some associated interpretation. For example, the data received from the sensors may include interpretive data that a hand moved from a first point to a second point, and then the game controller may then determine what such movement of a player's hand represents. In this example, it may be possible to share the data interpretation workload amongst the sensors and the game logic controller.

At step 2812, the game logic controller may send data to one or more devices. In one embodiment, the data the game logic controller forwards at step 2812 may include new data, such as data resulting from interpreting the data received from the sensors. For example, the game logic controller may interpret the data from the sensors and determine that a player moved their hand from a first point to a second point, and then may further determine that this action is a recognized action for performing a first command in a play of a game, and then may forward new data related to the first command to one or more devices.

In one example, if the data indicates a first activity (e.g., walking), then a first action (e.g., initiate a light display) may be commanded by the one or more processors to be implemented on one or more gaming devices (or non-gaming devices and/or any combination thereof). In a second example, if the data indicates a second activity (e.g., sitting), then a second action (e.g., initiate program one, which may be a game overview) may be commanded by the one or more processors to be implemented on one or more gaming devices (or non-gaming devices and/or any combination thereof). In another example, if the data indicates a third activity (e.g., groups of people), then a third action (e.g., initiate a multi-game presentation) may be commanded by the one or more processors to be implemented on one or more gaming devices (or non-gaming devices and/or any combination thereof). In another example, if the data indicates a fourth activity (e.g., groups of people playing another game), then a fourth action (e.g., initiate an attraction mode, which may include a bonus for coming over to play this game) may be commanded by the one or more processors to be implemented on one or more gaming devices (or non-gaming devices and/or any combination thereof).

In one example, one or more sensors may detect the absence of a patron (e.g., an empty chair and/or an empty scene in front of the cabinet) and based on this detection, one or more processors may initiate an attract mode, an activity rest mode, and/or a low light mode.

In another example, if the patron is seated but there are no credits present in the machine, one or more sensors may prompt the game controller to present graphics and/or audio presentations inviting the patron to become a player by entering credits.

In another example, the overall function of the sensor system (e.g., 2D, 3D, and/or a combination thereof) may be to detect the presence, orientation, and movement of a person and/or a group of patrons within the game system area and thereby altering and/or adapting the interaction of the game system with the patrons either in an attract mode during non-game play and/or during game play.

In another example, a screen cursor may follow a player's pointing gesture—and gestures to select targets under the cursor, and gestures to execute those targets.

In another embodiment, the data transmitted by the game logic controller at step 2812 may include at least a portion of the data the game controller may have received from the sensor at step 2808. For example, the sensor may have sent data representative of a player's hand moving to the game logic controller, which then included such data representative of the player's hand moving to one or more devices.

In another embodiment, the game logic controller may determine which of the one or more devices may need to perform one or more actions based on the received data, and then may only forward such data to those devices. For example, the game logic controller may determine that the data representative of a specific hand movement by the player should cause an associated display screen to change displays, a command may be sent to the associated display screen to change displays, but the command may not be sent to an associated ticket printer as the ticket does not have any associated actions to perform. In another embodiment, the game logic controller may determine an appropriate command at step 2810 based on the data received at step 2808, and may then broadcast the determined command to all associated devices. The devices may have the appropriate configuration in order to determine if the broadcast command applies to each machine and/or whether the device needs to perform an action based on the broadcast command.

In one example, a command signal to initiate one or more actions may be transmitted to one or more gaming devices based on data from one or more scenes. In this example, an attraction presentation signal may be sent to three gaming devices. However, only two gaming devices (e.g., the first gaming device and the second gaming device) may initiate an attraction presentation because the third gaming device is already in use. The one or more scene data may be generated by any number of devices (e.g., first gaming device, first non-gaming device, second gaming device, second non-gaming device, third gaming device, etc.). In another example, a command signal may be transmitted to a first gaming device, a first non-gaming device, a second gaming device, a third gaming device, and a fourth gaming device. However, fourth gaming device may not initiate the active requested by command signal because of the distance fourth gaming device is away from one or more locational data points (e.g., the scene has moved away from fourth gaming device).

In one embodiment, the one or more devices may be part of the same physical structure as the gaming system. For example, the one or more devices may be at least one display screen, which may also be utilized to display a play of a game on the gaming system. In another embodiment, the one or more devices may not be part of the same physical structure as the gaming system. For example, the one or more devices may be a separate computer located at a casino bar, which may, based on the data received from the game logic controller, display a request for a waitress to visit the player playing at the gaming system.

In another example, one or more scenes may initiate one or more activities (e.g., attraction mode, attraction presentation, drink service, food service, help, host request, emergency response, special promotion, etc.). In one example, based on data from one or more scenes, an emergency response is required (e.g., someone is ill, being threatened, etc.). In another example, all of the gaming machines (and/or a portion thereof) are being utilized in a specific area, which generates a special promotion (e.g., five free spins for everyone, 10 percent extra payout for the next five minutes, etc.).

At step 2814, one or more devices may perform one or more actions based on the data from the game logic controller. In one embodiment, multiple devices may receive the same data, and each may then have to filter the received data to determine if they need to perform any actions based on the data. In another embodiment, the game logic controller may filter at least some of the data and forward data to one or more devices only if the receiving one or more devices is/are required to perform an action based on the received data.

Figure 29:
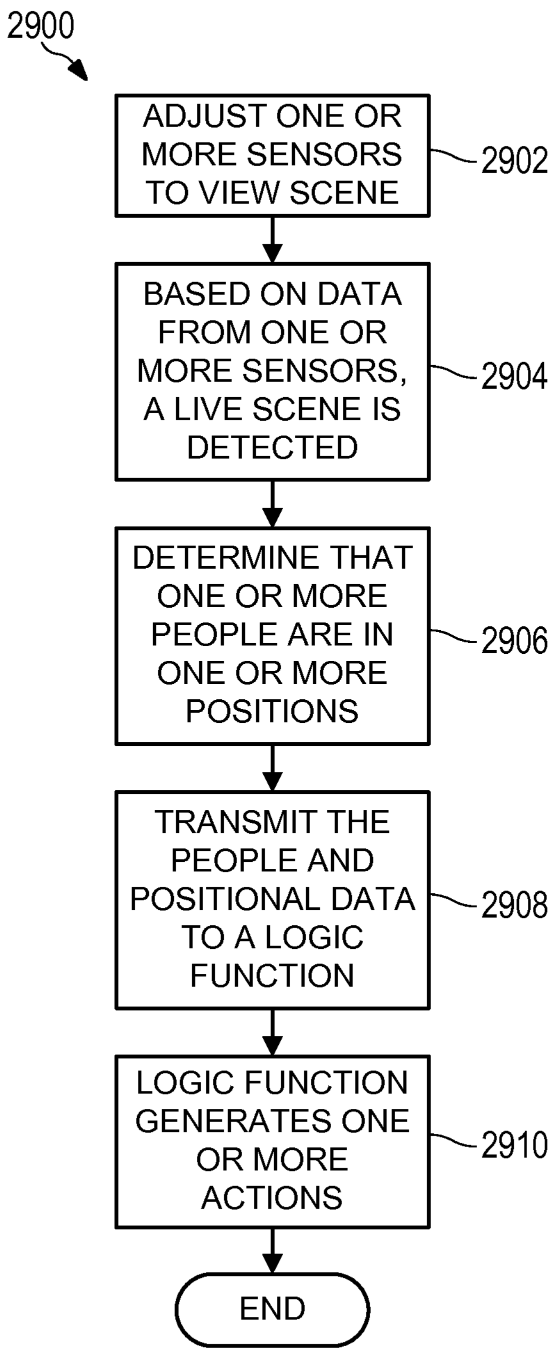
FIG. 29 is a process flow diagram, according to one embodiment.

FIG. 29 is another flow diagram for depth image sensing of a scene, according to one embodiment as disclosed herein. The method may include detecting a live scene 2900, and may include adjusting one or more sensors to view a scene (step 2902). In one embodiment, step 2902 may include a physical adjustment to one or more depth image sensing devices. For example, one or more depth image sensing devices may include servos and/or similar movement devices, in order to physically move the one or more depth image sensing devices and/or components thereof. In one example, a movement device may adjust the position of the depth image sensor as a whole in order to adjust an associated field of view. In another example, one or more depth image sensing devices may allow different focusing to occur with one or more components of the one or more depth image sensing devices. For example, one or more sensor components may include a physical lens, and the lens may be physically manipulated in order to adjust an associated field of view.

In another embodiment, step 2902 may include a digital adjustment. For example, one or more sensor components may include a physical lens, and a picture relayed by the lens may be digitally zoomed or otherwise digitally enhanced. In another example, hardware components of the one or more depth image sensing devices may be recalibrated via software instructions in order to relay better data from a viewed scene.

At step 2904, a live scene may be detected based on the data from one or more sensors. In one embodiment, a live scene may include people making movements. In another embodiment, a live scene may include people making movements in relation to a play of a game on an associated gaming system. In another embodiment, a live scene may include multiple people making movements in relation to a play of a multiplayer game on a multiplayer gaming system. In one embodiment, the detection of a human body part (e.g., for example, a hand) may determine that a live scene is detected. In another embodiment, the detection of movement within a certain distance of the one or more depth image sensing devices may determine that a live scene is detected.

At step 2906, it may be determined if one or more people are in one or more positions. In one embodiment, the system may attempt to determine the location of one or more people in relation to one or more associated gaming system interfaces. For example, a multiplayer gaming system may have interfaces for five different players, and the system may attempt to determine the location of persons at each of the interfaces.

At step 2908, the method may include the step of transmitting the people and positional data to a logic function. In one embodiment, the logic function may reside on a specifically configured processor. In another embodiment, the logic function may reside on a game logic controller. In one embodiment, the logic function may be a dedicated logic function, wherein it may solely function to receive people and positional data. In another embodiment, the logic function may have multiple tasks it is capable and/or responsible to undertake.

At step 2910, the logic function may generate one or more actions. In one embodiment, the one or more actions may be commands to one or more devices. In another embodiment, the one or more actions may be the retransmission of part or all of the people and positional data to another logic function and/or one or more devices. In another embodiment, the one or more actions may include a reconfiguration of, and/or writing to, at least one memory device.

Figure 30:
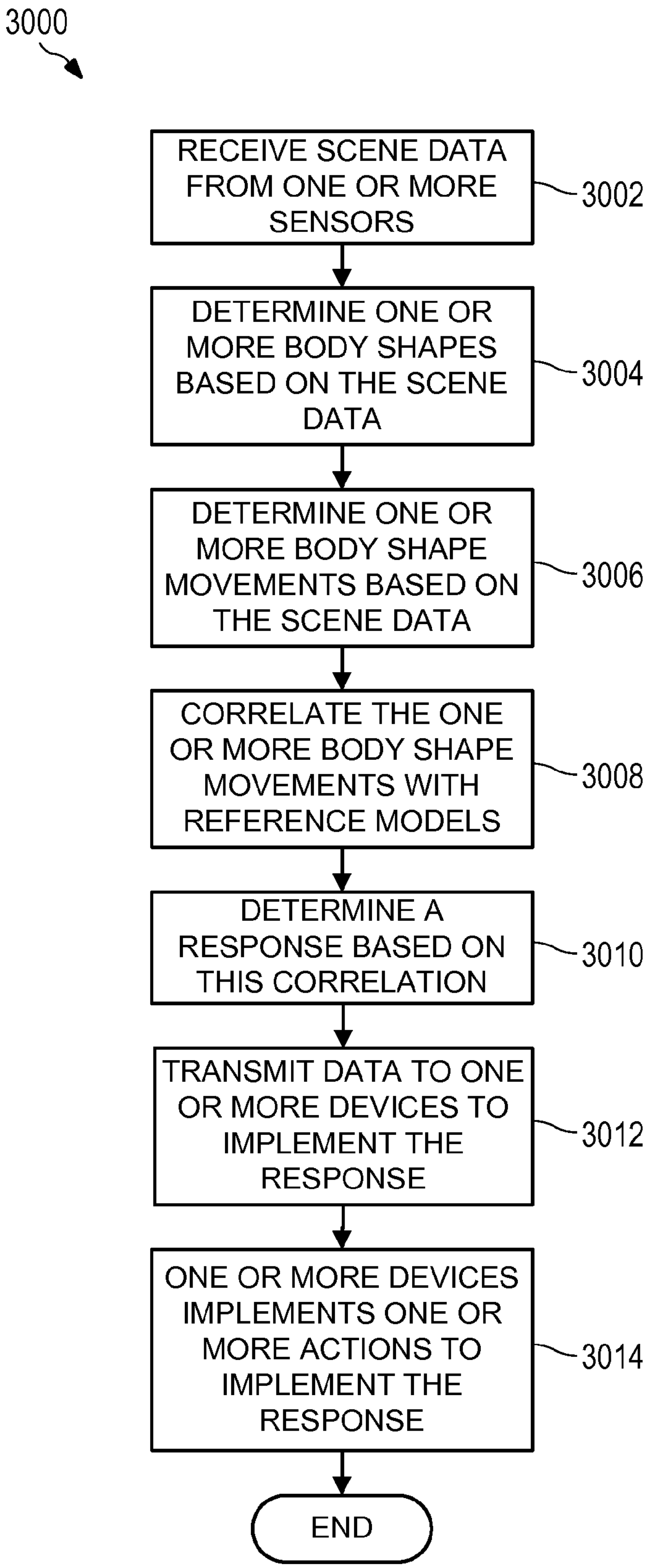
FIG. 30 is a process flow diagram, according to one embodiment.

FIG. 30 is another flow diagram for depth image sensing of a scene, according to one embodiment. FIG. 30 may be a method of correlating scene data 3000, and may include receiving scene data from one or more sensors (step 3002). In one embodiment, the data may be basic data, which may represent at a digital level the content of the scene, with no associated interpretation. For example, the data may only include a 3D representation of the scene (also may be 2D and/or a combination of 2D and 3D), but may not include any associated interpretation of what any of the bodies (and/or objects) within the scene are or what the bodies (and/or objects) are doing. In another embodiment, the data transmitted may include at least some associated interpretation. For example, the data received from the one or more sensors may include interpretive data that a hand moved from a first point to a second point. In this example, it may be possible to share the data interpretation workload amongst the sensors and a separate logic device.

At step 3004, the method may include determining one or more body shapes based on the scene data. In one embodiment, the system may recognize body shapes. For example, the system may recognize hand and fingers, but may not recognize feet. In another embodiment, the system may recognize each body extremity and/or the entire body.

At step 3006, the system may recognize one or more body shape movements. In one embodiment, the system may recognize some, but not all body shape movements. For example, the system may recognize a hand moving back and forth, but may not recognize a head shaking. In another embodiment, the system may recognize a preset number of body shape movements (e.g., the system may recognize five body shape movements; the system may recognize three body shape movements, etc.). In another embodiment, the system may expand the number of recognized movements it may recognize based on repeated observation of such movements, and in a sense, it may learn additional movements.

At step 3008, the method may include the step of correlating the one or more body shape movements with one or more reference models. In one embodiment, the one or more reference models are preloaded on the system. In another embodiment, some of the one or more reference models are preloaded on the system, but the system is configured to allow for the dynamic creation of additional models. For example, the system may store in memory one or more body shape movements that it was not able to determine, and also store in memory a subsequent action made by a player, such as an input made at the gaming system and/or a different body shape movement, and upon determining a pattern in such historical data, add the previously unrecognized body shape movement and its associated desired action to the listing of reference models. In this sense, the system may be able to learn additional body shape movements. In another example, the system may be able to learn movement patterns (e.g., body movements), but not have any preloaded movement profiles.

In another embodiment, reference models may include data representative of common movements. For example, a gaming system may include a bonus feature that instructs a player to move one or both hands in the play of the bonus feature, and the gaming system may include reference models, which may include data representative of a player playing with a left hand only, a player playing with a right hand only, and/or a player playing with both hands. In this example, it may be possible to configure an associated game logic controller to interpret received data even if one of the player's hands is hidden from view of the one or more sensors by another body part, which may help avoid incorrectly determined inputs. In one example, the system may obtain data from one or more other gaming devices and/or non-gaming devices to fill in any data gaps.

At steps 3010-3014, the method may include the steps of determining a response based on the correlation from step 3008 (step 3010), transmitting data to one or more devices to implement the response (step 3012), and/or the one or more devices implementing one or more actions to implement the response (step 3014). In one embodiment, the response may be selected from a listing of a plurality of possible responses, and may indicate a result in a game play mechanic. For example, a determined correlation may relate to a specific desired action by a player in a play of a gaming feature, and the associated determine response may be an indication of the outcome of the desired action, which is then, transmitted at least one display device, which then displays the determined outcome.

Figure 31:
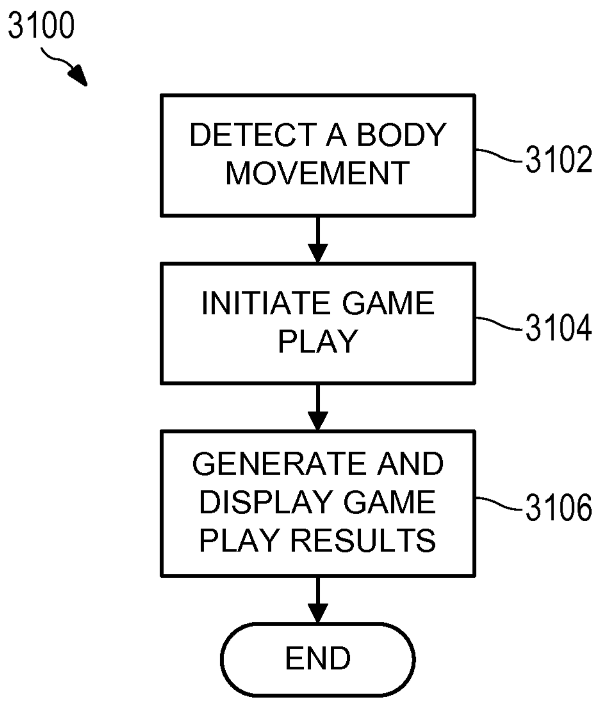
FIG. 31 is a process flow diagram, according to one embodiment.

FIG. 31 is another flow diagram for depth image sensing of a scene, according to one embodiment. The method illustrated in FIG. 31 may be a method of initiating game play based on scene data 3100, and may include detecting a body movement (step 3102). Such detection may be done in accordance with FIGS. 28-31, as discussed above.

At step 3104, the method may include the step of initiating game play. In one embodiment, one of a plurality of detected body movements may initiate game play. For example, a movement of a player's hand in a side-to-side motion, or a back-and-forth motion, may initiate a new play of the game. In another embodiment, the listing of movements, which may initiate a new play of a game, may be small. It is contemplated that due to the legal nature of initiating a new play of a game, the system provider may want to take measures to insure that player movements, which may be interpreted to initiate a new game play are limited and/or deliberate, in an effort to avoid misinterpreted player actions. In one embodiment, step 3104 may initiate a play of a secondary or bonus game. In another embodiment, the gaming system may allow only secondary or bonus games to be initiated by detected body movements. It is contemplated that this embodiment may be viewed as desirable in order to avoid unintentional initiations of new games by players, which could have legal ramifications.

At step 3106, the method may include the step of generating and displaying the game play results. In one embodiment, step 3106 may include the generating and displaying of results for a primary game. In another embodiment, step 3106 may include the generating and displaying of results for a secondary or bonus game. In one embodiment, the detected body movement from step 3102 may influence the generated and displayed game results. In another embodiment, the detected body movement may influence the displaying of the game results, but not the results themselves. For example, if a detected body movement included a player's hand moving from bottom to top, the reels of a video slot game may then spin from bottom to top based on the detected hand movement, but the results may be the same even if the player had caused the reels to spin in the opposite direction. In such an example, the detected body movement may still provide value in allowing the player to perceive control over the spin without actually allowing the player to control and/or affect the actual outcome. In another embodiment, the detected body movement may only cause the game play to be initiated, and may not affect how the game play is displayed and/or the results of the game play.

In another example, the method may include determining one or more responses, and may include receiving scene data from one or more sensors. In one embodiment, the data may be basic data, which may represent at a digital level the content of the scene, with no associated interpretation. For example, the data may only include a 3D representation of the scene, but may not include any associated interpretation of what any of the bodies (and/or objects) within the scene are or what the bodies (and/or objects) are doing. In another embodiment, the data transmitted may include at least some associated interpretation. For example, the data received from the one or more sensors may include interpretive data that a hand moved from a first point to a second point. In this example, it may be possible to share the data interpretation workload amongst the sensors and a separate logic device.

The method may include the steps of determining one or more responses based on the received scene data and implementing one or more actions on one or more gaming devices based on the one or more determined responses. In one embodiment, the determined response and/or implemented action may be made apparent to the player. For example, in response to a player moving his hand in a certain movement, a new play of a base game may be initiated. In another embodiment, the determined response and/or implemented action may not be made apparent to the player. For example, a repeated movement by a player may be determined to be a security risk, and the implemented action may be to send an electronic message to a security station, so that security personnel may be dispatched to further investigate and/or any other action may be taken.

Some of the embodiments disclosed may utilize one or more of the processes disclosed herein, and/or may utilize one or more of the depth image sensing devices disclosed herein.

In one example, a player may pick a symbol by tapping the air. In another example, the player may move an object located on the gaming system (e.g., a ship, a horse, a person, etc.) by turning their body.

In one embodiment, a gaming system may utilize one or more depth image sensing devices in order to initiate one or more sequences used to attract players. In one example, the one or more depth image sensing device may detect people walking by the machine, and the gaming system may utilize the information received from the one or more depth image sensing device to cause an associated display device to display images that are specific to the detected people. For example, four people may walk by the machine, and the gaming system, utilizing one or more depth image sensing devices, may cause an associated display device to display any four images (e.g., monkeys, GODS, woman, cars, etc.) walking across the screen at approximately the same rate. In another example, each of the monkeys may have a characteristic that is visually similar to one of the people walking by (e.g., hair length, relative height to the other people/monkeys, posture, gender, age, etc.). In another example, the images may move from one or more gaming devices to one or more other gaming devices.

In an exemplary embodiment, the electronic gaming device may include a plurality of reels. The plurality of reels may include a plurality of symbols. The electronic gaming device may include a first payline, a second payline, and a memory. The memory may include a payline module. The payline module may include a plurality of payline structures. The electronic gaming device may include a processor. The processor may receive primary wagers on one or more paylines. The processor may receive one or more secondary wagers on one or more scrape away gaming options.

In another embodiment, the processor may determine a payout based on the primary wagers. The electronic gaming device may include a network interface, which may receive data from at least one of a server and one or more gaming devices. The electronic gaming device may include a display, which may display one or more selected paylines.

In another example, the display may shade one or more non-selected paylines. The electronic gaming device may include a player preference input device. The player preference input device may modify a game configuration based on data from an identification device. The processor may multiply a prize value based on one or more multiplier banking options.

The plurality of reels may form a 5-by-5 matrix, a 3-by-5 matrix, a 4-by-5 matrix, a 4-by-3 matrix, a 5-by-3 matrix, or any number-by-any number matrix.

In one embodiment, the electronic gaming device may include a plurality of reels. The plurality of reels may include a plurality of symbols. The electronic gaming device may include one or more paylines formed on at least a portion of the plurality of reels. The electronic gaming device may include a memory. The memory may include a scrape away module. The scrape away module may include a plurality of scrape away structures. The electronic gaming device may include a processor, which may select a scrape away structure (e.g., dirt, leaves, buildings, acorns, animals, etc.) based on a received input.

For example, one scrape away structure may be a building with a plurality of windows and a plurality of doors. Another scrape away structure may be a plurality of potential holes (e.g., treasure spots) in the ground. In another example, a scrape away structure may be a plurality of different animals (e.g., deer, bear, wolf, elk, etc.) or the same animals (e.g., deer). Another scrape away structure may be leafs. For each of these general structures there may be numerous different structures. For example, there may be 100 different building configurations. It should be noted that any number (e.g., 1-N) different configurations may be utilized.

In another example, the processor may transmit a signal related to utilizing a scrape away gaming option. In another example, the processor may display a scrape away gaming option via a display. Further, the processor may receive an input relating to utilizing the scrape away gaming option. In addition, the processor may generate game results. In another example, the processor may modify the game results based on a utilized scrape away gaming option. In addition, the processor may display a modified game result via the display.

For example, based on a scrape away result, a base game outcome may be modified. In one illustration, a scrape away result may have determined that a different game (e.g., base) results show be multiplied by 10×. In this example, the gaming result would be modified based on the 10× multiplier (e.g., 1000 credit payout based on 100 credit game payout times 10×).

In one embodiment, the method may include receiving one or more primary wagers on one or more paylines. The method may include determining a first primary wager payout. The method may include determining one or more multipliers.

In one embodiment, the electronic gaming device may include a plurality of reels. One or more paylines may be formed on a portion of the plurality of reels. The electronic gaming device may include a memory. The memory may include a plurality of scrape away structures. The electronic gaming device may include a processor, which may generate one or more areas. Each area may cover one or more symbols. The processor may remove the one or more areas to reveal one or more covered symbols.

In another example, the processor may reveal one or more covered symbols based on an input from a player. The processor may allow the input from the player for a predetermined time period. The processor may allow the input from the player for a predetermined number of picks. The processor may display via a display screen the one or more covered symbols.

In another example, the one or more symbols may include a credit amount symbol, a multiplier symbol, a free spin symbol, and/or a blank symbol. The processor may reveal one or more covered symbols based on a tool selected by a player.

In another embodiment, a method may include displaying one or more areas where each area covers one or more symbols. The method may include removing the one or more areas. The method may include revealing at least one covered symbol based on a removal of the one or more areas. The method may include generating a payout based on one or more revealed symbols.

In another example, a removal of the one or more areas may be based on an input from a player. The method may include displaying a generated payout. The method may include a removal of the one or more areas being based on an input from a player for a predetermined time period.

The method may include a removal of the one or more areas being based on an input from a player for a predetermined number of picks In another embodiment, the electronic gaming system may include a server, which includes a server memory and a server processor. The server processor may generate one or more areas. Each area may cover one or more symbols. The server processor may remove the one or more areas to reveal one or more covered symbols. The server memory may include a plurality of scrape away structures. The server processor may reveal the at least one covered symbol based on an input from a player. The server processor may allow the input from the player for a predetermined time period. The server processor may allow the input from the player for a predetermined number of picks. In another example, the server processor may display the at least one covered symbol.

In one example, the electronic gaming device may include a plurality of reels. One or more paylines may be formed on at least a portion of the plurality of reels. The electronic gaming device may include a memory and a processor. The memory may include a plurality of scrape away structures. The processor may generate one or more areas where each area covers one or more symbols. The processor may remove the one or more areas to reveal one or more covered symbols based on a selected tool and/or a selected area.

In another example, the processor may reveal the one or more covered symbols based on one or more interactions between the selected tool and the selected area. In one example, the processor may generate one or more presentations based on the one or more interactions between the selected tool and the selected area. In an example, the processor may allow a second selection relating to a second selected tool and to reveal one or more covered symbols based on the second selected tool and a second selected area. In one example, the processor may display the one or more covered symbols. In another example, the processor may display the one or more covered symbols. In an example, the one or more covered symbols may include a credit amount symbol, a multiplier symbol, a free spin symbol, and/or a blank symbol. In one example, the processor may reveal the at least one covered symbols based on a tool selected by a player.

In another embodiment, the method of providing gaming options via an electronic gaming device may include displaying one or more areas where each area covers one or more symbols. The method may include removing the one or more areas. The method may include revealing one or more covered symbols based on a removal of the one or more areas, one of a selected tool, and/or a selected area. The method may include generating a payout based on the one or more revealed symbols.

In another example, the method may include revealing the one or more covered symbols based on one or more interactions between the selected tool and the selected area. In an example, the one or more covered symbols may include a credit amount symbol, a multiplier symbol, a free spin symbol, and/or a blank symbol. In one example, the method may include generating one or more presentations based on the one or more interactions between the selected tool and the selected area. In an example, the method may include allowing a second selection relating to a second selected tool and to reveal one or more covered symbols based on the second selected tool and a second selected area. In an example, the method may include displaying the one or more covered symbols.

In another embodiment, the electronic gaming system may include a server, which includes a server memory and a server processor. The server processor may generate one or more areas. Each area covers one or more symbols. The server processor may remove the one or more areas to reveal one or more covered symbols based on a selected tool and a selected area. The server memory may include a plurality of scrape away structures.

In one example, the server processor may reveal the at least one covered symbol based on an input from a player. In another example, the server processor may allow the input from the player for a predetermined time period. In one example, the server processor may allow the input from the player for a predetermined number of picks. In another example, the server processor may display the at least one covered symbol. In one example, the server processor may display the at least one covered symbol.

In one example, the system, device, and/or method may award different prizes based on different brush sizes, persistent state criteria, and/or incentivize data. In another example, the size of the player's wager may modify the payout award. In another example, the swipe off motion and/or procedure may add light and/or remove darkness from an object. In another example, overprint and/or additive procedures and/or presentations may be utilized. In addition, a mobile device and/or tablet may be utilized. Further, online games both for gambling and non-gambling may be utilized with this disclosure. In addition, a projected screen and/or secondary display device may be utilized with these examples. Further, achievement procedures and/or levels may be unlocked utilizing these swiping disclosures. Further, the images may be store in a persistent state for future utilization and/or leveling up. This disclosure may utilize 3D space gesturing and/or cameras. In addition, a hit button may be utilized and/or 3D gesturing and/or touch screen technology to scratch off one or more scratchable images. In addition, a snap chat/time persistent procedure may be utilized. Further, the swipe away examples may be utilized to reveal a new game and/or new game element and/or new level for game play and/or a secret level. In another example, special filtered glasses may be utilized by the player during game play and/or a swipe away function.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:

a display device configured to display a plurality of display areas, one or more paylines formed on at least a portion of the plurality of display areas;

a credit device configured to accept an item associated with a monetary value;

a memory, the memory including a plurality of scrape away structures;

a user input device configured to enable a player to select a wager amount and initiate a game play where the wager amount is subtracted from a credit balance, the credit balance being funded at least in part via the credit device; and a processor configured to generate one or more areas, each area covering one or more symbols, the processor configured to display via the display device a scrape away feature;

wherein the processor is further configured to remove the one or more areas to reveal one or more covered symbols based on a selected tool and a selected area, where a selected tool size is at least partially based on the wager amount, and wherein the credit balance is increased by any determined award amounts associated with the one or more revealed symbols.

2. The electronic gaming device of claim 1, wherein the processor is further configured to utilize a swiping procedure from a container which removes another selected image.

3. The electronic gaming device of claim 1, wherein the processor is further configured to reveal the one or more covered symbols based on one or more interactions between the selected tool and the selected area.

4. The electronic gaming device of claim 1, wherein the processor is further configured to generate one or more presentations based on the one or more interactions between the selected tool and the selected area.

5. The electronic gaming device of claim 1, wherein the processor is further configured to allow a second selection relating to a second selected tool and to reveal one or more covered symbols based on the second selected tool and a second selected area.

6. The electronic gaming device of claim 1, wherein the processor is further configured to determine a number of tool selections based on the wager amount.

7. The electronic gaming device of claim 1, wherein the processor is further configured to determine a time period based on the wager amount.

8. The electronic gaming device of claim 1, wherein the one or more covered symbols include at least one of a credit amount symbol, a multiplier symbol, a free spin symbol, a blank symbol, and a game level advancement symbol.

9. The electronic gaming device of claim 1, wherein the processor is further configured to reveal the at least one covered symbols based on a tool selected by the player.

10. A method of providing gaming options via a mobile electronic gaming device comprising:

receiving via a credit device an item associated with a monetary value; establishing via one or more processors a credit balance based at least in part on the received item;

receiving via a wager button a wager amount on a play of a game, wherein the wager amount is deducted from the credit balance;

displaying via a display device utilizing one or more processors one or more areas where each area covers one or more symbols;

removing via the one or more processors the one or more areas;

revealing via the one or more processors one or more covered symbols based on a removal of the one or more areas and at least one of a selected tool and a selected area where a selected tool size is at least partially based on the wager amount; and generating via the one or more processors a payout based on the one or more revealed symbols where the payout is added to the credit balance.

11. The method of claim 10, further comprising utilizing a swiping procedure from a container which removes another selected image.

12. The method of claim 10, further comprising revealing the one or more covered symbols based on one or more interactions between the selected tool and the selected area.

13. The method of claim 10, wherein the one or more covered symbols include at least one of a credit amount symbol, a multiplier symbol, a free spin symbol, a blank symbol, and a game level advancement symbol.

14. The method of claim 10, further comprising generating one or more presentations based on the one or more interactions between the selected tool and the selected area.

15. The method of claim 10, further comprising allowing a second selection relating to a second selected tool and to reveal one or more covered symbols based on the second selected tool and a second selected area.

16. The method of claim 10, further comprising determining a time period based on the wager amount.

17. An electronic gaming system comprising:

a credit device configured to accept an item associated with a monetary value;

a user input device configured to enable a player to select a wager amount and initiate a game play, wherein the wager amount is subtracted from a credit balance funded at least in part via the credit device;

a server including a server memory and a server processor, the server memory including a plurality of scrape away structures, the server processor is configured to generate one or more areas on a display device, each area covering one or more symbols, wherein the server processor is further configured to remove the one or more areas to reveal one or more covered symbols based on a selected tool and a selected area where a selected tool size is at least partially based on the wager amount, and wherein the credit balance is increased by any determined award amounts associated with the one or more revealed symbols.

18. The electronic gaming system of claim 17, wherein the server processor is further configured to reveal the at least one covered symbol based on a selection input from the player.

19. The electronic gaming system of claim 18, wherein the server processor is further configured to allow the selection input from the player for a predetermined time period.

20. The electronic gaming system of claim 17, wherein the server processor is further configured to determine a non-linear maximum number of tool utilizations based on a maximum credit amount wager.

* * * * *